United States Patent [19]

Squires

[11] 4,032,305
[45] June 28, 1977

[54] TREATING CARBONACEOUS MATTER WITH HOT STEAM

[76] Inventor: Arthur M. Squires, 245 W. 104 St., New York, N.Y. 10025

[22] Filed: Oct. 7, 1974

[21] Appl. No.: 513,037

[52] U.S. Cl. .................................... 48/73; 48/63; 48/99; 48/197 R; 48/202; 48/206; 48/210; 23/284; 201/31

[51] Int. Cl.² ........................ C10J 3/54; C10J 3/56

[58] Field of Search ............. 48/63, 73, 77, 78, 99, 48/197, 202, 203, 206, 210; 201/31, 4, 12; 23/284, 288 S, 288 E

[56] References Cited

UNITED STATES PATENTS

| 1,840,649 | 1/1932  | Winkler et al. | 48/203    |
| 1,913,968 | 6/1933  | Winkler        | 48/203    |
| 2,498,088 | 2/1950  | Lewis et al.   | 252/417 X |
| 2,537,153 | 1/1951  | Nelson et al.  | 201/4     |
| 2,892,772 | 6/1959  | McAfee         | 23/288 S X|
| 2,955,077 | 10/1960 | Weliusky       | 201/31 X  |
| 3,236,607 | 2/1966  | Porter, Jr. et al. | 23/288 S X |
| 3,481,834 | 12/1969 | Squires        | 201/17    |
| 3,804,606 | 4/1974  | Archer et al.  | 48/206    |
| 3,840,353 | 10/1974 | Squires        | 48/210 X  |
| 3,855,070 | 12/1974 | Squires        | 201/31 X  |

Primary Examiner—Morris O. Wolk
Assistant Examiner—Michael S. Marcus

[57] ABSTRACT

The relatively small degree of backmixing of gas in a well-arranged fast fluidized bed is exploited to introduce heat into a fluidized bed reaction system wherein a fluidized bed treatment zone receiving heat and for the purpose of conducting an endothermic treatment of matter can have a gas atmosphere, such as relatively pure steam, that is maintained independently of and without admixture by any gas or gases that are associated with a step for introducing the heat. The treatment advantageously constitutes a treatment of a carbonaceous matter, such as coal or petroleum or municipal solid waste, with hot steam for purpose of gasifying or carbonizing or cracking the matter. The arrangement is also useful for a broad range of endothermic chemical or physical treatment of matter at high temperature. Heat is introduced into an upper fast fluidized bed zone and flows by conduction downward into a lower fluidized bed zone, that may comprise a treatment zone, or sometimes the heat flows onward by conduction to other fluidized bed treatment zones not in communication with the upper zone, to permit withdrawal of gaseous products of the treatment substantially without dilution by a gas associated with the step of supplying heat to the upper zone.

6 Claims, 16 Drawing Figures

FIG. 5B
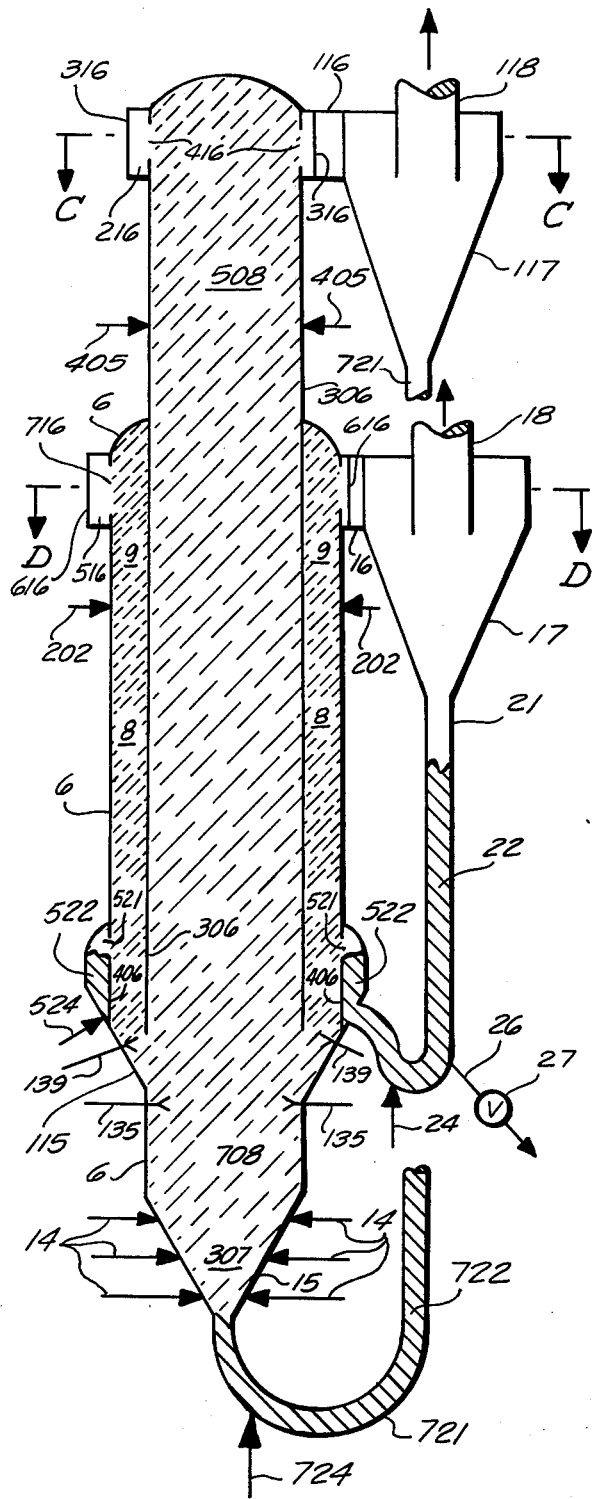
FIG. 5C
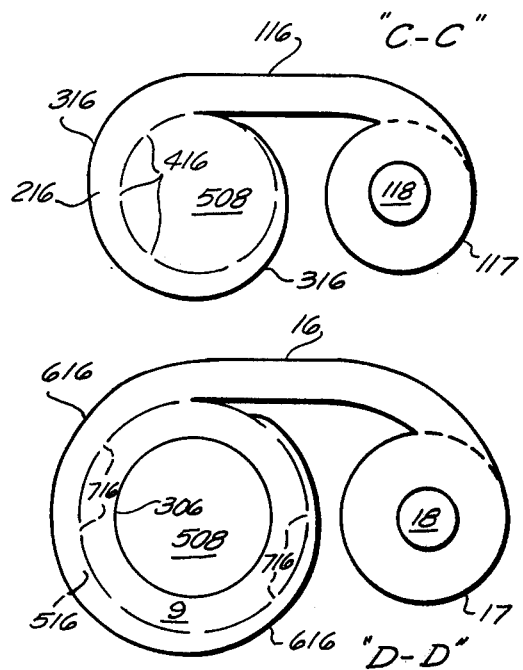
FIG. 5D
FIG. 5E
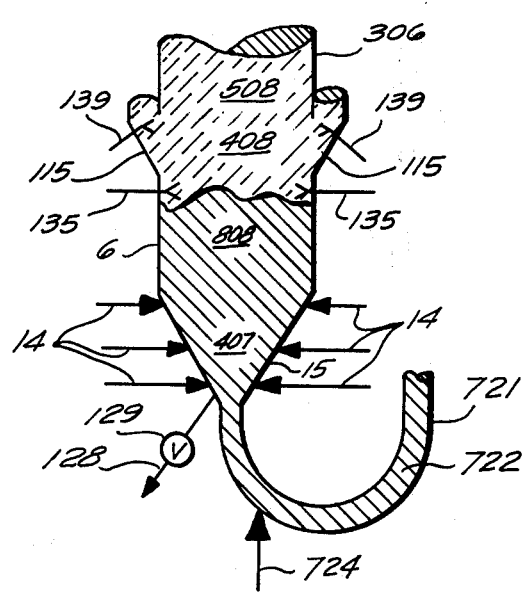

FIG. 5G
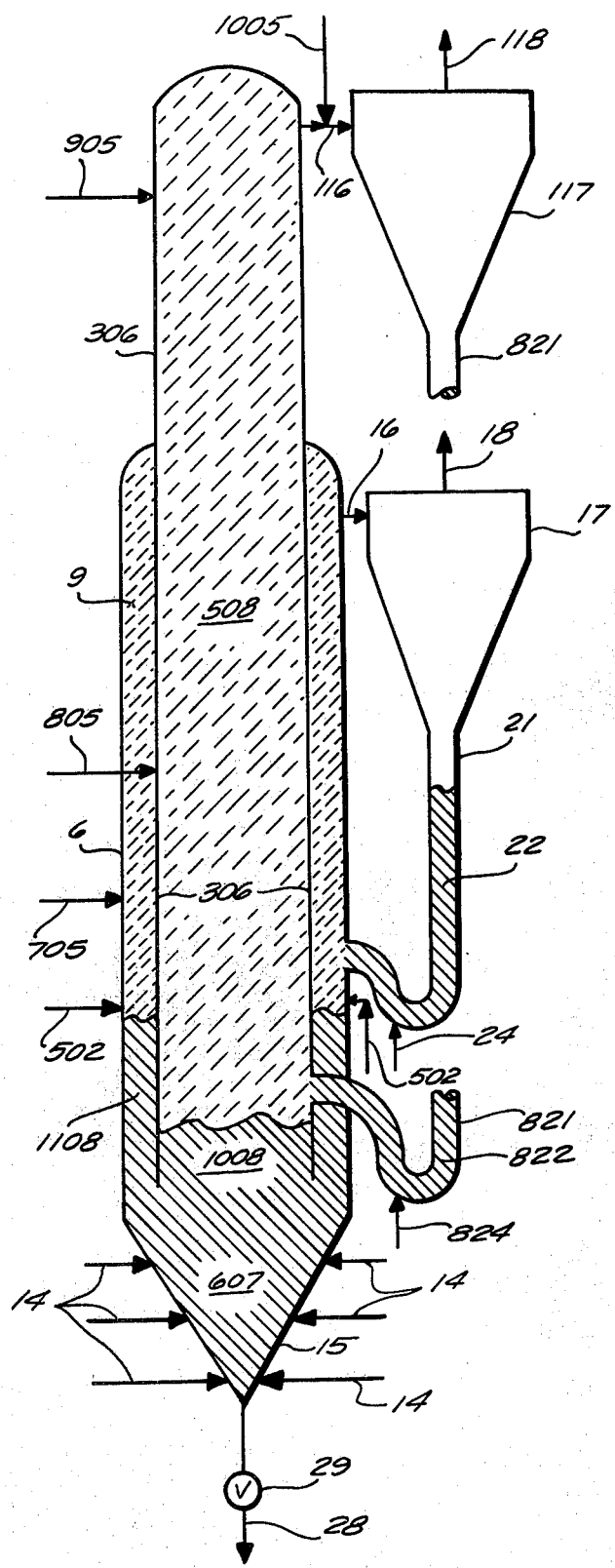
FIG. 5H
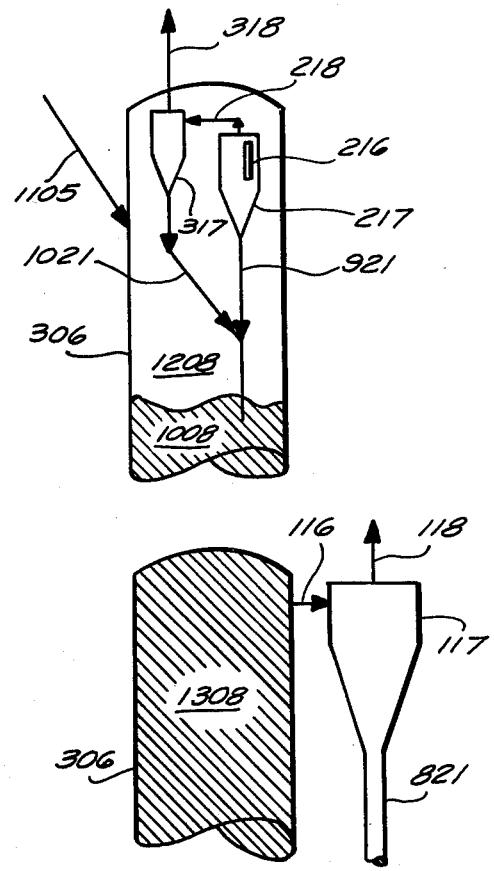
FIG. 5I
FIG. 5F
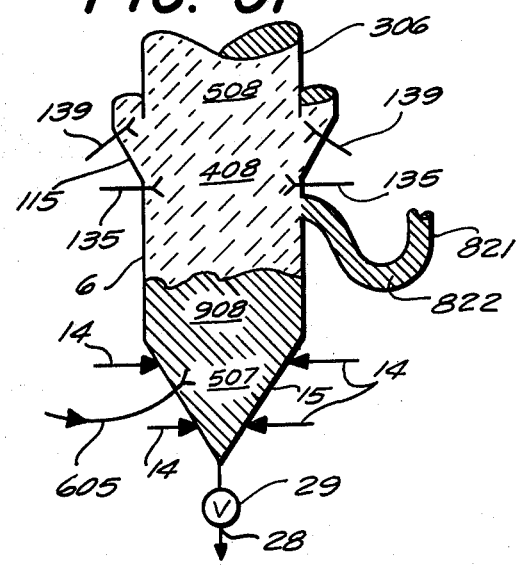

TREATING CARBONACEOUS MATTER WITH HOT STEAM

CROSS-REFERENCE TO RELATED APPLICATIONS

This application is related to co-pending application Ser. No. 410,070, filed Oct. 26, 1973, which is a continuation of application Ser. No. 167,686, filed July 30, 1971, now abandoned; the referenced co-pending application is the subject of a notice of allowance mailed on June 17, 1974.

This application is also related to co-pending application Ser. No. 257,432, filed May 26, 1972, and to issue as U.S. Pat. 3,840,353 on Oct. 8, 1974.

The instant application is also related to co-pending applications filed simultaneously herewith and entitled "Gasifying Coal or Coke and Discharging Slag Frit," Ser. No. 512,867 "Gasifying Coal or Coke and Discharging Ash Agglomerates Ser. No. 512,841."

INDEX TO THE SPECIFICATION

Cross-reference to related applications
Field of the invention
Description of the prior art
Background of applicant's co-pending applications
General description of the invention
Objects of the invention
Summary of method features of the invention
Summary of method features for making rich fuel gas without use of substantially pure oxygen: the four-zone arrangement
Distinction between slow bubbling and slow turbulent, stationary fluidized beds and the fast fluidized bed
  a. Slow stationary fluidization
  b. Quasi-stationary slow fluidized bed
  c. The slow bubbling fluidized condition
  d. The slow turbulent fluidized condition
  e. The fast fluidized condition and distinctions over dilute-phase conveying
  f. Critical gas flow and gas velocities for fast fluidization
Particle size in fast fluidized bed zone
Thermal communication advantage of the fast bed and slow-to-fast interzone heat communication
Advantage of the fast bed in control of backmixing of gas
Capacity advantage of the fast fluidized bed
Summary of features for treating anthracite coals and cokes
Summary of features for treating bituminous coals and lignite
Summary of features for treating liquid hydrocarbonaceous fuels
Summary of features for treating oil shales and tar sands
Summary of features for treating peats, woods, and vegetation
Summary of features for treating waste materials, including municipal solid waste
Summary of features for supplying heat to upper zone
  a. Heat supplied as sensible heat in a gas
  b. Heat from combustion products
  c. Heat from product of gasification of a fuel.
  d. Heat from carbon monoxide product of metal processing
  e. Heat from combustion in upper zone or in another zone communicating therewith
  f. Cooperative arrangement with a moving burden process
Summary of features for supplying heat in method for making rich fuel gas without use of substantially pure oxygen
Summary of features for heat recovery and heating steam reactant
Summary of apparatus features
Summary of apparatus features for making rich fuel gas without use of substantially pure oxygen
Summary of apparatus features for conducting endothermic chemical or physical treatment of matter at elevated temperature
  a. Heat treatment in controlled atmosphere
  b. Chemical separation of oxygen from air
  c. Calcination of calcium carbonate
  d. Oxidizing ferrous chloride pickle liquor
  e. Reducing iron oxide
  f. Other applications, including treatments at short gas product residence time
Brief description of the drawings
Description of the preferred embodiments
Description of the preferred embodiments for making rich fuel gas without use of substantially pure oxygen
Examples of the gasification of coal
Description of the preferred embodiments for conducting endothermic or physical treatment of matter at elevated temperature

FIELD OF THE INVENTION

The invention relates broadly to the introduction of heat into a fluidized bed zone for treating matter endothermically.

The invention relates broadly to the endothermic physical or chemical treatment of matter at an elevated temperature.

The invention relates to the gasification of coal and lignite and cokes and chars and charcoals.

The invention relates to the gasification of petroleum and petroleum residues and other hydrocarbonaceous liquid fuels.

The invention relates to the gasification of wood and other vegetable matter and municipal solid waste and a wide variety of other industrial waste materials and agricultural waste materials.

The invention relates to the carbonization of coal and lignite.

The invention relates to the cracking of petroleum and petroleum residues and other hydrocarbonaceous liquid fuels.

The invention relates to the carbonization of wood and other vegetable matter and municipal solid waste.

The invention relates to the production of ethylene from coal and petroleum fractions.

The invention relates to production of a rich fuel gas of high heating value without use of substantially pure oxygen.

DESCRIPTION OF THE PRIOR ART

W. K. Lewis and E. R. Gilliland described what has come to be called the fast fluidized condition in their U.S. Pat. No. 2,498,088 (Feb. 21, 1950): "If one will operate at a gas velocity sufficient to blow all or substantially all of the [particulate] solid material out of the reactor in a relatively short time, provided no fresh solid material be introduced during this time, but will feed into the reactor simultaneously solid material at a sufficiently high rate, one can maintain in the reactor a high concentration of solid granules approaching that of the 'liquid state' . . . [of the slow, stationary fluidized bed], and yet be blowing the solid particles out of the top of the reactor at a corresponding rate." These inventors appreciated some of the advantages of the fast fluidized bed condition: (1) Temperature uniformity, far superior to a high velocity operation with dilute-phase conveying of the solid. (2) Heat transfer to reactants introduced into the fast bed, e.g., a gas can be introduced below a kindling temperature. (3) Ease of introducing heat or abstracting heat, either through provision of heat exchange surface or by introducing heating or cooling fluids or by recirculating solids with external heating or cooling of the solids. (4) Minimization of risk of localized overheating of reacting constituents. (5) Retention of fine particles in the solid mass. They reported, for example, a fast fluidized density as high as 7.8 pounds per cubic foot for a pulverized clay catalyst at a superficial fluidizing-gas velocity of 7.8 feet per second while the catalyst was being supplied to the bottom of a chamber at a rate of nearly 3,800 pounds per minute per square foot of chamber cross-section. Their patent discusses the use of a fast fluidized bed for catalytic processing of oils and also briefly mentions a particular application to the coking of heavy oil vapors in presence of a relatively inert adsorbent powder such as pumice.

The fast fluidized bed has been in commercial use for about 20 years in the synthesis of hydrocarbon liquids from carbon monoxide and hydrogen in an installation at Sasolberg, South Africa, and more recently, for the calcining of aluminum hydroxide to produce cell-grade alumina (see L. Reh, "Fluidized Bed Processing", Chem. Eng. Progr., vol. 68, p. 58, February 1971; see also U.S. Pat. No. 3,565,408). In the latter application, the fast bed is an exothermic combustion zone wherein fuel gases and vapors are burned with secondary air to provide heat by conduction to a subposed contiguous stationary fluidized bed zone. The latter zone is fluidized by primary air. [It should be noted that no steam is fed to either fluidized bed zone.] The operation is at a temperature well beyond 2,000° F. Fuel oil is charged into the lower zone, where it partially burns with the air. That is to say, the oil is gasified by the air to form the aforementioned fuel gases including hydrogen and carbon monoxide and probably also some cracked oil vapors. Endothermic gasification reactions of the lower zone are sustained by part of the aforementioned heat passing by conduction from upper to lower zone. The remainder of the heat sustains the endothermic transformation of any aluminum hydroxide present in the lower zone to alumina. Although exact details of the operation are not known, it seems probable that the lower zone is a slow, stationary, turbulent fluidized bed zone (as described more fully hereinafter) and not the slow, stationary, bubbling fluidized bed more familiar from the extensive technical literature on the formation and behavior of bubbles in fluidized beds. U.S. Pat. 3,057.680 disclosed an arrangement for introducing hot gaseous products of combustion into a fast fluidized bed zone for purpose of supplying heat to a subposed fluidized bed zone of smaller cross-section. A heat-consuming reaction would be conducted in the subposed zone, such as the conversion of kieserite into anhydrous magnesium sulfate, the calcination of aluminum hydroxide, the production of metal halides, and conversion of a solution of mono- and disodium phosphate to tripolyphosphate. The disclosure called attention to the advantage that the fluidizing gas in the lower zone is not diluted by the hot combustion products.

Many researchers have undertaken the study of the gasification of coals and cokes by steam in fluidized beds. Examination of data from such studies led to an appreciation of the high yields of methane obtainable, especially in an operation conducted at an elevated pressure, from a fluidized bed for the steam gasification of a raw coal, such as a coking bituminous coal and a low-rank subbituminous coal and a peat (see Transactions of the Institution of Chemical Engineers, vol. 39, (1961), pages 3 through 9 and especially FIG. 1 of this reference). It has been since appreciated that similarly high yields of methane, often accompanied by higher hydrocarbons, are provided by the steam gasification, especially at pressure, of wood and other vegetable matter in a fluidized bed.

It is also known that higher yields of more valuable liquids are obtained from the carbonization of a coal of bituminous or lower rank or from peat or wood or other vegetable matter if the carbonaceous feed material is heated quickly. Furthermore, it is desirable to cool the products quickly, limiting their residence time at reaction temperature for carbonization.

It is also known that worthwhile yields of ethylene and sometimes propylene and higher unsaturated hydrocarbons as well can be obtained by quickly heating a wide range of carbonaceous matter to a carbonization or cracking temperature and by limiting the residence time of products of carbonization or cracking at the reaction temperature. The range embraces coals of bituminous rank and lower and peat, wood, vegetable matter, and a variety of liquid hydrocarbonaceous oils.

A classic approach to the problem of providing heat to an endothermic physical or chemical treatment of matter has been to heat a granular solid in one step and to convey the heated solid to a second step for conducting the endothermic treatment. In the classic two-vessel fluidized bed apparatus, of which the aforementioned U.S. Pat. No. 2,498,088 is an early example, a solid is heated in one fluidized bed and is conveyed to a second fluidized bed to supply heat to the second bed. Sometimes only one of the steps is conducted in a fluidized bed, either one of the steps being conducted in a dilute-phase riser or other device because of a desire to limit the residence time of either gas or solid in the step or to limit solid inventory. Many examples of these broad approaches to supply of heat could be given from art for cracking hydrocarbon oils both catalytically and thermally, from art for carbonizing coal, including examples for limiting carbonization product residence time to preserve valuable chemical species therein, from hydrotreating or hydrocarbonization or hydropyrolysis art, and from such widely various arts as the reduction of metal oxides, the absorption of oxygen from air by a reactive solid with the subsequent desorption of the oxygen in a second vessel, the pyrolysis of methane, and so forth.

In particular, the aforementioned approach has been proposed and studied with much outlay of money and effort for gasifying coal in a bed fluidized by steam and supplied with heat by circulating a hot solid into the bed and returning solid from the bed to a combustion step. Rayner (*Journal of the Institute of Fuel*, vol. 25, March 1952, pages 50 through 59) described a version of this approach in which the hot solid, termed a moving burden, comprised coke particles withdrawn from the fluidized gasification bed and heated by combustion of the particles with air in a dilute-phase riser. The version was deeply studied in England shortly after World War II and abandoned as cost ineffective. In another version (U.S. Pat. No. 3,171,369, March 2, 1965), the hot solid comprised coal ash agglomerates formed in a fluidized combustion bed lean in carbon values.

The primary motive for this outlay of money and effort has been a desire to provide a process for converting coal to a rich fuel gas without use of substantially pure oxygen, an expensive material to provide, both in respect to operating cost for its production and also in respect to capital cost for the production means. If coal is gasified with air or with a mixture of air and steam, the result is a lean fuel gas having a heating value generally between about 125 and about 180 British thermal units (B.t.u.) per cubic foot. If coal is gasified with oxygen and steam, the result is a rich fuel gas having a heating value generally at least about 250 to 300 B.t.u. per cubic foot. In a gasification at pressure, the rich fuel gas can have a heating value as high as about 450 B.t.u. per cubic foot, for example.

A longstanding technical objective has been to produce fuel gases without use of substantially pure oxygen but with a result providing a rich fuel gas at a heating value that approaches the larger, more desirable heating values that are readily achievable if substantially pure oxygen is provided. In addition to the abovedescribed approach for circulating a hot solid into a gasification zone, proposals have been made to circulate other hot materials including molten slag matter and molten salts such as sodium or potassium carbonate to provide the endothermic heat requirements for the reaction of coal with steam.

Numerous proposals have been made to provide communicating slow fluidized beds acting more or less in parallel, for example, either (a) receiving fluidizing gas from a common plenum and gas distributor but divided by a vertical wall with an opening to place the two slow beds in communication and with separate outlets for their respective offgases, or (b) receiving different fluidizing gases but discharging the gases through a common outlet, or (c) receiving different fluidizing gases and having different outlets but in communication through an opening between the two beds. Sometimes the opening is sufficiently small to inhibit much thermal communication by conduction or exchange of material between the two beds, so that the beds can operate at widely differing temperatures, and in such a case, the exchange of gas between the two beds may be relatively small. When the opening is sufficiently large to place the beds in good thermal communication, so that their temperatures correspond relatively closely, there is a large degree of mixing of gas between the beds, often in a manner to afford no good opportunity for control of the direction of gas flow between the two beds. Because of the well-known inherently large degree of backmixing of gas in a slow, stationary fluidized bed, it is not possible introduce introdue a gas at a higher elevation of a slow bed in communication with another slow bed at a lower elevation without considerable leakage of the gas into the other bed. In some instances, one of the beds is for the purpose of stripping a valuable component from the solid before it is discharged from the fluidized-bed arrangement, and baffles or other means for hindering the backmixing of gas will be provided in the stripping bed. In such a case, thermal communication is lost, and any thermal effect, such as the introduction of a cold gas into the stripping bed, will produce a temperature gradient.

Proposals have been made for arranging two fluidized bed zones one above the other, the higher zone receiving fluidizing gas from the lower zone, and baffles or packing or other means for hindering the backmixing of gas being provided between the two zones. Commonly, the arrangement is proposed for conducting an exothermic reaction, often gasification or combustion, in the lower zone, and an endothermic reaction in the upper zone. Some heat flows in form of sensible heat in the gas reaching the upper zone from the lower zone, and some heat manages to flow by conduction through the baffles or packing, but the proposals usually also provide for circulation of hot solid from the lower to the upper zone, with a trickling of solid back from the upper zone to the lower zone through the baffles or packing.

BACKGROUND OF APPLICANT'S CO-PENDING APPLICATIONS

The aforementioned application Ser. No. 410,070 provides heat to the hydropyrolysis of a hydrocarbonaceous fuel such as a bituminous coal or a heavy residual oil. The hydropyrolysis is conducted in a slow, stationary fluidized bed of coke pellets with accretion of the coke product of the hydropyrolysis upon the pellets. Heat is provided by circulating a hot fine solid into a fast fluidized bed of this solid that is superposed above the slow fluidized bed of coke pellets and therefore is in thermal communication therewith. The residence time of vapor product is limited to preserve benzene product along with methane product of the hydropyrolysis.

The application Ser. No. 410,070 also discloses an arrangement for gasifying the coke pellets, for which several other aspects are disclosed in the aforementioned co-pending application Ser. No. 257,432, to issue as U.S. Pat. No. 3,840,353, and in the two aforementioned co-pending applications filed simultaneously herewith. In the arrangement, larger particles of coke arising from a coal or coke feedstock form a slow, stationary fluidized bed zone. Finer particles of coke arise from finer particles in the feedstock or from the degradation of the larger coke particles of the slow bed zone as these particles waste away in the course of the gasification process. The finer particles form a superposed fast fluidized bed zone contiguous with the slow bed zone and therefore in thermal communication therewith. Oxygen reacts exothermically with carbon in the lower zone to provide endothermic heat for the reaction of carbon with steam or carbon dioxide in both zones. Endothermic heat for the reaction in the upper zone passes from the lower slow bed zone to the upper fast bed zone by thermal conduction. When coals are gasified or cokes produced from coals, and with use of a temperature in the fluidized bed zones between about 1,900° F and about 2,650° F, the arrangement provides a way to withdraw ash matter in form of ash agglomerates of low carbon content that form and grow in the slow bed zone and remain freely fluidized along with the coke in this zone until they are withdrawn from the bottom of the slow bed zone.

GENERAL DESCRIPTION OF THE INVENTION

In the view of the abovedescribed rich variety of known ways to introduce heat into a fluidized bed for purpose of conducting therein an endothermic chemical or physical treatment of matter at a high temperature, including Lewis and Gilliland's appreciation that a heating fluid could be introduced into a fast fluidized bed to provide heat thereto, it has been a surprise to discover a new and particular way to use the special capabilities peculiar to the fast fluidized bed condition for providing heat to a treatment of carbonaceous matter, such as coal or wood or petroleum or municipal solid waste, with steam with the substantial absence of other gaseous species save gaseous products arising from the treatment. Such a treatment has the advantage, especially when conducted at elevated pressure, of affording a larger yield of methane and sometimes also higher hydrocarbon gas species than a treatment of the carbonaceous matter by an atmosphere of steam diluted by other gaseous species, such as nitrogen from air or carbon dioxide arising from a reaction of oxygen with carbon in the carbonaceous matter. The treatment with steam acting substantially alone also has the advantage of increasing the kinetic driving force for chemical reactions between steam and carbon or char or coke arising from the carbonaceous matter, if the temperature of the treatment is sufficiently high for such reactions to occur.

In one of its aspects, the new way for providing heat is peculiarly adapted for fulfilling the longstanding objective of converting coal or other carbonaceous matter into a rich fuel gas without use of substantially pure oxygen. The new way is an improvement over earlier proposals for reaching this objective in the important respect that heat is conveyed to a zone for gasifying the coal or other carbonaceous matter by thermal conduction and not by a flow of a hot solid or liquid substance such as a granulated solid or a molten slag or a molten salt. The control of such a flow is not easy, and a loss of control or loss of the flow altogether entails a risk that air being used to sustain a combustion whereby the substance is heated may suddenly enter the zone for gasifying coal or other carbonaceous matter. Controls to guard against such a possibility are easier to provide a more reliable for the newly discovered way for providing heat.

In its broadest aspect, the new discovery provides an arrangement for supplying heat to a chemical or physical treatment of matter at a high temperature with independent withdrawal of gas products of the treatment and any gas effluents that may be associated with a step for introducing heat into the overall arrangement.

OBJECTS OF THE INVENTION

An object of the invention is to provide improved apparatus and procedure for gasifying coal or coke by its reaction with steam.

Another object is to provide an arrangement for gasifying coal or coke to furnish a rich fuel gas without use of substantially pure oxygen.

Another object is to provide an arrangement for carbonizing coal in presence of steam, and yet another object is to carbonize coal in presence of steam at short residence time of the vapor product to furnish ethylene.

Another object of the invention is to provide improved apparatus and procedure for gasifying liquid hydrocarbonaceous fuels such as petroleum and petroleum residues by their reaction with steam.

Another object is to provide an arrangement for gasifying liquid hydrocarbonaceous fuels to furnish a rich fuel gas without use of substantially pure oxygen.

Another object is to provide an arrangement for cracking liquid hydrocarbonaceous fuels in presence of steam, and yet another object is to crack such fuels in presence of steam at short residence time of the vapor product to furnish ethylene and propylene.

Another object is to gasify anthracite coals and cokes and chars prepared from coals and lignites and liquid hydrocarbonaceous fuels with steam to furnish activated carbon.

Another object is to provide improved apparatus and procedure for gasifying peats, woods, and other vegetable matter or altered vegetable matter including paper waste and vegetable matter in municipal solid wastes by their reaction with steam.

Another object is to gasify peats, woods, and other vegetable matter or altered vegetable matter including paper waste and vegetable matter in municipal solid wastes to furnish a rich fuel gas without use of substantially pure oxygen.

Another object is to provide an arrangement for carbonizing peats, woods, and other vegetable matter or altered vegetable matter including paper waste and vegetable matter in municipal solid wastes in presence of steam.

Another object is to provide improved apparatus and procedure for distilling hydrocarbonaceous values from tar sands and oil shales in presence of steam.

Another object is to provide an arrangement for gasifying hydrocarbonaceous values in tar sands and oil shales by their reaction with steam.

Another object is to provide an arrangement for cracking hydrocarbonaceous values in tar sands and oil shales, and yet another object is to crack these values in presence of steam at short residence time of the vapor product to furnish ethylene and propylene.

Another object is to provide an improved apparatus and procedure for gasifying a wide range of carbonaceous waste materials, such as agricultural wastes and manures, papermaking waste liquors, oilrefining waste sludges, municipal solid wastes, and sewage sludges, by their reaction with steam.

Another object is to provide an arrangement for carbonizing or cracking the aforementioned range of carbonaceous waste materials in presence of steam.

Another object is to recover heat from a hot gas with employment of the heat to sustain endothermic reactions of carbonaceous matter undergoing treatment with hot steam.

Another object is to recover heat from a hot gas with employment of the heat to provide endothermic heat required for the reaction of steam with carbon.

Another object is to recover heat from a hot gaseous product of a combustion of a fuel with employment of the heat to sustain endothermic reactions of carbonaceous matter undergoing treatment with hot steam.

Another object is to recover heat from a hot gaseous product of a combustion of a fuel with employment of the heat to provide the endothermic heat needed for the reaction of steam with carbon.

Another object is to recover heat from a hot gaseous product of the gasification of a carbonaceous matter with employment of the heat to sustain endothermic reactions of carbonaceous matter undergoing treatment with hot steam.

Another object is to recover heat from a hot gaseous product of the gasification of a carbonaceous matter with employment of the heat to provide the endothermic heat needed for the reaction of steam with carbon.

Another object is to recover heat from the combustion of carbon by air with employment of the heat to sustain endothermic reactions of carbonaceous matter undergoing treatment with hot steam.

Another object is to recover heat from the combustion of carbon by air with employment of the heat to provide endothermic heat needed for the reaction of steam with carbon.

Another object is to recover heat from the combustion of carbon by air with employment of the heat to sustain endothermic reactions of carbonaceous matter undergoing treatment with hot steam and without mixing products of the combustion with gaseous products of the treatment.

Another object is to recover heat from the combustion of carbon by air with employment of the heat to provide endothermic heat needed for the reaction of steam with carbon and without mixing products of the combustion with gaseous products of the treatment.

Another object is to recover heat from the combustion of carbon by air with employment of the heat to sustain endothermic reactions of carbonaceous matter undergoing treatment with hot steam and wherein the carbon arises from the carbonaceous matter during the treatment.

Another object is to recover heat in a gas comprising primarily carbon monoxide and the offgas from a process for melting or refining a metal or metal alloy to sustain endothermic reactions of carbonaceous matter undergoing treatment with hot steam.

Another object is for treating a caking bituminous coal with hot steam with discharge of a coke product in form of coke pellets.

Another object is for gasifying a coal or coke with steam and discharging ash matter in form of ash agglomerates containing relatively little carbon.

Another object is for treating a municipal solid waste with hot steam and for discharging layer inorganic moieties present in the waste and/or agglomerated inorganic matter where at least a part of the agglomerated matter was originally present in the waste.

Another object is to provide a cost effective procedure for gasifying coal to furnish a rich fuel gas without use of expensive substantially pure oxygen.

A broad object of the invention is to provide apparatus and procedure for conducting an endothermic or physical treatment of matter at an elevated temperature.

Another broad object is to provide apparatus and procedure for conducting an endothermic or physical treatment of matter at an elevated temperature substantially without mixing of gaseous or vapor products of the treatment with any gas associated with a step for introducing heat into the overall arrangement.

Another object is to provide apparatus and procedure for conducting an endothermic or physical treatment of matter at an elevated temperature with provision of the heat requirement from the recovery of heat in a hot gas and substantially without mixing this gas with gaseous or vapor products of the treatment.

Another object is to provide apparatus and procedure for conducting an endothermic or physical treatment of matter at an elevated temperature with provision of the heat requirement from the recovery of heat in the products of combustion of carbon with air and substantially without mixing these products of combustion with gaseous or vapor products of the treatment.

Another object is to provide apparatus and procedure for conducting an endothermic or physical treatment of matter at an elevated temperature with provision of the heat requirement from the recovery of heat in the products of combustion of a fuel with air and substantially without mixing these products of combustion with gaseous or vapor products of the treatment.

SUMMARY OF METHOD FEATURES OF THE INVENTION

The invention relates to an improved method for providing heat to a fluidized bed region for treating carbonaceous matter with hot steam substantially without dilution of the steam or gaseous products of the treatment within the region by a gas associated with a step for introducing heat into the overall arrangement. There is provided an arrangement of granular material in contiguous upper and lower fluidized bed zones in a vessel. The contiguous zones are in effective thermal communication with one another. The temperature is between about 850° F and about 2,650° F. The upper zone comprises a fast fluidized bed of fine particles which constitute at least a portion of the granular material. Heat is supplied to the upper zone, and at least a portion of the heat passes by conduction from the upper to the lower zone. A gas is supplied as fluidizing gas to the lower zone. The fluidizing gas to the upper zone comprises in part the offgas from the lower zone and in part a second gas, not substantially pure steam, that is supplied as additional fluidizing gas to the upper zone. Because there is a relatively small degree of back-mixing of gas in the fast fluidized bed of the upper zone, there is a gradient in the composition of gas at the boundary between the two zones. The second gas is associated with an exothermic effect occurring either in the upper zone or in a fluidized bed zone in thermal communication with the upper zone and not communicating directly with the lower zone, the second gas being either a causative agent in respect to the exothermic effect or a gaseous product of chemical reactions producing the exothermic effect. The exothermic effect supplies at least a part of the aforementioned heat supplied to the upper zone. Gas is withdrawn together with the fine particles from substantially the top of the upper zone; the gas is substantially separated from the fine particles; the gas is discharged; the separated fine particles are caused to flow into a region in which the fine particles are maintained in a slow fluidized condition; and the particles are caused to flow from the region into the upper zone at a rate sufficient to maintain a fast fluidized condition in the upper zone. A granular material is arranged in a fluidized bed zone in the vesssel to which a carbonaceous matter is supplied, and to which a gas comprising primarily steam is supplied as fluidizing gas; this fluidized bed zone is either the aforementioned lower zone or another fluidized bed zone in thermal communication with the lower zone but not in communication directly with the upper zone, and when the latter is so, the aforementioned lower zone is sometimes advantageously a fast fluidized bed of the aforementioned fine particles maintained in the fast fluidized bed condition by causing at least a portion of the aforementioned fine particles flowing from the aforementioned region into the upper zone to do so via the lower zone. The heat that passes by conduction from the upper to the lower zone serves to supply endothermic heat of reactions of the carbonaceous matter as the matter undergoes treatment by contact with the fluidizing gas comprising primarily steam supplied to the fluidized bed zone to which the carbonaceous matter is supplied. The treatment converts at least a part of the carbonaceous matter to a fuel gas, and the treatment takes place in a gas atmosphere without a substantial admixture of the aforementioned second gas. The fuel gas is withdrawn from the vessel either via the upper zone when the fluidized bed zone to which carbonaceous matter is supplied is the lower zone, or directly from the fluidized bed zone to which carbonaceous matter is supplied when this zone is another fluidized bed zone in thermal communication with the lower zone but not in communication directly with the upper zone.

The aforementioned relatively small degree of backmixing, that creates the gas concentration gradient at the boundary between upper and lower zones and prevents a substantial admixture of the second gas with gas in the treatment zone, is a peculiar characteristic of a suitably arranged fast fluidized bed, and cannot be realized in a slow, stationary fluidized bed, as will be elucidated more fully hereinafter.

If the treatment zone is the lower zone, the fuel gas products of the treatment become mixed with the second gas and are withdrawn together with the second gas. I will call this a two-zone arrangement. Nevertheless, in spite of this mixing of the fuel gas products of the treatment with the gas that is associated with the step of introducing heat into the arrangement, the fuel gas products are of higher value and the steam treatment of the carbonaceous matter is more efficacious, in ways to be elucidated more fully hereinafter, because the arrangement permits the steam to act upon the carbonaceous matter in the lower zone substantially undiluted by the second gas.

If the treatment zone is the aforementioned other zone in thermal communication with the lower zone but not in communication directly with the upper zone, the fuel gas products may be withdrawn substantially without an admixture of the gas associated with the step of introducing heat into the arrangement, as elucidated more fully hereinbelow.

SUMMARY OF METHOD FEATURES FOR MAKING RICH FUEL GAS WITHOUT USE OF SUBSTANTIALLY PURE OXYGEN THE FOUR-ZONE ARRANGEMENT.

The invention also relates to an improved method for making a rich fuel gas from carbonaceous matter without use of substantially pure oxygen. There is provided an arrangement of fine particles of granular material in contiguous upper and lower fluidized bed zones in a vessel. The contiguous zones are in effective thermal communication with one another. The temperature is between about 850° F and about 2,650° F. The upper zone comprises a fast fluidized bed of the fine particles. Heat is supplied to the upper zone, and at least a portion of the heat passes by conduction from the upper to the lower zone. A gas is supplied as fluidizing gas to the lower zone. The fluidizing gas to the upper zone comprises in part the offgas from the lower zone and in part a second gas, not substantially pure steam, that is supplied as additional fluidizing gas to the upper zone. Because there is a relatively small degree of backmixing of gas in the fast fluidized bed of the upper zone, there is a gradient in the composition of gas at the boundary between the two zones. The second gas is associated with an exothermic effect occurring either in the upper zone or in a fluidizied bed zone in thermal communication with the upper zone and not communicating directly with the lower zone, the second gas being either a causative agent in respect to the exothermic effect or a gaseous product of chemical reactions producing the exothermic effect. The exothermic effect supplies at least a part of the aforementioned heat supplied to the upper zone. Gas is withdrawn together with the fine particles from substantially the top of the upper zone; the gas is substantially separated from the fine particles; the gas is discharged; the separated fine particles are caused to flow into a region in which the fine particles are maintained in a slow fluidized condition; and the particles are caused to flow from the region into the upper zone at a rate sufficient to maintain a fast fluidized condition in the upper zone. A granular material is arranged in contiguous third and fourth fluidized bed zones in the vessel. The contiguous third and fourth zones are in effective thermal communication with one another. The third zone is a fluidized bed zone subposed beneath the aforementioned lower zone, is contiguous therewith, and therefore is in effective thermal communication therewith. The aformentioned gas supplied as fluidizing gas to the lower zone includes a portion of the offgas from the third zone, and a major part of the aforementioned heat passing by conduction from the upper to the lower zone also passes onward by conduction through the lower zone and into the third zone. The fourth zone comprises a fluidized bed of the aforementioned fine particles, which constitute at least a portion of the afornentioned granular material. The fluidizing gas to the fourth zone includes the remainder of the offgas from the third zone. A gas comprising primarily steam is supplied as fluidizing gas to the third zone. A carbonaceous matter is supplied to the third zone and/or the fourth zone. The heat that originated in the upper zone and passed by conduction through the lower zone and into the third zone serves to supply endothermic heat of reactions of the carbonaceous matter in contact with the aforementioned steam when the carbonaceous matter has been supplied to the third zone or when particles or altered carbonaceous matter enter the third zone from the fourth zone before the aforementioned reactions are complete. A part of the heat that passed onward by conduction from the lower zone into the third zone passes onward by conduction through the third zone and into the fourth zone to supply endothermic heat of reactions of the carbonaceous matter in contact with the fluidizing gas to the fourth zone, that in general contains unreacted steam unless the aforementioned reactions have substantially used up the steam in fluidizing gas entering the third zone and no more steam has been provided as fluidizing gas to the fourth zone, when the carbonaceous matter has been supplied to the fourth zone or when particles of altered carbonaceous matter enter the fourth zone from the third zone before the reactions are complete. The reactions convert at least a part of the carbonaceous matter to a fuel gas, and the treatment comprising the reactions takes place in a gas atmosphere without a substantial admixture of the aforementioned second gas. The fuel gas is discharged from substantially the top of the fourth zone or from a particle knockout space above this zone.

The method has the advantage that the discharged fuel gas has a high heating value, typically beyond about 300 B.t.u. per cubic foot, and often beyond about 450 B.t.u. per cubic foot depending upon the character of the carbonaceous matter and the temperature and pressure selected. The fuel gas is discharged with substantially no admixture of the gas associated with the step whereby heat is introduced into the arrangement.

It is usually advantageous to arrange a fast fluidized bed of the aforementioned fine particles in the fourth zone. To do so, the fuel gas together with the fine particles are withdrawn from substantially the top of the fourth zone; the fuel gas is substantially separated from the fine particles; the fuel gas is discharged; the separated fine particles are caused to flow into a region in which the fine particles are maintained in a slow fluidized condition; and the particles are caused to flow from the region into the fourth zone at a rate sufficient to maintain a fast fluidized bed condition in the fourth zone.

It is sometimes advantageous, however, in the interest of providing a larger inventory of carbon in the fourth zone for reaction with steam, for example, to arrange a slow, stationary or quasi-stationary, bubbling or turbulent fluidized bed of the fine particles in the fourth zone. If a stationary slow bed is provided, having an upper surface level, it is advantageous to withdraw the fuel gas from the knockout space above the bed and to separate fine particles from the fuel gas and to return the separated fine particles to the stationary bed. As explained hereinafter, a quasi-stationary slow bed condition can be provided by withdrawing the fuel gas at substantially the top of the fourth fluidized bed zone together with fine particles, by separating the particles from the gas, and by returning the separated particles to the fourth zone.

If the fourth zone is a fast fluidized bed zone, the third zone can also be a fast bed zone or can often advantageously be a slow, stationary or quasi-stationary, bubbling or turbulent fluidized bed zone, depending upon the nature of the carbonaceous matter feedstock to be treated with hot steam and often depending also upon the objective of the treatment.

If the fourth zone is a slow fluidized bed, the third zone should also be a slow bed.

The role of the second gas in its association with the step of introducing heat into the overall arrangement will be more fully elucidated hereinafter, but it should be mentioned here that the second gas need not comprise substantially pure oxygen, and in general, preferably does not comprise this expensive material.

If it is desired that the loss of rich gas from the third zone to the lower zone be small, and when offgas from the third zone is rich in fuel gas values, it is advantageous to introduce steam at substantially the junction between the third zone and the lower zone in a way to deflect a relatively large part of the third zone offgas that might otherwise enter the lower zone and cause this part of the offgas to enter the fourth zone instead. This expedient works best if both lower zone and fourth zone are fast fluidized bed zones, with little backmixing of gas from these zones into the third zone.

DISTINCTION BETWEEN SLOW BUBBLING AND SLOW TURBULENT, STATIONARY FLUIDIZED BEDS AND THE FAST FLUIDIZED BED a. Slow stationary fluidization The defining characteristic of the slow, stationary fluidized bed of the kind usual in fluidization art is the fact that it displays a distinct upper surface level. Granular material leaves the upper surface in so-called carryover flow of the material. The rate of carryover is a definite one that depends upon the characteristics of the granular material (size, density, size distribution, shape, cohesiveness, and so forth) and the properties of the fluidizing gas (density, viscosity, humidity as it may affect the cohesiveness of the granular material, and so forth) and especially also of the geometry of the fluidized bed and the geometry of the space between the upper surface level of the bed and the outlet or outlets for withdrawing gas from the chamber that houses the bed. For a given combination of all of the relevant variables, if granular material is supplied to the fluidized bed just at the rate of the carryover, the bed level remains at a fixed height. Commonly, much of the carryover is returned to the bed by means of devices for separating the carryover material from the gas, or as much of it as possible. According to this common practice, only a relatively small flow of make-up granular material into the bed from a fresh source of the material is required to maintain a fixed bed level, the fresh material making good the relatively small losses of the carryover material from the devices for separating the material from the gas.

It should be noted that the carryover rate is known to be strongly dependent upon the height that separates the upper surface level of the slow, stationary fluidized bed from the outlet for gas to leave the chamber. If the outlet is relatively close to the upper surface level, the carryover rate will be greater than if the outlet is relatively distant. Beyond a particular distance, however, known as the transport disengaging height, the carryover rate is substantially constant at a rate that is peculiar to the particular combination of granular material and fluidizing gas properties and fluidizing gas velocity and relatively independent of the aforementioned geometries. Common practice is to operate with the aforementioned devices for separating carryover from gas placed at an elevation equal to or just a little beyond the transport disengaging height above the upper surface level of the bed.

b. Quasi stationary slow fluidized bed

As Lewis and Gilliland recognized in the aforementioned U.S. Pat. No. 2,498,088, by feeding granular material to a slow fluidized bed at a rate well beyond the aforementioned peculiar rate of carryover, the bed level will rise, and at a sufficient rate of feed, the level will rise to the gas outlet and granular material will leave the chamber together with the fluidizing gas at the same rate at which granular material is supplied to the fluidized bed. In this mode of operation, which I will dub the quasi-stationary slow fluidized bed, the rate of solid circulation into the bed and away from the chamber can be very large, but it should be understood that the magnitude of the rate of circulation in this mode of operation has nothing whatsoever to do with maintaining the granular material in the slow fluidized condition. The large magnitude of the circulation merely takes advantage of, and indeed is an expression of, the labile, liquid-like character of the dense phase of the slow fluidized bed, i.e., the aggregated mass of granular material through which some of the gas is percolating while the remainder of the gas, often the greater part of the gas flow, moves upward through the bed in spaces relatively void of the granular material.

c. The slow bubbling fluidized condition

For a given granular material, at fluidizing-gas velocities somewhat beyond the minimum gas velocity required to buoy the material, some of the gas will be seen to rise through the fluidized mass in voids that practitioners of fluidized-bed art have come to call bubbles because of their close physical resemblance and their close resemblance as well in physical behavior to bubbles of gas rising in a pool of a liquid. The slow, stationary, bubbling fluidized bed condition has been assiduously studied and much desired in the technical literature.

From this study has come an understanding that a bubble of gas rising in a fluidized bed drags along with it in a wake a portion of the granular material amounting often to an appreciable fraction of the volume of the bubble. Especially in the case of bubbles rising in a fluidized bed of a relatively fine powder, such as powder having a mean size between about 20 and about 150 microns, the volume of the solid carried upward along with a bubble may amount to as much as one-third or more of the volume of the bubble. The lifting of solid by a bubble creates a downward return flow of solid elsewhere in the bed. Because gas is percolating through the interstices between individual particles of the powder, the return flow of solid is accompanied by a downward movement of gas. The percolating gas often represents a relatively significant fraction of the volume of the dense phase of a fine powder. To put this another way, a fine powder often swells appreciably as the fluidizing gas velocity is increased beyond the aforementioned minimum buoyancy velocity before a minimum bubbling velocity is reached at which a first bubble appears. Beyond the latter velocity, there may often appear a contraction of the powder from its most swollen state, but the final situation in the vigorously bubbling bed provides a dense phase considerably swollen in respect to the powder's initial settled condition. It is as if the powder has imbibed gas, the percolating films of gas that separate individual particles having taken on a quasi-permanent character peculiar to the given powder and given gas. Indeed, if the fluidizing gas were suddenly to be shut off, the time necessary for the percolating films of gas to leave the fluidized mass can often run into tens of seconds and even into minutes for a large mass, and meanwhile the mass retains its liquid-like character. From the foregoing discussion, it will be appreciated that large downward movements of the solid mass are inherently accompanied by gas in the percolating films and that this gas represents a substantial downward motion of gas, i.e., a substantial backmixing of gas in the fluidized bed. Furthermore, in a vigorously bubbling bed, small gas bubbles are often seen to be dragged downward by strong downcurrents of the solid mass, the downward motion of the solid occurring at a velocity greater than the velocity of rise of the small bubbles in the fluidized mass.

From the foregoing discussion, it will be appreciated that a high degree of gas backmixing is an inherent characteristic of a slow, bubbling fluidized bed, and especially of a slow bed of a fine powder. Practioners of the art have long recognized well that such a bed cannot provide the plug flow of a gas in contact with a fine powder that is so often a desirable feature of a treatment of a gas by the powder. Fluidized-bed technology has made its way without this desirable feature by virtue of its offsetting and unparalleled advantages that arise from the fluidized bed's temperature uniformity and the ease of introducing or withdrawing material and heat. It will also be appreciated that gas backmixing is also inherently large in the aforementioned quasi-stationary slow, bubbling fluidized bed.

d. The slow turbulent fludized condition

Data published recently by P. W. K. Kehoe and J. F. Davidson ["Continuously Slugging Fluidised Beds", *Institution of Chemical Engineers* (London) Symposium Series, no. 33, pages 97 through 115 (1971)] create the strong presumption that the voids in many slow, stationary fluidized beds of industrial practice for treating fine powders do not much resemble bubbles. These workers studied four fine powders over a wide range of fluidizing-gas velocities. At low velocity, much of the fluidizing gas rose in bubbles (or in the so-called slugs that appear in a tube of small diameter). As the velocity increased, the bubbles began to coalesce very rapidly, and further increments in velocity turned the bed "into a state of continuous coalescence — virtually a channelling state with tongues of fluid darting in zig-zag fashion through the bed". From this description and from photographs that accompanied these workers' publication and from a discussion with Professor Davidson held in September 1973 after Davidson had viewed motion pictures that I have made of the fast fluidized bed condition, it is evident that the appearance of the abovedescribed "channelling state" closely corresponded to the appearance of the fast fluidized bed condition, to be described hereinbelow. Kehoe and Davidson termed their channelling state a turbulent regime of fluidization and spoke of the transition to this regime as a breakdown of the bubbling regime. The velocity for breakdown of the bubbling regime was not sharply defined, and appeared to depend upon bed geometry and especially bed height as well as upon particle size. In general, the breakdown velocity was greater for deeper beds and larger particles. For two fine powders similar to a powder that I have studied extensively in the fast fluidized bed condition, the breakdown velocities in the deeper beds these authors used appeared to be on the order of 1 to 2 feet per second.

e. The fast fluidized condition and distinctions over dilute-phase conveying

A fast fluidized bed exhibits no upper surface but substantially fills the space available. A fast bed is created when both a fine powder and a gas are supplied to the bottom of a space at suitable rates. The powder is conveyed upward through the fast fluidized bed and out of the bed at the top.

It is important to appreciate the distinction between the fast fluidized bed condition and dilute-phase conveying of solid in the upward direction, on the one hand, and also the distinction, on the other hand, between the fast bed and a quasi-stationary slow fluidized bed.

In the so-called dilute-phase conveying, contrary to the impression created by many discussions of the subject, the solid powder moves upward in streamers or strands or ribbons. At low throughputs of solid, the strands of rapidly moving powder are relatively straight and unflagging. At higher solid throughputs, the strands begin to weave a bit and even at times hesitate. At still higher throughputs of solid, with the gas velocity kept constant, a critical throughput of solid is reached where the solid strands begin to fall back and take on a turbulent appearance much resembling the sheets of falling water in a fountain. This is the onset of the fast fluidized bed condition. At solid throughputs somewhat beyond the critical throughput that just initiates the fast bed condition, the solid phase takes the form of streamers and ribbons that both rise and fall, break apart and reform, and move generally in a turbulent manner. The solid phase appears discontinuous while the gas phase appears on the whole to be continuously connected. These remarks are based upon visual observation of the fast fluidized bed condition at a density between about 2 and 4 pounds per cubic foot for a solid powder having a particle density of 55 pounds per cubic foot and a median particle diameter of about 60 microns with a range of diameter between about 20 and about 150 microns, as well as upon viewing of motion pictures of these fast fluidized conditions taken at high speed. Densities as high as 8 to 10 pounds per cubic foot have been achieved, and at such higher densities, observation of the details of the structure of the fast bed becomes more difficult. The aforementioned language, "tongues of fluid darting in zig-zag fashion through the bed", is appropriate to the eye's view of the bed through a transparent window. Such observation suggests that both solid and gas phases become on the whole continuously connected at the higher densities. It appears that the streamers and strands of powder become linked in a system of rapidly circulating material that includes many vortices resembling tiny tornadoes, that is to say, a reticulated net of strands in three dimensions that are continually forming and breaking down and moving rapidly up and down and from side to side and especially in circular motions.

At a given gas velocity, the fluidized density of powder in the fast fluidized condition varies with throughput of the powder, the density increasing with an increase in throughput. If the throughput of powder is reduced below the aforementioned critical fast-condition initiating throughput, the fast bed vanishes and the dilute-phase conveying condition of the powder appears. This dependency of density upon powder flow is the mark of distinction between the fast bed condition and a quasi-stationary slow fluidized bed that also has no upper surface and substantially fills the space available. The fluidized density of the quasi-stationary slow bed does not vary with solid throughput, so long as the throughput is beyond the aforementioned peculiar rate of carryover that is characteristic of the particular powder, the particular fluidizing gas, and the fluidizing gas velocity. If the rate of solid supply to a quasi-stationary slow bed is reduced below this peculiar rate, the slow fluidized bed will gradually discharge itself by carryover and vanish and dilute-phase conveying of the solid at the low rate will be seen.

f. Critical gas flow and gas velocities for fast fluidization.

I have discovered that, to achieve the fast fluidized bed condition, the gas must be supplied at a rate to provide a velocity in the fast bed space beyond a critical velocity characteristic of the powdered solid. For example, for the aforementioned powder, the critical velocity of atmospheric air for creation of the fast fluidized condition is a little more than 6 feet per second. At lower velocities, with this powder I observe the turbulent bed condition described by Kehoe and Davidson. At velocities just a little beyond the critical velocity, the density of the fast fluidized bed is more strongly dependent upon solid throughput that it is at much higher velocities. For example, at 6.87 feet per second, the density of the powder I am studying increases from about 2 pounds per cubic foot to about 8 pounds per cubic foot with an increase in solid input from about 5 to about 8 pounds per second per square foot of horizontal cross-section of the bed. At 9.5 feet per second, the density increases from 2 to 6 pounds per cubic foot with an increase of solid input from 8 to 16 pounds per second per square foot. At 13.75 feet per second, to increase the density from 2 to 5 pounds per cubic foot, the solid input must be increased from 11 to nearly 28 pounds per second per square foot. The increase in solid throughput required for a given change in fluidized density is evidently greater both relatively and absolutely at the higher gas velocities. To put this another way, the density change brought about by a given change in solid throughput is smaller at higher gas velocity. In general, for reasons to be elucidated more fully hereinafter, I prefer to operate a fast fluidized bed at a velocity well beyond the aforementioned critical velocity, at which, for any solid throughput beyond the aforementioned peculiar rate of carryover for this velocity, the fluidized solid density is not dependent upon solid throughput and is the much higher density of the quasi-stationary turbulent slow fluidized bed, probably between about 15 to 20 pounds per cubic foot for the powder I am studying.

To summarize the requirement to achieve the fast fluidized condition, the gas must be supplied at a rate to provide a velocity beyond a critical velocity characteristic of the powdered solid, and the solid must be supplied at a rate beyond that at which the gas flowing at the given velocity is capable of conveying the solid upward in the dilute-phase condition.

For a powder between about 20 and about 150 microns in size, the gas velocity should preferably be not greater than about 25 feet per second, beyond which the solid strands become gross in size and the fine-grain turbulence of the fast bed condition so marked at velocities between the critical velocity and about 15 feet per second for the powder I am studying becomes destroyed.

It is the fine-grain character of the turbulent motion of solid and gas in the fast bed condition that sharply distinguishes this condition in its most desirable form from the so-called dilute-phase riser reaction zone of petroleum catalytic cracking art (see *Oil and Gas Journal*, volume 68, number 20, May 18, 1970, page 82). The demixing of the gas and powdered catalyst in the riser reactor, usually operating at a velocity on the order of about 50 feet per second, is gross in scale by comparison with the fine-scale demixing of the fast bed condition. From even a brief, casual glance at a fast fluidized bed of a powder closely resembling the powdered catalyst of petroleum cracking art that is running at about 12 feet per second, say, it will be evident that a probe traversing the bed would pass every inch or so from a gas void of the gas phase to a strand of the solid or vice versa. Such a probe traversing a typical riser reaction zone would find far larger spaces lean in solid content and also far larger spaces occupied by strong downcurrents of refluxing solid at a high density.

PARTICLE SIZE IN FAST FLUIDIZED BED ZONE

The aforementioned critical gas velocity necessary to achieve the fast fluidized condition is a function of particle size, being larger for particles of larger size. From a discussion with experts on formation of hail stones, it would appear that nascent hailstones in a storm cloud may resemble a fast fluidized bed. This discussion gives rise to the impression that there is no upper limit to the size of particles that can be placed into the fast fluidized condition provided a gas supply sufficiently great and a vessel sufficiently large be available.

For purpose of the instant invention, fine powders serve best in the aforementioned upper zone, preferably powders having a size between about 20 and about 150 microns. For some applications, a coarser powder will be preferred, but in general, the powder should be smaller than about 20 mesh (U.S. Standard) and preferably smaller than about 60 mesh.

For the important particular application of gasifying coal with steam or gasifying a coke made from coal with steam, fine particles are naturally provided to the upper zone of the invention by the degradation of the solid fuel as it undergoes the gasification process. If the solid fuel charged to the apparatus of the invention has been prepared by crushing to a size smaller than ¾ inch, for example, the feed fuel will inherently contain some material smaller than 150 microns, for example. Even should the feed fuel consist exclusively of large particles (when, for example, fine particles have been withdrawn from the feed fuel for application elsewhere), the gasification of the large particles in a slow fluidized bed occupying at least a part of the aforementioned lower zone of the two-zone arrangement, or of the aforementioned third zone of the four-zone arrangement will produce fine particles that will enter the upper zone. Steam gasification of a carbon particle proceeds throughout the interior of the particle. There is eventually produced a skeleton structure that spontaneously breaks up into finer particles. [See the aforementioned reference by Raynor.] In a coal or coke gasification, if the size of particles in the upper zone should fall much below about 20 microns, it will be advisable to feed lesser amounts of fine sizes in the solid feed fuel and generally to provide a coarser feed material. It may also be advisable to withdraw material from the fast bed for disposal elsewhere as in a combustion or another gasification for example, and especially for a combustion or another gasification associated with the step for providing heat to the overall arrangement of the invention, as hereinafter elucidated further. If the particles in the fast bed rise much above about 150 microns in size, it will be advisable to provide a finer coal or coke feed.

THERMAL COMMUNICATION ADVANTAGE OF THE FAST BED AND SLOW-TO-FAST INTERZONE HEAT COMMUNICATION

In contrast to the poor thermal communication afforded by the dilute-phase condition, a fast fluidized bed exhibits good thermal conductivity in vertical as well as lateral direction. When the aforementioned transition from dilute-phase conveying to the fast fluidized condition occurs, there is a sharp advance in thermal conductivity.

As my aforementioned co-pending applications Ser. No. 257,432 and 410,070 first disclosed, there is good thermal communication between a fast fluidized bed of relatively finer solid and a subposed, contiguous slow bubbling fluidized bed of relatively coarser solid.

In its various embodiments, the instant invention employs a variety of combinations of slow bubbling and slow turbulent and fast fluidized bed zones in contiguous relationships. In all cases, the interzone heat communication is good. In particular, either a slow-to-fast or a fast-to-fast interzone relationship serves to convey heat from the aforementioned upper zone to lower zone.

As further disclosed in my aforementioned co-pending application Ser. No. 257,432, there is exceptionally effective transfer of heat from hot particles of a fast fluidized bed to a cold particle introduced thereinto. This property of the fast bed becomes important if a caking bituminous coal is to be gasified or carbonized by an embodiment of the invention. In such case, it is advantageous to situate a means for feeding the solid fuel into a fast fluidized treatment zone (either the lower zone of the two-zone arrangement, or the third zone, of the four-zone arrangement, if it is a fast bed, or preferably the fourth zone) at an elevation intermediate between top and bottom of the treatment zone. With this arrangement, fine particles in the coal turn promptly into particles of fine coke and join the particles of the upper zone, while large particles of coal undergo rapid heating as they fall through the fast fluidized bed zone, so that an outer skin of each such particle is thoroughly coked by the time the particle reaches the slow fluidized bed below. For this method of coal feed, the temperature of the fluidized bed zones should preferably be greater than about 1,100° F.

ADVANTAGE OF THE FAST BED IN CONTROL OF BACKMIXING OF GAS

An outstanding feature of the fast fluidized bed condition is that the backmixing of gas is small relative to the backmixing to be seen in the slow bubbling or slow turbulent fluidized conditions. Furthermore, there is little backmixing if additional fluidizing gas is provided at a slow-to-fast interzone between an upper fast fluidized bed zone and a bubbling regime, is appreciably less than the backmixing to be seen in a bubbling slow bed. I prefer to operate turbulent bed zones when they are employed in embodiments of the invention at a velocity not less than about one-third of the aforementioned critical velocity for creation of the fast fluidized condition, especially when limiting the backmixing is desirable, and sometimes it is preferable to operate a turbulent bed zone at a velocity not less than about two-thirds of the critical velocity.

The backmixing in a fast fluidized bed is greatest at gas velocities just a little beyond the aforementioned critical velocity, where the fluidized solid density is strongly dependent upon solid throughput, as hereinbefore described. The backmixing is also greater at higher fluidized solid densities, although the thermal conductivity is also greater, and a choice of velocity and density should weigh the needs of a particular embodiment of the invention for the limiting of backmixing and also for providing adequate thermal communication when heat is flowing via fast fluidized bed zones. If a plot be made, for a given throughput of solid, of fast fluidized bed density versus fluidizing gas velocity, the density will be seen to fall with rising velocity. I prefer to operate at a velocity beyond that velocity at which the slope of the falling curve of density shows a decline in density of about 0.15 pounds per cubic foot for an increase in velocity of 1 foot per second, and even better results will be obtained at a drop of about 0.3 pounds per cubic foot for such increase in velocity. At such a velocity, the ideal of plug flow that is desirable for many objectives for the treatment of a gas and a powder can be closely approached.

CAPACITY ADVANTAGE OF THE FAST FLUIDIZED BED

A further advantage of the fast fluidized bed, that will be appreciated by one skilled in the art of slow bubbling or turbulent beds of a powder between about 20 and 150 microns in size and operating typically at velocities between about 1 and aout 3.5 feet per second, is that the fast bed can treat gas at a high throughput per unit cross-sectional area while yet maintaining a relatively large inventory of the powder and good thermal communication. As previously mentioned, solid fluidized densities approaching 10 pounds per cubic foot can be sustained at a gas velocity in the neighborhood of 10 to 15 feet per second, a desirable operating velocity for a powder about 60 microns in average particle size and about 55 pounds per cubic foot in density.

For the important application of gasifying a coal or a coke or char, the fast fluidized bed affords an exceptional capability for bringing the gasification agent steam into intimate contact with carbon in form of fine particles in a vessel of exceptionally small cross-sectional area.

SUMMARY OF FEATURES FOR TREATING ANTHRACITE COALS AND COKES

The several embodiments of the instant invention can advantageously treat a wide range of carbonaceous matter with hot steam. Matter of a first category includes fuels such as anthracite and subanthracite coal and cokes and chars made from anthracite and subanthracite coal and from bituminous and subbituminous coal and from lignite. The category also includes cokes and chars and charcoals made from a range of other carbonaceous matter such as peat, petroleum and petroleum fractions, bitumens, asphalts, coal tar, wood, and other vegetable matter or altered vegetable matter such as paper. Fuels of this hydrogen and oxygen content.

Fuels of the first category, especially anthracite and subanthracite coal and cokes and chars derived from coal, may advantageously be gasified with steam to produce gas containing carbon monoxide and hydrogen by selecting a temperature for the fluidized bed zones between about 1,600° F and about 2,650° F.

If the temperature is between about 1,600° F and about 1,900° F, activated carbon can advantageously be withdrawn from one of the fluidized bed zones as a useful product of the steam treatment. In this operation, it is advantageous to feed the coal or coke in crushed form with some of the particles relatively large, preferably between about ¼ inch and about ¾ inch. Such larger particles will form a slow fluidized bed region in a lower part of either the aforementioned lower zone of the two-zone arrangement, or the aforementioned third zone of the four-zone arrangement, from which large particles of activated carbon may advantageously be withdrawn.

In accordance with the disclosures in my aformentioned co-pending applications, when the carbonaceous matter is a coal or a coke or char derived from coal, ash agglomerates form spontaneously and grow and remain freely fluidized in a slow fluidized bed of coke particles undergoing gasification by steam when the temperature of the slow fluidized bed is between about 1,900° F and 2,650° F. The aforementioned co-pending applications deal with various aspects of this phenomenon and with ways for discharging the ash agglomerates from the slow fluidized bed of coke particles. It is sufficient here to note that the phenomenon provides a good technique for removing ash matter, substantially free of carbon values, from an embodiment of the instant invention gasifying a coal, including coals of a rank lower than anthracite and to be discussed more fully hereinafter, and a coke or a char derived from a coal or a lignite. The slow fluidized bed of coke particles would be provided in at least a lower part of the aforementioned lower zone of the two-zone arrangement, or the aforementioned third zone of the four-zone arrangement.

SUMMARY OF FEATURES FOR TREATING BITUMINOUS COALS AND IGNITE

Coaly matter is a category of carbonaceous matter, embracing bituminous and subbituminous coals and lignites. A bituminous coal of high rank is advantageously gasified by steam to produce a gas containing carbon monoxide and hydrogen in a treatment conducted at a temperature between about 1,600° F and about 2,650° F. Coals of lower rank may sometimes advantageously be gasified at somewhat lower temperatures, and a temperature as low as about 1,400° F is sometimes advantageous for gasification of a lignite.

An especial advantage of the procedure provided by the instant invention is that bituminous and subbituminous coals and lignites may be treated with relatively pure steam at an elevated pressure, to provide the aforementioned exceptionally large conversion of the fuel to methane. For this objective, the operating temperature is preferably somewhat lower than the temperature that is best for a treatment at atmospheric pressure having as its main object the production of carbon monoxide and methane. A lower operating temperature affords more methane in an operation at elevated pressure, preferably beyond about 5 atmospheres, but also leads to a slower rate for the desirable reaction of steam with carbon to yield carbon monoxide and hydrogen. The best temperature for a given situation is the compromise that best suits the relative desirability of methane and the two other fuel gases for a given process objective. In general, a temperature below about 1,900° F will be preferred for the steam gasification at pressure of a bituminous coal of high rank, and a temperature above about 1,400° F will be preferred for the steam gasification at pressure of a lignite.

Another consideration in the selection of a temperature for a steam gasification of a coal or lignite is the desirability, in many situations, of providing a fuel gas relatively free of tar substances or indeed preferably absolutely free of tar, which leads to process complications in the subsequent treating of the fuel gas product to provide a gas purified of dust and sulfur species and tar species and suitable for distribution in a pipe system to several points for use of the gas. In general a temperature above about 1,600° F will be preferred in order to minimize or eliminate the presence of tar species in the fuel gas, and often a temperature above about 1,700° F will be preferred.

If a fuel gas is to be cleaned while hot, as for example by a panel bed filter cleaning device as disclosed generally in my co-pending applications Ser. No. 501,276 and 501,278 filed Aug. 28, 1974, and to be used for prompt combustion, the absence of tar species from the fuel gas is not so important a consideration, although still a desirable feature of a steam treatment of a coal or lignite.

A procedure for feeding a crushed caking bituminous coal (that is to say, a coal that melts upon heating to a temperature beyond about the general vicinity of 750° F) to a fast fluidized bed treatment zone has been described hereinbefore. An alternative procedure for feeding a caking bituminous coal to a steam gasification may be preferred if it is desired that as much of the coal as possible come into intimate contact with the steam as soon as possible, as for example, would be the case if it is desired to make as much methane as possible in a steam gasification at an elevated pressure. According to the alternative procedure, at least a part of the aforementioned lower zone of the two-zone arrangement, or a part of the aforementioned third zone of the four-zone arrangement, would be arranged to house a slow fluidized bed of coke pellets, preferably displaying at least about a five-fold range in particle diameter and with the subtantially smallest pellet greater in size than about 1/64 inch. With the temperature preferably below about 1,800° F, and with the caking bituminous coal ground to a size preferably substantially smaller than about 100 mesh, the step of feeding the ground coal directly into the slow fluidized bed of coke pellets causes each particle of the coal to melt and to adhere to a coke pellet in a sticky patch of rapidly reacting sticky matter that is rapidly converted to dry non-sticky coke accreting upon the pellet and fuel gases that leave the slow bed. It is often advantageous to withdraw some of the coke pellets from the slow bed as a useful product of the operation.

Fuels of the second category may also be carbonized by the invention to produce a fuel gas containing vapor species condensable to a liquid fuel. A portion of the vapor species will constitute relatively light aromatic hydrocarbons, such as benzene and toluene and xylenes. Heavy tar species will also in general be present, requiring further hydrotreating if they are to be upgraded for uses other than a relatively prompt combustion with little handling or storage. An advantage of the invention is the rapid heating of the coal fed to the treating fluidized bed zone, and also the ability to control the residence time of the vapor fuel products of the treatment. These features permit the conversion of coal and lignite into a larger yield of both fuel gas and fuel vapor species in a carbonization, preferably conducted between about 850° F and about 1,500° F, than conventional procedures wherein either heating time is long or vapor product residence time at temperature is long. In a carbonization using the invention, the vapor product residence time at temperature is preferably less than about 10 seconds, and better results are obtained at a residence time of less than about 5 seconds. Residence times of these short durations are readily provided by a fast fluidized bed operating at 10 to 15 feet per second, for example, and having a height on the order of 50 feet or so. For control of residence time, the fast fluidized condition is to be preferred in the treatment zone.

Fuels of the second category may also be carbonized to produce a gas containing valuable amounts of ethylene and sometimes also higher olefinic hydrocarbons. For this objective, the temperature should be between about 1,000° F and about 1,800° F and is preferably between about 1,300° F and about 1,700° F, and the residence time of the product fuel gas at treatment temperature should be less than about 2 seconds and is preferably less than 0.5 second.

If the invention is used to supply a fuel gas for prompt combustion to drive a gas turbine, the operation is preferably at a pressure higher than the pressure needed for the combustion chamber of the gas turbine. For example, for use with the gas turbines now being built, or envisioned in the early future, the operation should preferable run at a pressure between about 12 and 20 atmospheres.

If the aforementioned coke pellets are not desired as an additional product of the operation of the invention with feed of a caking bituminous coal, yet intimate treatment of substantially all of the coaly matter is desired almost instantaneously after the coal enters the treatment zone, an alternative feeding procedure is to grind the caking coal to a fineness preferably smaller than about 20 mesh and to introduce the coal into a fast fluidized bed treatment zone.

SUMMARY OF FEATURES FOR TREATING LIQUID HYDROCARBONACEOUS FUELS

A third category of carbonaceous matter advantageously treated by the invention embraces a wide range of hydrocarbonaceous liquid fuels, including petroleums and petroleum fractions, petroleum residua, petroleum extracts and residua from petroleum extraction, petroleum residuum extracts and residua from petroleum residuum extraction, asphalts, coal tars, cracked residua, heavy coker tars, bitumens, kerogens, Gilsonite, vegetable oils and animal fats and other oils of organic origin. Included in this category are a range of artificial oils that can be manufactured from coals and lignites and peats and wood and vegetable matter and paper waste and solid municipal waste by treatment at elevated pressure with hydrogen or mixtures of hydrogen and carbon monoxide, wherein the treatment is usually catalytic, but for which a non-catalytic treatment for hydrogenating coal to yield an artificial fuel oil is also well known. Included also are artificial oils producible from coals and lignites by extraction with a liquid at supercritical conditions of temperature and pressure, such as toluene or methane or carbon dioxide. Included also are artificial oils that are the product of a treatment of a coal or lignite with a doner solvent such as tetralin or a highly hydrogenated gas oil fraction obtained by distilling the product of the donor solvent treatment and returned to the treatment.

Matter of the third category is advantageously gasified with steam, to produce carbon monoxide and hydrogen, at temperatures between about 1,300° F and about 2,200° F. An advantageous increase in yield of methane and other light hydrocarbon fuel species is obtained by operating at a pressure greater than about 5 atmospheres.

Third category matter may be cracked to obtain vapor species, in general including hydrocarbon species in the gasoline and gas oil boiling ranges, by operating the treatment fluidized bed zone of the invention at a temperature between about 850° F and about 1,400° F.

Cracking of third category matter with control of vapor product residence time at treatment temperature, preferably with use of a fast fluidized bed treatment zone, can yield a gas containing valuable amounts of ethylene and usually also valuable amounts of propylene. For example, light naphtha can be cracked to a yield of ethylene on the order of 35 weight percent of the naphtha in an operation at about 1,500° F to 1,600° F and at a residence time on the order of 0.2 to 0.5 second. A 25° A.P.I. gravity gas oil can be cracked to ethylene with about a 25 weight percent yield, in presence of 3 to 5 parts of steam to avoid excessive carbon formation, in an operation at about 1,200° F to about 1,400° F and at a residence time on the order of 0.1 to 1 second. A heavy residue can be cracked to ethylene in an operation between about 1,000° F and about 1,600° F at a residence time of less than about 2 seconds.

In general, the granular material arranged in the fluidized bed zones of the invention for treatment of third category matter is advantageously either carbon or coke particles or coke pellets where the carbon or coke arises from the carbonaceous matter itself. In some cases, coke particles or particles of an inorganic substance may also advantageously be used as at least part of the granular material of the zones.

SUMMARY OF FEATURES FOR TREATING OIL SHALES AND TAR SANDS

A fourth category of carbonaceous matter is closely related to the abovedescribed third category and embraces oil shales and tar sands containing bitumens and kerogens that might be recovered from the accompanying inorganic matter and thereafter treated as matter of the third category, or, alternatively, viewed as a fourth category, processed to yield fuel gas and vapor species in the presence of the inorganic matter. Advantageous temperatures for the treatment and objectives of the treatment are essentially as hereinbefore described for the third category matter.

A major consideration in the treatment of the fourth category of matter is the provision of heat required to elevate the temperature of the accompanying inorganic matter to the treatment temperature, and following the treatment, a major consideration is the recovery of sensible heat contained in the inorganic matter. Techniques for providing heat to crushed oil shale and to tar sand and for recovering heat from exhaust inorganic particulate material following treatment of these substances are proposed in my co-pending application entitled "Solid-Gas Heat Exchange in Countercurrent Contacting of Gas and Granular Material in Panel Bed" and filed Sept. 19, 1974 (Ser. No. 507,398).

In the treatment of tar sands, the sand itself arising from the carbonaceous matter is often advantageously at least a major part of the granular material arranged in the fluidized bed zones of the invention.

In the treatment of oil shales, the granular material may sometimes comprise inorganic matter arising from the shale accompanied often by coke matter also arising from the oil shale, but in general it is advantageous also to supply particulate matter in form of coke or an inorganic substance to constitute a part of the granular material.

SUMMARY OF FEATURES FOR TREATING PEATS, WOODS, AND VEGETATION

A fifth category of carbonaceous matter, a category generally of high hydrogen and oxygen content, embraces peats, woods, wood wastes, grasses, shrubs, vines, and stalky plants as well as altered vegetable matter such as paper and paper wastes. Because of the inclusion of the latter material in this category, municipal solid wastes often partake of the character of this fifth category, but such wastes will be dealt with separately hereinafter.

Matter of the fifth category is advantageously gasified with steam, to produce carbon monoxide and hydrogen, at temperatures between about 1,200° and about 1,700° F. An advantageous increase in yield of methane and other light hydrocarbon fuel species is obtained by operating at a pressure greater than about 5 atmospheres.

Fifth category matter may be carbonized to obtain vapor species, often containing oxygenated compounds rendering the species of relatively small value as a liquid fuel but yet having some value for fuel purposes if burned promptly and also sometimes having value for further treatment for extraction of valuable chemical species. A suitable temperature for carbonizing fifth category matter to obtain vapor species condensable to a liquid fuel is between about 850° F and about 1,300° F.

For treatment of peats, woods, and wood waste, the granular material arranged in the fluidized bed zones of the invention is sometimes advantageously coke or char or charcoal particles arising from the carbonaceous matter itself. For other fuels of the fifth category, and sometimes also for peats, woods, and wood wastes, it is advantageous to supply coke particles or particles of an inorganic substance to serve as at least part of the granular material of the zones.

SUMMARY OF FEATURES FOR TREATING WASTE MATERIALS, INCLUDING MUNICIPAL SOLID WASTE

A broad sixth category embraces a wide variety of waste materials arising from operations of industry, agriculture, and our urban environment. The invention may advantageously process a variety of agricultural wastes and manures, including husks and stalks of crop plants. Papermaking waste liquors, oilrefining waste sludges, and sewage sludges all contain fuel values that make them suitable feedstocks for treatment by the invention. Municipal solid wastes are also an important potential feedstock.

Advantageous temperatures for the treatment and worthwhile objectives of the treatment are essentially as hereinbefore described for the fifth category matter.

It is advantageous to supply coke particles or particles of an inorganic substance to serve as at least part of the granular material of the zones.

Municipal solid wastes often provide special problems. They often contain matter containing chlorine that is released by the treatment in form of hydrogen chloride gas. For such wastes, it is advantageous to provide finely divided limestone to the treatment zone. For example, if the treatment zone is the aforementioned lower zone, at least an upper part of the lower zone, or suitably the upper zone of the two-zone arrangement, should comprise a fluidized bed of fine particles including limestone or dolomite to capture the hydrogen chloride gas and to prevent it from leaving the treatment with fuel gas product. Alternatively, if the treatment zone comprises the aforementioned combination of third and fourth zones of the four-zone arrangement, at least the fourth zone, and sometimes preferably also at least a part of the third zone, should comprise fluidized bed zones that include fine particles of limestone or dolomite.

Municipal solid wastes often also contain inorganic matter that either melts or softens and becomes sticky at the temperatures specified herein for treatment with hot steam. In many proposals for combustion or gasification of municipal solid waste, a step of the operation is provided for the substantially complete removal of such matter. A major advantage of the instant invention is that is provides a method for gasifying or carbonizing municipal solid wastes substantially without removal of such matter, or, if it is present in an unusually large amount, with only a rough and partial removal with a substantial quantity of the matter remaining in the feedstock provided to an operation according to the invention. It is advantageous that at least an upper part of the fluidized bed treatment zone (i.e., an upper part of the aforementioned lower zone, of the two-zone arrangement, or the fourth zone or the fourth zone together with an upper part of the third zone of the four-zone arrangement) be a fast fluidized bed zone. It is also advantageous that a lower part of the fluidized bed treatment zone (i.e., a lower part of the lower zone of the two-zone arrangement, or at least a lower part of the third zone of the four-zone arrangement) comprise a slow fluidized bed of relatively large coke particles. The coke can advantageously be supplied from an outside source, and is preferably a coke having little reactivity toward steam at the temperature of the treatment, so that there is little make-up requirement for the coke on account of its loss through gasification. An advantageous temperature for treatment of municipal solid wastes is below about 1,500° F, and at such temperatures, a metallurgical grade of coke or an anthracite coal, that converts to an anthracite coke in the treatment, will have a suitably small reactivity toward steam. The coke particles are preferably between about 1/16 and ½ inch in size when supplied to the treatment, and will degrade in size somewhat during operation of the treatment, but will remain appreciably larger than the fine particles of the fast fluidized bed zone above.

The municipal solid waste is preferably crushed to sizes smaller than about ¾ inch, and is preferably fed to the fast fluidized bed portion of the treatment zone at an elevation well above the bottom of this zone. Larger inorganic moieties present in the solid waste matter will fall quickly as they are fed to the fast fluidized bed zone, and will enter the slow bed of larger coke particles. Many sticky inorganic substances, such as, in particular glass, do not stick to coke. Particles of such substances will remain freely fluidized in the slow fluidized bed of large coke particles and will tend to grow in size by agglomeration of other similar materials. The larger inorganic moieties will also remain freely fluidized. These may be withdrawn together with agglomerates of the sticky inorganic substances from the slow fluidized bed of large coke coke particles. A rough separation will suffice to obtain a fraction of the withdrawn material that is far richer in coke than the material as it left the slow bed, and this fraction may be returned to the slow bed in order to conserve coke.

It should be noted that it will usually be advantageous to practice the relatively easy removal of magnetic metalliferous materials from the municipal solid waste before its treatment.

It will be appreciated that the expedient of using coke to dilute and control agglomeration of sticky inorganic substances in the solid waste could not be employed if heat were introduced into the arrangement in the conventional way, by bringing air or oxygen into the bottom of the lowest fluidized bed zone. A special advantage of the invention in dealing with matter such as municipal solid waste, as well as coals having ash matter of relatively low ash fusion temperature, is that the bed zone containing larger inorganic moieties and sticky inorganic agglomerates cannot develop the hot spots that frequently appear in a fluidized bed of such heterogeneous and sticky matter when air or oxygen in introduced directly into the bed to create heat.

SUMMARY OF FEATURES FOR SUPPLYING HEAT TO UPPER ZONE a. Heat supplied as sensible heat in a gas A broad preferred method for introducing heat into the aforementioned fast fluidized bed upper zone is to supply to this zone a gas at a temperature higher than the temperature of the zone. This gas is then the second gas described hereinbefore and associated with the step of introducing heat to the overall arrangement.

b. Heat from combustion products

The gas is advantageously the product of combustion of a second carbonaceous matter, which may be selected from any of the aforementioned six categories of such matter.

A preferred second carbonaceous matter for the aforementioned combustion is a carbon arising from the carbonaceous matter undergoing treatment by the invention. Such a carbon is often at least a part of the fluidized particles of at least one of the fluidized bed zones, and may advantageously be withdrawn from one or more of the zones and supplied to the combustion.

If the carbonaceous matter undergoing treatment is a coal or a coke derived from a coal, the combustion is often advantageously a slagging combustion of fine particles of several types known to those skilled in the art and discharging ash matter in the particles in form of molten slag. Such combustions lend themselves to operation at an elevated pressure, and can supply hot combustion product gases as the second gas of the invention at such a pressure if the operation is at a high pressure, as recommended hereinbefore in several instances.

Such a slagging combustion can deliver a hot gas of an extreme temperature, making possible operation at the highest temperature levels specified herein for the treatment. It should be noted that operation at such extreme temperatures cannot be expected to be as convenient or as trouble free as an operation at lower temperatures, and, in general, I prefer a temperature below about 2,100° F for the treatment of the invention.

For an operation at such a temperature, it is frequently advantageous to circulate some of the fine particles from one of the fluidized bed zones into a space for contacting the particles with a hot gas from a slagging combustion, in order to ameliorate the temperature of the gas but not reduce its temperature below that of the treatment, and then to supply both particles and gas together into the upper zone to introduce heat thereinto.

The combustion may also advantageously be conducted in a dilute suspension of fine particles of carbon but without discharge of molten slag either because the temperature is not high enough for this or because the carbon contains little or no inorganic matter.

The combustion may advantageously be conducted in the so-called carbon burnup cell developed for use in cooperation with a fluidized bed boiler. The cell is a fluidized bed combustion device with inert inorganic solid as the fluidized particulate matter and with feed of carbon to the cell in an amount below the stoichiometric amount needed to convert oxygen in air supplied to the cell to carbon dioxide. The cell generally is provided with a relatively small amount of heat transfer surface for raising steam, but combustion product gas temperatures beyond 2,000° F are readily achieved. If the carbon is derived from coal, ash matter in the burnup cell often forms ash agglomerates, in accordance with the teachings of the aforementioned U.S. Pat. No. 3,171,369.

c. Heat from Products of gasification of a fuel

Another advantageous gas to serve as the second gas of the invention is the product of the gasification of a fuel comprising a second carbonaceous matter, which may be selected from any of the aforementioned six categories of such matter.

A preferred second carbonaceous matter for the aforementioned gasification is a carbon arising from the carbonaceous matter undergoing treatment by the invention, as may often be withdrawn from one or more of the fluidized bed zones of the invention as hereinbefore described.

The gasification may advantageously be conducted in a dilute suspension in a known manner, either with or without discharge of molten ash from the gasification chamber. The gasification medium may be air or oxygen and steam, or air alone, or, less suitable, mixtures of air or oxygen and carbon dioxide.

The gasification may advantageously be conducted in a fluidized bed with discharge of ash agglomerates in accordance with the teachings of various aspects of such a bed in my aforementioned co-pending applications.

The gasification may also be a second operation according to the instant invention. In this combination, the second operation may be an operation that processes raw coal or other carbonaceous matter and furnishes both a hot fuel gas to serve as the second gas for the first operation of the invention and also a partially gasified coke as the feedstock of carbonaceous matter to the first operation. Another mode of operation that is often advantageous if a yield of methane is a wanted objective would be to gasify raw coal or other carbonaceous matter in the first operation of the invention, and to gasify a partially gasified coke removed from the first operation in a second operation at a higher temperature that furnishes a hot gas to serve as the second gas for the first operation.

Viewed broadly, the invention provides a means of recovering valuable sensible heat from any fuel gasification process that operates at a temperature beyond about 850° F. For example, a known operation gasifies heavy oils with oxygen and steam at elevated pressures as high as 100 atmospheres and at temperatures around 2,500° F. The offgas from the operation contains not only valuable heat but also sooty carbon values that are troublesome to remove. The instant invention provides an advantageous way to deal with this gas, which may serve as the second gas for an operation gasifying additional oil, or coke from oil, or coal, or indeed a wide range of other carbonaceous matter. Another known operation gasifies coals in a suspension with discharge of ash matter in form partly of slag and partly of an exceedingly fine dust accompanying the make-gas, which typically is at temperatures between about 2,300° F and 2,800° F depending upon the reactively of the coal. Offgas from this operation, too, might advantageously serve as the second gas for an operation of the invention. The instant invention could also advantageously receive as a second gas the offgas from a conventional fluidized bed gasification process.

d. Heat from carbon monoxide product of Metal Processing

Yet another gas that may advantageously be employed for the second gas of the invention is the gas rich in carbon monoxide and also often containing metal oxide fume that arises from several known operations for melting or refining a metal or metal alloy with carbon through the agency of oxygen or electricity, as, for example, in oxygen steelmaking from pig iron or hot metal or mixtures of these materials with iron scrap, or in an electric furnace process for producing pig iron from iron ore or partially reduced iron ore and coal or coke, or in an electric furnace process for producing steels of high quality, such as stainless steels, or in an electric furnace process for producing a variety of ferroalloys, such as ferrosilicon, ferromanganese, and the like. The invention provides an advantageous way to deal with these troublesome gases. The fume is hard to remove from the gases. Often before a cleaning step, they must be reduced in temperature by introducing water or steam. Sometimes the gases are burned with air, and then additional air is introduced for temperature reduction before the gases are cleaned to remove fume particles. According to the instant invention, the heat in the gases may be usefully employed to sustain endothermic reactions of carbonaceous matter with steam; the carbon monoxide fuel value of the gases represents a valuable addition to the fuel gas arising from these endothermic reactions; and the fume in the final offgas from the operation is more easily cleaned together with the larger particles that are carried from the final fluidized bed zone seen by the offgas than such fume can be cleaned when present alone.

e. Heat from combustion in upper zone or in another zone communicating therewith If the aforementioned lower zone is the treatment zone, the gas that arrives as a part of the fluidizing gas to the upper zone is a fuel gas, and heat could readily be provided to the upper zone simply by using air or a gas containing oxygen as the second gas. It will usually be preferable to adopt an arrangement, however, whereby the valuable fuel gas produced in the lower zone is not destroyed by a combustion. If the fine particles of the upper zone contain carbon, air or a gas containing oxygen can often be employed as the second gas without substantial consumption of the fuel gas if the second gas is introduced in jets arranged to entrain particles into a multiplicity of combustion zones high in content of the second gas and particles and lean in the fuel gas, or, more advantageously, in jets each surrounded by an annular jet-like stream of steam conveying fine particles that contain carbon and have been withdrawn from one of the fluidized bed zones.

A more foolproof and simpler arrangement can be provided, however, and is preferred for introducing heat into the upper zone if the particles of this zone contain carbon. An additional fluidized bed zone is arranged subposed beneath the upper zone and contiguous therewith and hence in thermal communication therewith, but not in communication directly with the lower zone. The particles of the additional fluidized bed zone are advantageously substantially the same as the particles of the upper zone. If air or a gas containing oxygen is supplied to the additional zone, combustion therein generates heat that flows by conduction into the upper zone supplying the desired heat addition thereto. In this arrangement, the second gas comprises the products of the combustion of the carbon of the particles with the air or the gas containing oxygen. The additional zone may be a fast fluidized bed zone or a slow turbulent or bubbling bed zone.

The foregoing arrangement of the additional bed subposed beneath the upper zone can also serve to furnish heat to the upper zone by supplying a second carbonaceous matter to the additional bed together with air or a gas containing oxygen. The second carbonaceous matter can sometimes advantageously comprise the same matter as the first carbonaceous matter, especially if the first matter is of a type that leaves little or no carbon residue from the steam treatment, such as many of the materials of the aforementioned fifth and sixth categories.

f. Cooperative arrangement with a moving burden process

In a process of the moving burden type described in the aforementioned paper by Rayner in the Journal of the Institute of Fuel, there is valuable heat for gasification of carbon by steam present both in the offgas from the gasification fluidized bed and also in the combustion products from the step for heating the particles that are circulated into the gasification bed to supply heat thereto. The instat invention can serve to utilize both kinds of heat, by using the offgas from the gasification fluidized bed as the second gas of the invention, and by heating particles of granular material withdrawn from one of the fluidized bed zones of the invention in a direct contact with the aforementioned combustion products and returning the heated granular material to one of the zones.

SUMMARY OF FEATURES FOR SUPPLYING HEAT IN METHOD FOR MAKING RICH FUEL GAS WITHOUT USE OF SUBSTANTIALLY PURE OXYGEN

In the abovedescribed arrangement and procedure for making a rich fuel gas without use of substantially pure oxygen, heat may be furnished to the aforementioned upper zone in all of the ways just described. Heat may also be furnished advantageously to the operation by arranging fine particles in another fast fluidized bed zone superposed above the aforementioned fourth zone and contiguous therewith and hence in thermal communication therewith. A hot fuel gas comprising primarily fuel values can be introduced into the additional fast fluidized bed zone to provide heat thereto through the cooling of the hot gas to the temperature of the zones. Such a hot fuel gas may be provided in form of the offgas from another process for the gasification of a fuel, including a second operation employing the method of the invention. The hot fuel gas may also comprise a gas consisting substantially of carbon monoxide that is the offgas of the abovedescribed type of operation for melting or refining a metal or metal alloy through the agency of carbon and either oxygen or electricity.

SUMMARY OF FEATURES FOR HEAT RECOVERY AND HEATING STEAM REACTANT

An advantageous method for cooling offgas from the aforementioned upper zone of the invention, and also offgas from the aforementioned fourth zone of the four-zone arrangement, is the method of the aforementioned co-pendng application "Solid-Gas Heat Exchange in Countercurrent Contacting of Gas and Granular Material in Panel Bed", which discloses a panel bed device and method for countercurrent heat exchange of a gas and a granular material. [See also my co-pendng application "Countercurrent Contacting of Gas and Granular Material in Panel Bed", Ser. No. 501,277, filed Aug. 28, 1974.] This method is especially advantageous if it is desired to quench the offgases rapidly, to reduce their temperature appreciably below that of the treatment within a second or so, in order to preserve a valuable chemical species, such as ethylene or propylene.

Heat recovered in granular heat-carrying material from the offgases by a panel bed device can be conveyed to steam to be used as fluidizing gas to one or more of the zones, which may advantageously be heated by a panel bed device and method with countercurrent contacting of the steam with the hot granular material. If air is used as the second gas of the aforementioned upper zone, or if air is used to sustain combustion, as hereinbefore described, in an additional zone subposed beneath the upper zone and contiguous therewith, the air may also advantageously be heated by countercurrent heat exchange according to the panel bed method against the heated granular material.

If the second gas of the invention is the product of a combustion, the air or other gas containing oxygen used to support the combustion may advantageously be heated according to the panel bed method against the heated granular material. As similar practice is advantageous for heating a gasification medium, such as air or air and steam or oxygen and steam, for example, if the second gas of the invention is the offgas from another gasification process using the gasification medium.

SUMMARY OF APPARATUS FEATURES

My invention also relates to improved apparatus for conducting endothermic reactions of carbonaceous matter of the abovedescribed six categories in a treatment by contact with hot steam. There is provided a vessel housing contiguous upper and lower zones. There are means for feeding a carbonaceous matter to the lower zone, and means for introducing a gas comprising primarily steam as a fluidizing gas to the lower zone. Offgas from the lower zone passes into the upper zone to provide a part of a fluidizing gas to the upper zone. There are means for introducing a second gas as an additional part of a fluidizing gas to the upper zone. There are means for establishing a fast fluidized bed of a fine particulate matter in the upper zone, these means including means for withdrawing gas and the fine particulate matter from substantially the top of the upper zone, means for conducting the withdrawn gas and fine particulate matter to a means for substantially separating the gas from the fine particulate matter, and means for conducting the separated fine particulate matter in a slow fluidized condition from the separating means to substantially the bottom of the upper zone. The fluidized bed zones are at a temperature between about 850° F and about 2,650° F. There are means for furnishing to the aforementioned means for supplying a second gas to the upper zone a gas associated with an exothermic effect occurring either in the upper zone or in an additional fluidized bed zone provided in the vessel in thermal communication with the upper zone and not communicating directly with the lower zone, as hereinbefore described. The second gas may be a causative agent in respect to the exothermic effect, if for example the gas is a gas hotter than the upper zone so that its cooling in this zone contributes heat to the zone, or if for example the gas is air or a gas containing oxygen and preferably when the fine particulate matter contains carbon. Alternatively, the second gas may be the gaseous product of chemical reactions producing the exothermic effect, as for example when an additional fluidized bed zone is subposed contiguously beneath the upper zone but is not in communication with the lower zone, when the particulate matter contains carbon, and when the additional fluidized bed zone receives as a fluidizing gas air or another gas containing oxygen and supporting combustion of the carbon.

The lower zone may be a fast fluidized bed of the fine particulate matter or a slow fluidized bed of the same fine matter or in an upper sub-zone portion of a fast bed of the fine particulate matter with a subposed contiguous bubbling slow bed of coarse particulate matter. Uses for the lower sub-zone portion occupied by the bubbling slow bed will be recognized from the aforementioned discussion of operational features for the six categories of carbonaceous matter.

SUMMARY OF APPARATUS FEATURES FOR MAKING RICH FUEL GAS WITHOUT USE OF SUBSTANTIALLY PURE OXYGEN

The invention also relates to improved apparatus for converting the abovedescribed six categories of carbonaceous matter to a rich fuel gas by treatment with hot steam and without use of substantially pure oxygen. There is provided a vessel housing contiguous upper and lower zones and a third zone subposed beneath the lower zone and contiguous therewith and a fourth zone superposed above the third zone and contiguous therewith and not in communication directly with the aforementioned lower or upper zone. There are means for introducing a gas comprising primarily steam as a fluidizing gas to the third zone. A part of the offgas from the third zone passes into the lower zone to providing at least a part of a fluidizing gas to the lower zone, and the remainder of the offgas from the third zone passes into the fourth zone to provide at least a part of a fluidizing gas to the fourth zone. Offgas from the lower zone passes into the upper zone to provide a part of a fluidizing gas to the upper zone. There are means for introducing a second gas as an additional part of a fluidizing gas to the upper zone. There are means for establishing a fast fluidized bed of a fine particulate matter in the upper zone, these means including means for withdrawing gas and the fine particulate matter from substantially the top of the upper zone, means for conducting the withdrawn gas and fine particulate matter to a means for substantially separating the gas from the fine particulate matter, and means for conducting the separated fine particulate matter in a slow fluidized condition from the separating means to substantially the bottom of the upper zone. There are means for establishing fluidized beds of the fine particulate matter in the lower and fourth zones and also at least an upper sub-zone portion of the third zone. The fluidized bed zones are at a temperature between about 850° F and about 2,650° F. There are means for furnishing to the aforementioned means for supplying a second gas to the upper zone a gas associated with an exothermic effect occurring either in the upper zone or in an additional fluidized bed zone provided in the vessel in thermal communication with the upper zone and not communication directly with the lower zone, as hereinbefore described. The second gas may be a causative agent in respect to the exothermic effect, if for example the gas is a gas hotter than the upper zone so that its cooling in this zone contributes heat to the zone, or if for example the gas is air or a gas containing oxygen and preferably when the fine particulate matter contains carbon. Alternatively, the second gas may be the gaseous product of chemical reactions producing the exothermic effect, as for example when an additional fluidized bed zone is subposed contiguously beneath the upper zone but is not in communication with the lower zone, when the particulate matter contains carbon, and when the additional fluidized bed zone receives as a fluidizing gas air or another gas containing oxygen and supporting combustion of the carbon.

The lower zone may be a fast fluidized bed of the fine particulate matter or a slow fluidized bed of the same fine matter, preferably a turbulent slow bed. The fourth zone may be a fast fluidized bed of the fine particulate matter or a slow, stationary bubbling or turbulent fluidized bed of the matter or a slow, quasi-stationary bubbling or turbulent fluidized bed, as hereinbefore described.

The third zone, at least in an upper sub-zone portion, may be a fast fluidized bed of the fine particulate matter if both lower and fourth zones are also fast beds. If either is a slow bed, so also should be the third zone.

The several zones are sometimes all advantageously fast fluidized bed zones save for a lower sub-zone portion of the third zone which comprises a subposed contiguous bubbling slow bed of coarse particulate matter, with uses as hereinbefore described.

Means are sometimes advantageously provided for arranging a fifth fast fluidized bed zone above a fast fluidized bed occupying the fourth zone, with means for introducing into the fifth zone a gas hotter than the aforementioned temperature of the fluidized bed zones and comprising primarily fuel values.

SUMMARY OF APPARATUS FEATURES FOR CONDUCTING ENDOTHERMIC CHEMICAL OR PHYSICAL TREATMENT OF MATTER AT ELEVATED TEMPERATURE

The invention also relates broadly to improved apparatus for conducting an endothermic chemical or physical treatment of matter at elevated temperature with opportunity for control of the gas atmosphere of the treatment independently of any gas associated with a step for providing heat to the treatment. There is provided a vessel housing contiguous upper and lower zones and a third zone subposed beneath the lower zone and contiguous therewith and a fourth zone superposed above the third zone and contiguous therewith and not in communication directly with the aforementioned lower or upper zone. There are means for feeding to the third or fourth zone matter for subjection to an endothermic chemical or physical treatment. There are means for introducing a gas as a fluidizing gas to the third zone. A part of the offgas from the third zone passes into the lower zone to provide at least a part of a fluidizing gas to the lower zone. The remainder of the offgas from the third zone passes into the fourth zone to provide at least a part of a fluidizing gas to the fourth zone. Offgas from the lower zone passes into the upper zone to provide a part of a fluidizing gas to the upper zone. There are means for introducing a second gas as an additional part of a fluidizing gas to the upper zone.

There are means for establishing a fast fluidized bed of a fine particulate matter in the upper zone, these means including means for withdrawing gas and the fine particulate matter from substantially the top of the upper zone, means for conducting the withdrawn gas and fine particulate matter to a means for substantially separating the gas from the fine particulate matter, and means for conducting the separated fine particulate matter in a slow fluidized condition from the separating means to substantially the bottom of the upper zone. There are means for establishing fluidized beds of granular material in the lower, third and fourth zones. The fluidized bed zones are at an elevated temperature. There are means for furnishing to the aforementioned means for supplying a second gas to the upper zone a gas having an exothermic effect in the upper zone. Heat from the exothermic effect passes by conduction from said upper zone to the lower zone and onward by conduction to the third zone to furnish endothermic heat to the aforementioned chemical or physical treatment of the aforementioned matter when the matter has been fed to the third zone. Heat from the exothermic effect passes onward by conduction from the third to the fourth zone to furnish endothermic heat to the treatment when the has been fed to the fourth zone. There are means for discharging the aforementioned separated gas from the aforementioned means for separating gas from fine particulate matter withdrawn from the upper zone. There are means for discharging gas from the fourth zone.

The fine particulate matter of the upper zone sometimes advantageously contains carbon, in which case the aforementioned second gas is advantageously a gas containing oxygen. The aforementioned exothermic effect is then produced by reaction of the gas containing oxygen with at least a part of the carbon to yield carbon dioxide and heat. The elevated temperature should be above the kindling temperature of the carbon, generally around 800° F or so.

Another second gas that is sometimes advantageous is a gas at a temperature higher than the aforementioned elevated temperature. The exothermic effect is then produced by the cooling of the gas as it enters the upper zone.

Sometimes it is advantageous to provide means for feeding a fuel to the upper zone, in which case the aforementioned second gas is advantageously a gas containing oxygen. The aforementioned exothermic effect is then produced by reaction of the fuel with the gas to produce combustion products including carbon dioxide and/or water vapor. Hydrogen gas is sometimes advantageously used as the fuel if it is important to keep the fine particulate matter and the granular material free of carbon.

The apparatus is well suited for conducting a wide range of chemical or physical treatments requiring heat, and a few examples will serve to illustrate the possibilities.

a. Heat treatment in controlled atmosphere

Each of the fluidized bed zones might advantageously be slow fluidized bed zones of the fine particulate matter except for the fast bed condition in the upper zone, and the matter to be treated might be metal objects that require a heat treatment of an elevated temperature, with the advantage that the atmosphere of the treatment in the fourth zone can be substantially free of combustion products arising from a combustion of a fuel with an oxygen-containing second gas to introduce heat into the upper zone and thence by conduction via lower and third zones into the fourth zone. The atmosphere can sometimes advantageously be a carbiding gas atmosphere or a nitriding atmosphere or another atmosphere to produce a desire surface effect on the treated metal objects. The metal objects may be introduced high in the fourth zone and allowed to fall through the fourth zone and removed at the bottom of the third zone.

b. Chemical separation of oxygen from air

The arrangement can be used to separate oxygen from air by causing the oxygen in air to be absorbed by a suitable solid reagent. Barium oxide or a promoted strontium oxide are suitable abosrbents of oxygen to form barium or strontium peroxide. The absorbent would advantageously be provided in fine particulate form. The lower, third, and fourth zones would advantageously contain fluidized beds of the fine particulate oxygen-absorbing solid. Fluidizing gas to the third zone would advantageously be steam. The second gas introduced into the upper zone would be air heated to a temperature above the elevated temperature of the beds, and the exothermic effect would arise in part from the cooling of the air as it enters the fourth zone and also in part from the exothermic heat of the reaction whereby oxygen is absorbed from the air by the solid absorbent. Oxygen would desorb endothermically in the fourth zone, the supply of oxygen-rich absorbent to the fourth zone taking place by eddy diffusion of the solid from the upper zone through the lower zone into the third zone and from the third zone into the fourth zone. A return flow of oxygen-lean absorbent from the fourth zone to the upper zone would occur also by eddy diffusion in the fluidized bed zones. In this use of the apparatus, at least a lower sub-zone portion of the lower zone and also the third zone would advantageously contain a slow fluidized bed of the absorbent, to minimize the desorption of oxygen from the absorbent in the third zone and minimize the return flow of oxygen gas from the third zone to the upper zone. At least an upper sub-zone portion of the fourth zone would advantageously contain a fast fluidized bed of the absorbent to achieve good capacity for oxygen desorption and to provide a large flow of steam to sweep oxygen from the absorbent by reducing the oxygen partial pressure in the gas leaving the fourth zone. To establish a fast fluidized bed in the fourth zone, there would be means for introducing additional steam as fluidizing gas to the fourth zone, means for withdrawing gas and the fine particulate matter from substantially the top of the fourth zone, means for conducting the withdrawn gas and fine particulate matter to a means for substantially separating the gas from the fine particulate matter, and means for conducting the separated fine particulate matter in a slow fluidized condition from the separating means to substantially the bottom of the upper zone. There would also be means for discharging the separated gas, which would comprise a mixture of oxygen and steam. A gasification medium comprising oxygen and steam may advantageously be derived from the gas, either by adding more steam or by using the gas as is or by condensing a part of the steam in the gas in a heat exchange against water to rinse steam at a somewhat lower pressure, the latter steam being advantageously boosted in pressure by a blower to supply a part of the fluidizing gas to the apparatus of the invention for separating oxygen from air.

c. Calcination of Calcium carbonate

Another arrangement can advantageously serve to calcine an alkaline earth carbonate in a gas atmosphere containing no carbon dioxide except carbon dioxide arising from the chemical decomposition of the carbonate. The arrangement would be advantageous for decomposing calcium carbonate or the calcium carbonate potion of half-calcined dolomite, $[CaCO_3+MgO]$, that has arisen from the so-called carbon dioxide acceptor process for gasifying a lignite or from the regeneration of calcium sulfide or sulfided calcined dolomite, $[CaS+MgO]$, that results from use of calcium oxide or calcined dolomite, $[CaO+MgO]$, or the aforementioned half-calcined dolomite when these species are used to remove hydrogen sulfide from a fuel gas, the regeneration being effected by reaction of calcium sulfide with steam and carbon dioxide at elevated pressure in accordance with the teaching of U.S. Pat. No. 3,402,998 (Sept. 24, 1968). A problem arises in the calcination of calcium carbonate for these uses of the calcined product at pressure because the temperature needed to decompose calcium carbonate in presence of a combustion product containing carbon dioxide and at high pressure is so high that the reactivity of the solid suffers in subsequent use for absorbing carbon dioxide or hydrogen sulfide. Also, it would be advantageous to recover valuable carbon dioxide from the decomposition of the calcium carbonate relatively free of nitrogen gas. In the apparatus of the invention, the fine particulate matter of the upper zone would advantageously be an inert solid to which a fuel is supplied, and the second gas to the upper zone would be a gas containing oxygen, preferably air. At least a lower sub-zone portion of the lower zone, and suitably substantially the entire lower zone, would house a slow fluidized bed of a coarser granular material, sufficiently coarse that the fine particulate matter of the upper zone does not penetrate very far into the bed of coarser material by eddy diffusion, but remains substantially within the upper zone. The third zone and at least a lower sub-zone of the fourth zone would also house a slow fluidized bed of the coarser granular material. If the material to be calcined is a fine particulate material, it is advantageously arranged in a fast fluidized bed zone occupying an upper sub-zone of the fourth zone. The third zone would be fluidized by steam. If the coarser granular material is sufficiently large, the fluidizing gas velocity to place this material into the slow fluidized condition may be large enough to place the fine particles to be calcined into the fast fluidized condition, with use of the aforementioned means described earlier in connection with the separation of oxygen from air. If the velocity of the steam entering the upper sub-zone of the fourth zone is not sufficient, additional steam would be added by a suitable means located at the boundary of lower and upper sub-zone of the fourth zone. There would be means for introducing the fine particulate material to be calcined into the fourth zone, and means for removing calcined product. Gas discharged from the fourth zone would comprise a mixture of carbon dioxide and steam, from which substantially pure carbon dioxide could be recovered as a valuable product, or a mixture of steam and carbon dioxide for the aforementioned regeneration of calcium sulfide. If the material to be calcined is large in particle size, as is the case in the spent calcium carbonate that results from an embodiment of the carbon dioxide acceptor process for gasifying lignite that is being studied experimentally on a large scale, the material to be calcined advantageously conprises the aforementioned coarser granular material of the lower zone and third zone and also provides a granular material for a slow fluidized bed in the fourth zone. A mixture of carbon dioxide and steam would be withdrawn from the fourth zone. A portion of the carbon dioxide would be lost in the offgas from the lower zone entering the upper zone, but the arrangement can readily be devised in a manner such that this portion is a relatively small fraction of the carbon dioxide produced by decomposition of the calcium carbonate treated.

In another embodiment for calcining calcium carbonate, the calcium carbonate feed would comprise the fine particles of this material that arise when lime is used to purify water in a variety of waste streams from industry and sewage treatment installations. By a known technique, the calcium carbonate feed would contain a small admixture of sodium carbonate and would be furnished by suitable means to a flow fluidized bed of lime pellets occupying a lower sub-zone portion of the third zone. Calcination of the feed would cause, by this known technique, the calcium oxide to accrete upon the pellets causing them to grow. There would be means for discharging pellets from the third zone. The remaining zones of the apparatus, including an upper sub-zone portion of the third zone, would advantageously house fast fluidized beds of a fine particulate solid appreciably smaller in size that the lime pellets. A fuel and air would advantageously be furnished by suitable means to the upper zone to provide the aforementioned exothermic effect. The arrangement offers the advantage that offgas from the fourth zone would comprise a mixture of carbon dioxide and steam, from which substantially pure carbon dioxide could be recovered as a valuable product. The loss of carbon dioxide in the part of the offgas from the third zone which enters the lower zone can be minimized by directing jets of steam against the flow of gas from third to lower zone in a way to deflect gas from the third zone into the fourth zone and to replace this gas by steam to enter the lower zone.

A modification of the lastdescribed embodiment for calcining calcium carbonate can serve also to calcine relatively large lumps of calcium carbonate, practicably in sizes up to about 1 inch, which would be fluidized in a lower sub-zone of the third zone in a slow fluidized bed. Means for supplying lamp calcium carbonate to this sub-zone and means for withdrawing lump calcium oxide product would be furnished. In other respects the modification would resemble the referenced embodiment, with the advantages that calcination can be effected at a precisely controlled temperature without risk of deadburning the lime product and that a relatively pure carbon dioxide product can be recovered from the gas from the fourth zone.

In all of the operations for calcining calcium carbonate, the appropriate elevated temperature is determined by the operating pressure and the desired content of carbon dioxide in the offgas from the fourth zone together with the equilibrium decomposition pressure of calcium carbonate as a function of temperature. The temperature selected should preferably be such that the equilibrium decomposition pressure is at least about 25% greater than the desired partial pressure of carbon dioxide in the offgas.

d. Oxidizing ferrous chloride pickle liquor

In a known procedure, ferrous chloride arising from the pickling of steel in hydrochloric acid is decomposed in a reaction with steam and oxygen in presence of the combustion of a fuel to provide heat for evaporating water that accompanies the ferrous chloride and to sustain an elevated temperature in the operation. In the known operation, the decomposition of the ferrous chloride is conducted in a fluidized bed of iron oxide pellets about 1/12 inch in diameter, with accretion of fresh iron oxide product of the decomposition by the pellets, which are discharged as a product. The reaction is $$2 FeCl_2 + 2 H_2O + 0.5 O_2 = Fe_2O_3 + 4 HCl$$

Hydrogen chloride gas resulting from the operation is absorbed by water to provide hydrochloric acid. The procedure could be improved upon with use of the apparatus of the instant invention by separating the combustion from the zone for decomposing ferrous chloride, with the benefit that the quantity of gas to be scrubbed to remove hydrogen chloride gas would be reduced, or that a pure hydrogen chloride gas might be provided by employing oxygen in the above reaction while still using air in the fuel combustion to furnish heat. The bed of iron oxide pellets for conducting the reaction could occupy a lower sub-zone portion of the third zone, while the remaining zones could advantageously be fast fluidized bed zones of a finer powder, with suitably placed jets of steam to deflect as much as possible of the offgas from the third zone to prevent the deflected gas from entering the lower zone and causing it to enter the fourth zone. Alternatively, the iron oxide pellets could provide a slow bed in the entire third zone and in at least a lower sub-zone portion of the lower zone and in the fourth zone with feed of ferrous chloride and oxygen to the fourth zone so that the fourth zone becomes the scene for conducting a major part of the above reaction. In either alternative, the fluidizing gas to the third zone would be steam.

e. Reducing iron oxide

Another known procedure is for reducing fine iron oxide particles in a bed of iron beads fluidized by hydrogen gas at high velocity and at temperatures beyond about 1,400° F [see U.S. Pat. No. 3,053,648, (Sept. 11, 1962)], with accretion of an iron product of the reduction upon the beads. The heat requirement for this procedure is large. The proposals of the cited U.S. Patent visualized providing the heat requirement either by transfer of heat from an external combustion across a surface enclosing the fluidized bed of iron beads or by supply of the hydrogen at a temperature higher than the temperature of the fluidized bed. The first procedure for supply of heat is completely impractical for a large-scale bed reducing iron at throughputs on the scale of hundreds or thousands of tons per day, and the procedure is also not attractive if modified so that the combustion heat can be provided to the bed by heat transfer from the interior of tubes placed within the fluidized bed on account of the expense for providing the tubes and other disadvantages. Simple calculation shows that the second procedure requires a temperature in the hydrogen well beyond 2,000° F for an operation in which the fluidized bed is at the preferred temperature of about 1,550° F, unless the conversion of the hydrogen to water by the reduction is held to a level far below the conversion level that might be afforded according to the equilibrium conversion of hydrogen to water in presence of iron and iron oxide. Such a high temperature is difficult to achieve and requires unusual arrangements for transfer of heat to the hydrogen that involve either expensive heat transfer surface fabricated of exotic materials or a heat exchange between the hydrogen and a hot heat-carrying solid. The apparatus of the instant invention provides a better procedure for introducing heat into a slow fluidized bed of iron beads, a procedure that does not require expensive heat transfer surface or handling a heat-carrying solid at a temperature beyond 2,000° F. The slow bed of beads advantageously occupies a lower sub-zone portion of the third zone, and a fine particulate material is advantageously arranged in fast fluidized bed zones elsewhere in the apparatus. The fine material is suitably fine iron oxide or also suitably a fine powder of another solid. Offgas from the bed of iron beads contains much valuable hydrogen, even according to the aforementioned equilibrium conversion, and the abovedescribed jets of steam are advantageously provided to reduce the part of the offgas from the third zone that enters the lower zone. Air is suitably the second gas provided to the upper zone, to produce an exothermic effect resulting from the combustion of any hydrogen that reaches the upper zone together with additional fuel supplied to this zone.

f. Other applications including treatments at short gas products residence time

The instant apparatus can also be used for a wide variety of other endothermic chemical or physical treatments of matter at elevated temperature, such as the drying of coal with recovery of subtantially pure steam as offgas from the drying zone, or the drying of another granular solid, or other metal reductions, or other calcinations, such as the decomposition of a hydroxide such as aluminum hydroxide, or other endothermic chemical transformations of matter especialy transformations that produce a valuable gaseous chemical species whose recovery in substantially pure form and admixed only with substantially pure steam is a desirable objective and especially without admixture of products of a combustion used to supply heat to the endothermic transformation.

The apparatus is exceptionally well suited for carrying out an endothermic chemical treatment at high temperature in a short time, including times as short as a few tenths of a second. The fourth zone would be arranged as a fast fluidized bed zone of a fine particulate material, as hereinbefore described, and matter to be subjected to the treatment at a short residence time would be introduced into the fourth zone at an elevation such that its residence time in the zone is suitably short. This arrangement takes advantage of the plug flow character of the gas flow upward through a suitably arranged fast bed zone, as hereinbefore elucidated. If an especially short residence time of the matter at treatment temperature is desired, the matter could even be introduced substantially at the outlet from the fourth zone, so that the treatment would take place in the aforementioned means, suitably a cyclone gas-solid separator, for separating fine particulate material and gas withdrawn from the fourth zone and serving as a part of the means for arranging the fine material as a fast fluidized bed in the fourth zone.

The carbonizing of coals and the cracking of petroleum fractions and of residual oils at short residence time to yield a fuel gas containing valuable amounts of ethylene has already been described above. Ethane may also be cracked to ethylene in an operation between about 1,700° F and about 1,900° F at residence time preferably less than about 1 second.

Methane may be pyrolyzed to carbon and hydrogen.

Methane, ethane, coals and lignites, petroleum fractions, and residual oils may be cracked to form acetylene by operating at a temperature beyond about 2,000° F and preferably beyond about 2,200° F and at residence times on the order of 1 second or preferably less.

In addition to the abovedescribed procedures for treating coals and lignites with steam, such carbonaceous matter may also advantageously be treated in the apparatus of the instant invention at elevated pressure with mixtures of steam and hydrogen or mixtures of steam and hydrogen and carbon monoxide in a hydrogasification at a temperature preferably between about 1,400° F and about 1,900° F. Such carbonaceous matter may also be treated with substantially pure hydrogen at elevated pressure in this apparatus for conversion to a gas rich in methane at similar temperatures, and often advantageously at a short residence time of the gas and vapor product of the treatment at the treatment temperature to obtain a valuable yield of benzene, in accordance with the disclosures in my aforementioned co-pending application Ser. No. 410,070.

BRIEF DESCRIPTION OF THE DRAWINGS

The invention including various novel features will be more fully understood by reference to the accompanying drawings and the following description of the operation of the apparatus illustrated therein:

FIGS. 5A, 5B, 5C, 5D, 5E, 5F, 5G, 5H, and 5I are schematic diagrams illustrating features of alternative four-zone embodiments of the invention for producing a rich fuel gas from a carbonaceous matter without use of substantially pure oxygen, and also adapted for conducting an endothermic chemical or physical treatment of matter at an elevated temperature.

DESCRIPTION OF THE PREFERRED EMBODIMENTS

Figure 1:
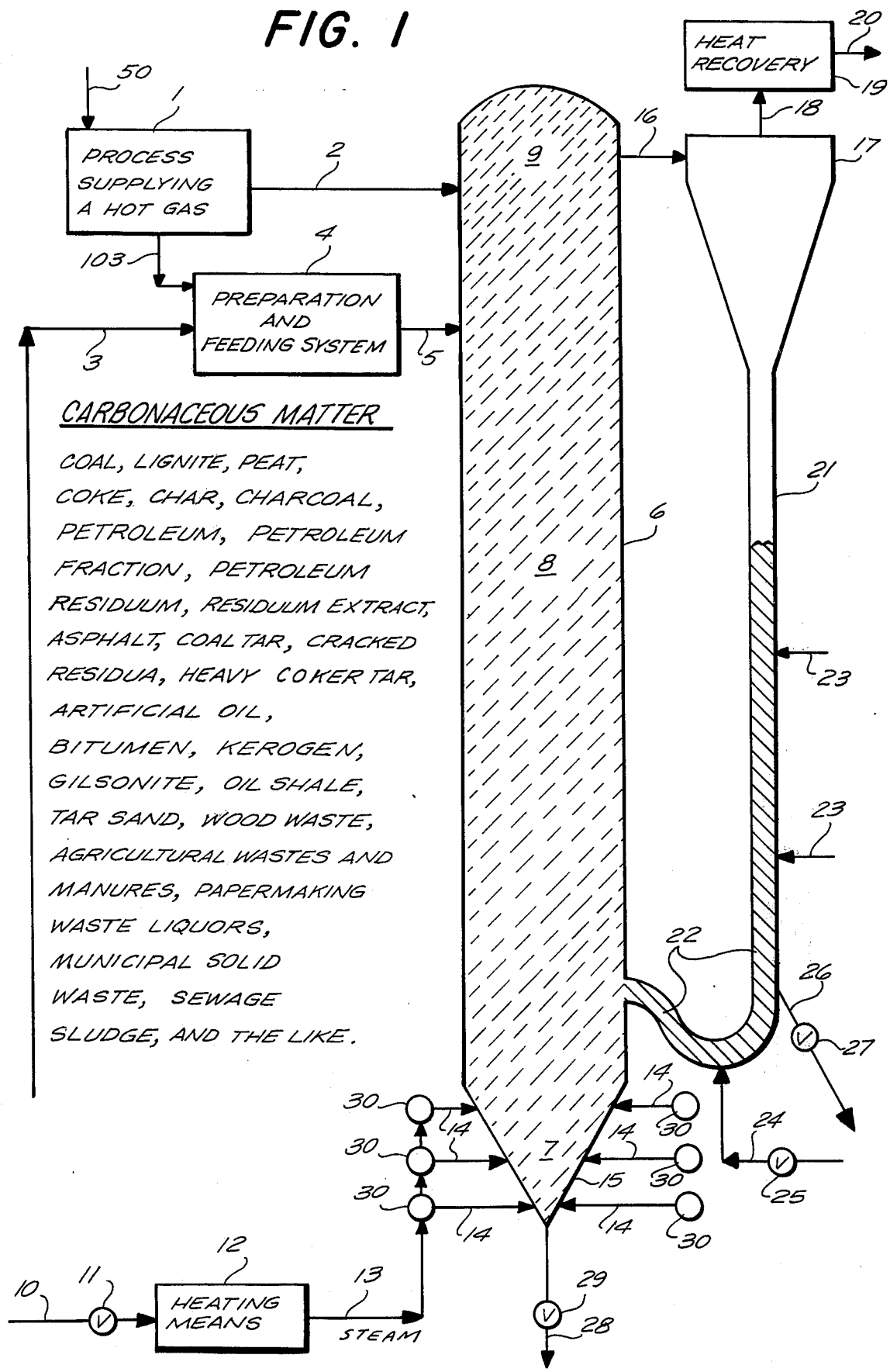
FIG. 1 is a schematic diagram of at two-zone embodiment of the invention in which the fuel gas product of a treatment of carbonaceous matter by hot steam becomes admixed with a hot gas associated with the supply of heat to the treatment.

In the several figures, like reference numerals refer to like parts having like functions, and a part and its function will in general be described only once, and in general the description will be in connection with the first figure in which the part appears.

In FIG. 1, line 50 broadly represents pipes or lines or chutes or other means for supplying matter, often matter of several kinds, to process 1 for supplying a hot gas. Process 1 might, for example, advantageously comprise a combustion of a fuel by air to yield a hot combustion product gas. Process 1 might also advantageously comprise a gasification of a carbonaceous matter by steam or mixture of air and steam or a mixture of oxygen and steam to yield a hot fuel gas containing carbon monoxide and also often hydrogen. Suitable carbonaceous matter for the gasification may be selected from one of the aforementioned six categories of carbonaceous matter, some representative examples of which appear listed alongside line 3 of FIG. 1. Process 1 might sometimes advantageously comprise a process for carbonizing or cracking a carbonaceous matter also selected from the six categories, to yield a hot fuel gas. Process 1 might advantageously comprise an operation for melting or refining a metal or metal alloy through the agency of carbon and oxygen or electricity and discharging a hot gas comprising substantially pure carbon monoxide.

Hot gas from process 1 flows through line 2 into vessel 6 which houses contiguous fast fluidized bed zones 8 and 9 of a fine particulate material preferably between about 20 and 150 microns in size and preferably fluidized at a velocity between about 10 and 15 feet per second, although particle sizes and velocities outside of these ranges can often give satisfactory performance, as hereinbefore elucidated. The point of introduction of the hot gas from line 2 into vessel 6 marks the boundary between zone 8 and zone 9, which constitutes the more or less irregular interzone surface or region across which offgas from zone 8 flows as it becomes admixed with the gas entering from line 2. Sometimes it is advantageous to provide more than a single line 2, so that the hot gas is introduced into vessel 6 at several points at preferably about the same elevation; with this arrangement, the boundary between zone 8 and zone 9 becomes somewhat less irregular. In the drawing of FIG. 1, the boundary between contiguous zones 8 and 9 is designated by the wavy oval line 89, which is not to be interpreted as representing a structural element.

The fluidized bed zones 8 and 9 are at a temperature between about 850° F and about 2,650° F.

Steam is supplied from line 10 via valve 11, heating means 12, and line 13 to several circular ring pipes 30 (of which three are shown in the drawing but more than three are often advantageously provided), from each of which a multiplicity of pipes 14 supply the heated steam to portion 15 of vessel 6, which is preferably in the form of a conical bottom to the vessel with the cone having an included angle of about 60°. Fluidized bed zone 7 occupies the conical bottom, and is to be viewed as a sub-zone portion of zone 8, as further elucidated hereinafter.

Carbonaceous matter is supplied from means 3, which comprises a suitable pump or pipe or chute or even a device dealing with a batch at a time such as a shovel. The carbonaceous matter from means 3 is prepared in system 4, if necessary, and system 4 also includes means for feeding the carbonaceous matter via connection 5 to vessel 6, preferably at a mid-elevation of zone 8. System 4 may include, as required or desirable, drying means and crushing or grinding means or other means for comminution and, in case of municipal solid waste, sorting and discarding means to reduce the inorganic matter content of the carbonaceous matter. If the vessel 6 is at an elevated pressure, as is sometimes desirable, system 4 should include a suitable pump if the carbonaceous matter is liquid or a suitable lock system if the matter is solid.

If process 1 is a gasification or a carbonization or a cracking of a carbonaceous matter, it will sometimes occur that process 1 discharges a carbon residue, which is a suitable carbonaceous matter for feeding to vessel 6. In such a case, optional line 103 is provided to convey the carbon residue from process 1 to system 4 for feeding via line 5.

The fast fluidlized bed zones 8 and 9 are maintained in a fast fluidized condition by withdrawing gas and the fine particulate material from substantially the top of zone 9 via line 16, which conducts the withdrawn gas and fine material to cyclone gas-solid separator 17. Separator 17 discharges gas substantially freed of the fine matter via line 18 to heat recovery means 19, from which gas is discharged via line 20. Separator 17 discharges the separated fine particulate material to standpipe-and-U-tube 21 housing space 22 in which the fine matter is maintained in a slow fluidized condition by addition of gas from line 24 and if necessary also from optional aeration pipes 23. Standpipe-and-U-tube 21 conducts the fine material into substantially the bottom of zone 8 at a rate governed by the rate of flow of gas from line 24, which is controlled by valve 25. The rate of flow is sufficient to maintain a fast fluidized bed condition in zone 8 and zone 9, as hereinbefore elucidated.

It is convenient to regard zone 7 in conical bottom 15 as simply a lower sub-zone portion of zone 8, since the fluidized solid density in zone 7 in substantially the same as or only somewhat greater than the density in zone 8. The particulate material enters zone 7 by downward spill from zone 8. This downward spill will be understood in light of the above description of a fast fluidized condition, with its rapidly rising and falling strands of solid material.

As hereinbefore discussed in sections dealing separately with the various categories of carbonaceous matter, the fine particulate material of zones 8 and 9 may sometimes advantageously comprise carbon particles arising from the carbonaceous matter or particles of an inorganic solid including sometimes calcium carbonate to capture hydrogen chloride gas if the carbonaceous matter is municipal solid waste or another matter containing chemical species whose treatment by steam at the abovespecified temperature would release such gas.

If the fine particulate material of zones 8 and 9 comprise carbon or a mixture of carbon and ash matter, when for example the carbonaceous matter in line 5 is a coal or a lignite or a coke derived from a coal or a lignite, it is sometimes advantageous that process 1 be a process for the combustion or gasification of carbonaceous matter including at least as part of the supply of the carbonaceous matter to process 1 some of the fine particulate matter. For this purpose, some of the fine particulate matter can be withdrawn from zones 8 and 9 via line 28 governed by valve 29, and/or from space 22 via line 26 governed by valve 27. The withdrawn fine material can be furnished to supply means 50 via connections not shown in FIG. 1.

The hot gas in line 2 should be at a temperature above the temperature selected for fluidized bed zones 8 and 9. The cooling of the hot gas as it enters zone 9 and mixes with offgas from zone 8 at the abovedefined boundary 89 between zones 8 and 9 has an exothermic effect in zone 9, adding heat to zone 9, which flows by thermal conduction from zone 9 to zone 8 to sustain endothermic reactions of the carbonaceous matter as it undergoes treatment by contact with the steam provided from lines 14 to zone 8. As hereinbefore elucidated, zones 8 and 9 can be suitably arranged to have relatively little backmixing of gas within the zones and especially backmixing of gas from zone 9 to zone 8. Accordingly, the treatment in zone 8 has the advantage of a high partial pressure of steam, undiluted by nitrogen, for example, if process 1 is an air combustion or an air gasification.

It should be appreciated that process 1 may sometimes advantageously be a second operation according to the procedure of the instant invention, including an operation using a second installation of apparatus according to the schematic diagram of FIG. 1 or of apparatus according to diagrams to be seen in figures yet to be described herein. In such a case, the second operation often advantageously discharges a solid containing carbon via line 103 to serve as a carbonaceous matter feedstock to vessel 6 of FIG. 1.

Heat recovery means 19 is advantageously a panel bed gas-solid contacting device arranged to provide countercurrent heat exchange between the hot fuel gas in line 18 and a cold granular material to serve as a heat carrier, in accordance with teachings of my aforementioned co-pending applications Ser. Nos. 501,277 and 507,398, with the advantage that such a device can remove substantially the last trace of dust from the fuel gas while at the same time recovering heat. If this option for heat recovery means 19 is selected, heating means 12 is also advantageously a panel bed gas-solid contacting device in accordance with the aforementioned teachings wherein steam is heated by countercurrent contacting with the hot granular material heat carrier supplied from means 19.

If the carbonaceous matter from line 3 is a caking bituminous coal, it may advantageously be ground to a fineness preferably smaller than about 20 mesh and charged to fast bed 8 without risk of forming a massive agglomerate, because the turbulent conditions of the particulate mass in fast bed zone 8 supply heat to the fine coal particles and disperse the particles with a speed to prevent their coming together in a molten mass to produce such an agglomerate.

If process 1 is a combustion, the hot gas in line 2 will ordinarily contain elemental oxygen in an amount that will depend upon the excess oxygen or excess air supplied to the combustion in respect to the stoichiometric requirement just to completely burn the fuel supplied to the combustion process 1. There is no particular harm in such presence of oxygen in the hot gas in line 2, since it will simply burn some of the fuel gas produced in zone 8, or preferably, the arrangement for introducing gas from line 2 into zone 9 can cause much of the oxygen to burn carbon particles if any are present in zone 9 rather than fuel gas values. Such burning of fuel gas or carbon in zone 9 of course increases the exothermic effect caused by the gas from line 2.

It will also be recognized that process 2 and line 50 may be omitted entirely if carbon particles are present in zone 9, and the gas in line 2 may simply comprise air or another gas containing oxygen, hot or otherwise.

Figures 2, 3:
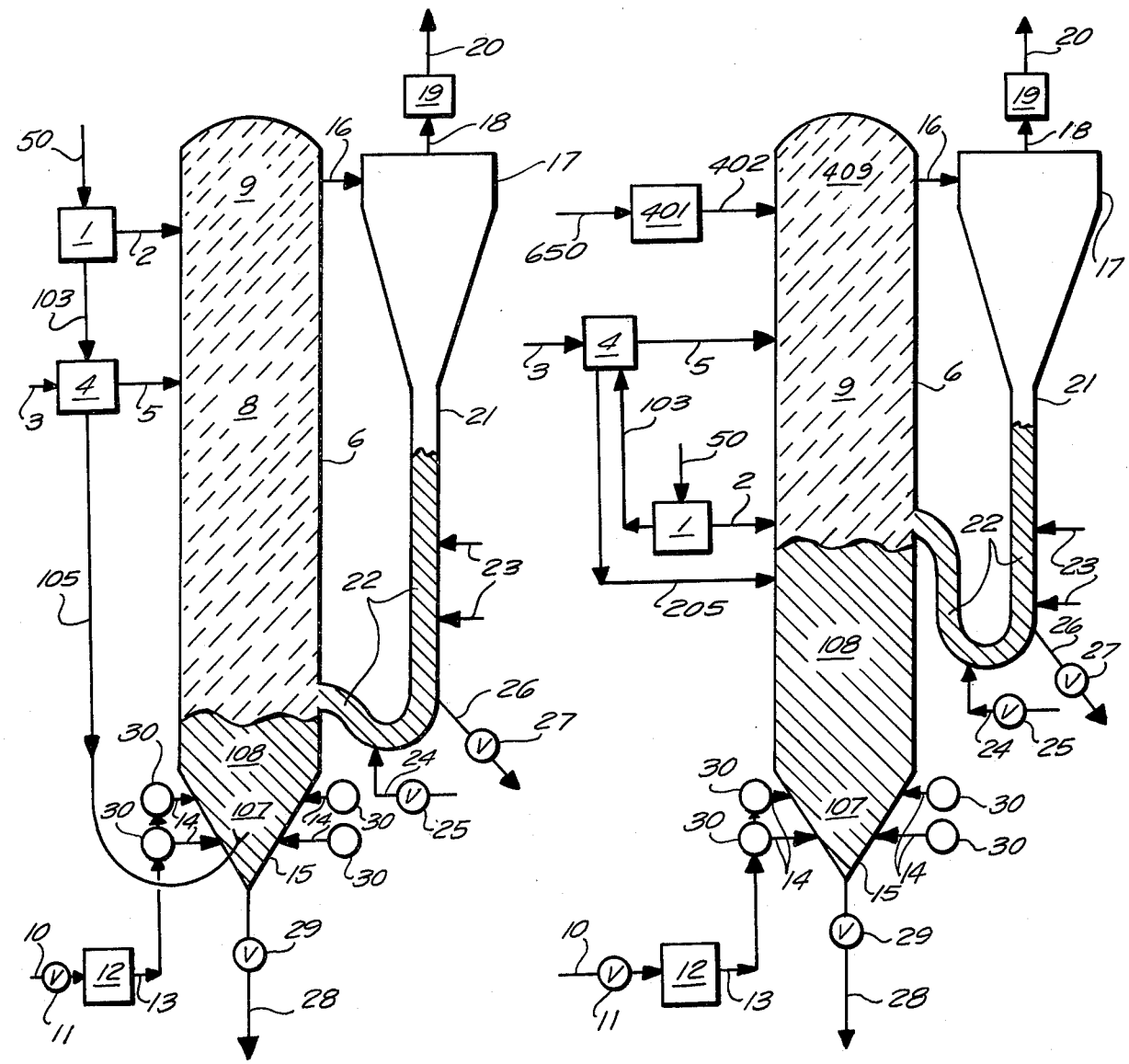
FIGS. 2, 3, and 4 are schematic diagrams of alternative two-zone embodiments in which the aforementioned fuel gas product becomes admixed with a hot gas associated with supply of heat.

Turning now to FIG. 2, one sees a slow fluidized bed zone 108 of a coarse granular material subposed beneath zone 8 and contiguous therewith and in good thermal communication therewith. Zone 108 is fluidized at substantially the same velocity as zone 8, but because of the difference in particle size between the two zones, zone 108 is preferably a bubbling slow fluidized bed of the coarse granular material, assuring excellent thermal communication between zone 108 and zone 8, while the fine particulate material of zone 8 is in a fast fluidized condition. Region 107 is a sub-zone portion of zone 108 occupying the conical bottom 15.

If the carbonaceous matter from line 3 is a coal or a lignite, the matter is advantageously crushed to a size smaller than about ¾ inch and fed via line 5 to zone 8. Larger particles in the matter will fall into zone 108, to coke therein, so that zone 108 will contain large particles of coke arising from the coal or lignite. If the temperature is above about 1,900° F, ash agglomerates form and grow in zones 107 and 108 and are substantially free of carbon. They may advantageously be withdrawn via line 28 (valve 29 being omitted) and further dealt with in a manner selected according to the teachings of my aforementioned co-pending applications filed simultaneously with the instant application.

If the carbonaceous matter is a municipal solid waste, it is advantageously fed via line 5 in comminuted form with the larges particle roughly 1 inch in size. Zone 107 and zone 108 advantageously comprises in greater part coke particles roughly 1/12 to ½ inch in size where the coke is selected to be relatively unreactive toward in steam at the temperature of the treatment and is supplied to zone 8 along with the carbonaceous matter. Glass and other sticky materials present in the municipal waste tend not to stick to the coke, but tend to form agglomerates that remain freely fluidized and may be withdrawn via line 28, together with larger inorganic moieties of the municipal waste that fall into zone 107 and zone 108.

If the carbonaceous matter is a municipal solid waste, the fine material of zone 8 advantageously contains at least a portion of calcium carbonate, or calcium oxide arising from calcium carbonate, in order to capture hydrogen chloride gas that may be evolved from the steam treatment of the waste.

If the carbonaceous matter is a caking bituminous coal, the abovedescribed procedure for feeding the matter in a crushed form is suitable, but it will perhaps sometimes be preferred to bring the coaly substance into intimate contact with steam more quickly than is the case if some of the coaly substance is present in lumps as large as ¾ inch. In such a case, the coal may be ground preferably to a fineness smaller than about 100 mesh and fed to a bed of coke pellets in a slow bubbling fluidized condition in zone 107 and zone 108 via a multiplicity of lines 105 (only one line 105 is shown for convenience in drawing FIG. 2). The temperature is preferably below about 1,800° F and also preferably above about 1,000° F. As hereinbefore explained, the caking coal will melt and react to form fuel gases or vapors leaving a coke residue accreting upon the pellets, which are advantageously withdrawn as a product of the operation via line 28.

Turning now to FIG. 3, one sees the slow fluidized bed zone 108 to be deeper than in FIG. 2, and hot gas from process 1 is introduced directly above slow bed zone 108, so that the boundary between zone 9 and zone 108 occurs substantially at the upper bed level of bed zone 108.

The arrangement of FIG. 3 is useful for recovering heat from a gasification process that plays the role of process 1 in respect to the arrangement. For example, process 1 of FIG. 3 might be a process according to FIG. 1 or FIG. 2 dealing with a coal or a lignite and discharging a fine coke powder from either line 26 or line 28 of the FIG. 1 or FIG. 2 arrangement. Such a fine coke powder could advantageously be supplied via line 103 to means 4 of FIG. 3, for supply to zone 9 via line 5 or to zone 108 via line 205. Line 3 would be omitted. Zone 108 would preferably be a deep bubbling or turbulent slow bed of the powder, providing a large inventory of carbon to promote the steam-carbon reaction relative to the flow of steam through zones 107 and 108. If the coal gasified by process 1 is a bituminous coal, the temperature of the bed zones 9, 108, and 107 of FIG. 3 is preferably between about 1,600° and 1,750° F. If lignite is gasified in process 1, the temperature of the bed zones is preferably lower, between about 1,450° F and 1,600° F. With the extraction of heat from the fuel gas from process 1, preferably entering vessel 6 of FIG. 3 at a temperature about 200° F above the temperature of the bed zones in FIG. 3, the overall gasification efficiency of the two-step gasification process is greatly improved over that provided by a one-step process 1 acting by itself.

If a large content of methane is desired, FIG. 3 is advantageously used as the first step in a process for gasifying a bituminous coal or a coal of lower rank including a lignite at elevated pressure. The first step would advantageously be conducted at as low a temperature as possible without the appearance of tar species in undue quantities in line 18. The temperature will in general be found to be above about 1,600° F. The coal would be fed from line 3 and via line 5. Process 1 would advantageously comprise a second gasification step operating at a higher temperature, preferably the process of the instant invention, and gasifying fine coke particles withdrawn from FIG. 3 via line 26 or gasifying coarse coke particles withdrawn via line 28, if the coal has been fed in coarse sizes so that zones 107 and 108 comprise a slow bubbling fluidized bed of coarse coke. In general, the heat supplied to vessel 6 in the hot gas of line 2 from a gasification process 1 will not be sufficient to treat the raw coal introduced into vessel 6. When such is the case, additional process 401 is advantageously provided to provide additional heat in form of a hot gas introduced into zone 409 superposed above zone 9 and contiguous therewith. Means 650, 401, and 402 have the various optional attributes already discussed in respect to means 50, 1, and 2 respectively.

Figure 4:
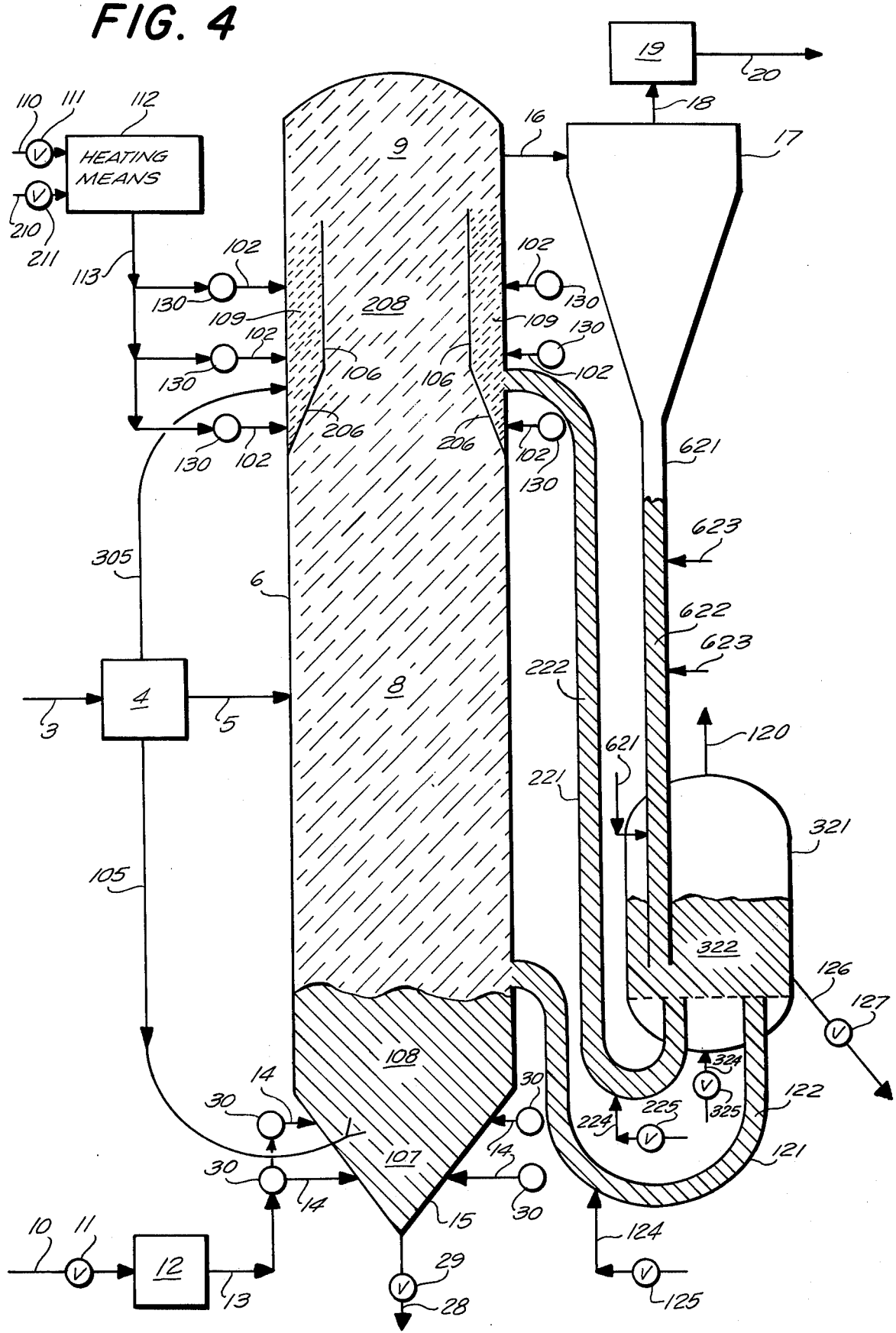

FIG. 4 is a varient of FIG. 2 and useful for much the same objectives. A circular partition 106 is mounted within vessel 6 together with frusto-conical segment 206 to create an additional fluidized bed zone 109 in an annular space between partition 106 and segment 206 and the outer wall of vessel 6. The arrangement is especially useful if the fine particulate material of zone 8 and 9 and the sub-zone 208 of zone 8 constituting the space surrounded by partition 106 and segment 206 contains carbon arising from the carbonaceous matter being treated. In such a case, a gas containing oxygen can advantageously be introduced into fluidized bed zone 109 from a multiplicity of pipes 102, to support combustion of the carbon in zone 109 and thereby to introduce heat into zone 109 which passes by conduction to zone 9. The gas containing oxygen is often advantageously air furnished to heating means 112 from source 110 via valve 111 and delivered from heating means 112 to several circular pipes 130, each of which serves a multiplicity of pipes 102 with air. Sometimes the gas containing oxygen is preferably a mixture of oxygen and steam, each of which may advantageously be supplied separately to heating means 112 from sources 110 and 210 via valves 111 and 211 respectively, admixed with one another in heating means 112, and delivered via line 113 to circular pipes 130 and thence to pipes 102. Wavy oval line 89 marks the boundary between contiguous zone 9 and sub-zone 208 of zone 8. Wavy oval lines 99 mark the boundary between contiguous zones 9 and 109.

If the fine particulate material of zones 8, 208, and 9 does not contain sufficient carbon to support adequate combustion in zone 109, carbonaceous matter may be supplied to zone 109 from preparation and feeding system 4 via line 305.

Zone 109 may be a slow bubbling or turbulent fluidized bed zone, or sometimes advantageously a fast fluidized bed zone as illustrated in FIG. 4, wherein standpipe 621 delivers fine particulate material from cyclone separator 17 in form of slow fluidized mass 622 to slow fluidized bed zone 322 housed in vessel 321. Standpipe 621 may be aerated by optional lines 623. Zone 322 is fluidized by a gas, advantageously steam, from line 324 controlled by valve 325. Offgas from vessel 321 is discharged via line 120, often advantageously into line 18 if fluidizing gas from line 324 is steam. Fine particulate material is delivered from zone 322 via standpipe-and-U-tube 121 carrying slow fluidized material 122 into substantially the bottom of zone 8, the rate of flow in 121 being governed by flow of aerating gas from line 124, regulated by valve 125. Fine particulate material is delivered from zone 322 via standpipe-and-U-tube-and-riser 211 carrying slow fluidized material 222 into substantially the bottom of zone 109, the rate of flow in 221 being governed by flow of aerating gas from line 224, regulated by valve 225. The rates of flow in 121 and 221 are sufficient to maintain a fast fluidized bed condition in zones 8 and 109 respectively.

DESCRIPTION OF THE PREFERRED EMBODIMENTS FOR MAKING RICH FUEL GAS WITHOUT USE OF SUBSTANTIALLY PURE OXYGEN

Figure 5A:
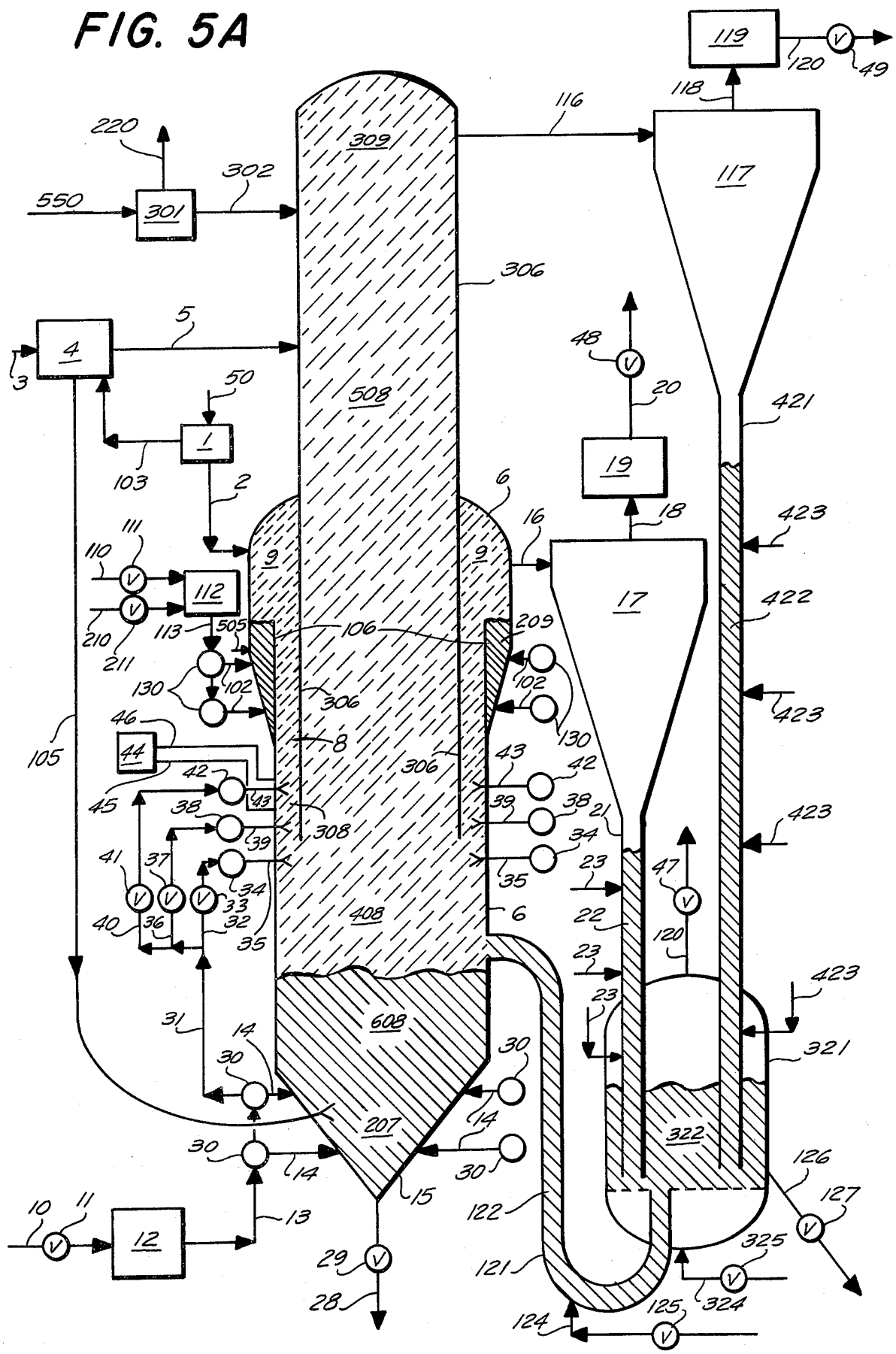

FIG. 5A is an embodiment for production of rich gas without the need to use substantially pure oxygen, although oxygen may be supplied from source 110 if desired as hereinbefore described in connection with the operation of zone 109 of FIG. 4. Zone 209 of FIG. 5A plays the role of zone 109 of FIG. 4, but is a slow bubbling or turbulent fluidized bed zone of the fine particulate material of fast fluidized bed zones 8 and 9. As in FIG. 4, partition 106 creates the annular space 209 next to outer wall of vessel 6. Zone 8 in FIG. 5A occupies an annular space between a circular partition 306 and, in an upper part of zone 8, the circular partion 106, and in a lower part, the outer wall of vessel 6. A lower portion of zone 8, sub-zone 308, will be described hereinafter. Beneath the lower termination of circular partition 306 lies fast fluidized bed zone 408, subposed beneath sub-zone 308 of zone 8 and contiguous therewith and in good thermal communication therewith. The lower part of vessel 6 is occupied by slow fluidized bed zone 608 having a lower part 207 occupying conical bottom 15 of vessel 6. Superposed above zone 408 and contiguous therewith is fast fluidized bed zone 508, which is in good thermal communication with zone 408 but does not communicate directly with sub-zone 308 or zone 8 or zone 9. Carbonaceous matter is supplied to zone 508 via line 5, and sometimes also advantageously from line 505 entering zone 209 to serve as a fuel in zone 209. If the carbonaceous matter is a caking bituminous coal, some or all of it may be finely ground and charged to zone 207 and zone 608 via optional lines 105, if desired, as hereinbefore described. Wavy oval lines 88 mark the boundary between the contiguous zone 408 and sub-zone 308 of zone 8. Wavy oval line 188 marks the boundary between contiguous zones 408 and 508.

Heat is furnished to zone 9 by combustion in zone 209, as already described in connection with FIG. 4 and zone 109. Heat is sometimes also advantageously provided from a process 1, as described in connection with FIG. 1. If a hot fuel gas can be made available from a process 301, it is advantageous to introduce such a gas, which should be at a higher temperature than the temperature of the fluidized bed zones of vessel 6, via line 302 into a fast fluidized bed zone 309 superposed above zone 508 and preferably in an extended section of circular wall 306 above the top of vessel 6. Process 301 might, for example, be a process for receiving a metal or several metal feedstocks and coke from line 550 and possibly also oxygen and melting or refining the metal or blending the metal feedstocks in an alloy through the agency of the oxygen and possibly also or alternatively electricity and discharging a purified metal or metal alloy via passage 220 and delivering a hot gas via line 302 comprising substantially carbon monoxide. Alternatively, process 301 might be a process for gasifying a carbonaceous material to produce a fuel gas, preferably a fuel gas containing little if any nitrogen.

Heat introduced into zone 9 from zone 209 or from the cooling of a hot gas supplied via line 2 passes by conduction downward through zones 8 and 308 and into zone 408 and thence onward by conduction into zone 508. The heat is available to sustain endothermic heat of reactions of the carbonaceous matter in the zones 408, 508, 608, and 207. If the fresh carbonaceous matter has been charged to zone 508, there will nevertheless occur some reactions of the carbonaceous matter, in general, in zones 408, 608, and 207, because in general, some of the carbonaceous matter will enter the aforementioned lower zones in an altered form before its reactions by the treatment with hot steam are complete. Also, in general, if carbonaceous matter is charged to zones 207 and 608 or 408, some altered matter will enter zone 508 before its reactions in presence of hot steam are complete.

Particulate material leaving zone 9 with gas in line 16 and separated in cyclone 17 is delivered to slow fluidized bed 322 in vessel 321 by standpipe 621, as in FIG. 4. The flow of cooled gas in line 20 from heat recovery means 19 is governed by valve 48.

Gas and fine particulate material are withdrawn from substantially the top of zone 508, or from optional zone 309 if it is present, and delivered via line 116 to cyclone separator 117, which furnishes gas substantially freed of the particulate material via line 118 to heat recovery means 119. Means 119 delivers the cooled rich fuel gas via discharge line 120, governed by valve 49. Cyclone separator 117 delivers the separated particulate material via standpipe 421, optionally aerated with lines 423 and conducting slow fluidized mass 422, to slow fluidized bed 322. Standpipe-and-U-tube 121 conducts the fine material in slow fluidized mass 122 into substantially the bottom of zone 408. The rate of flow in standpipe-U-tube 121 is governed by the rate of flow of aerating gas in line 124, which is regulated by valve 125.

If much of the carbonaceous matter reacts to form a fuel gas in zone 207, 608, and 408, it will be best if as little as possible of the offgas from zone 408 enters zone 308 and as much as possible of the gas enters zone 508. For achieving this desirable objective, it is advantageous to furnish steam jets 35 arranged to direct steam at frequent intervals around the circumference of the vessel 6 inwardly from the wall and situated at an elevation just a little below the lowest elevation of circular partition wall 306. The steam for jets 35 can be furnished from lines 31 and 32 receiving steam from line 13, for example, via one or more of the circular ring pipes 30, and delivering the steam via valve 33 to circular ring pipe 34 surrounding vessel 6 and delivering steam to the multiplicity of jets 35. A desirable objective is for much of the steam introduced by means of jets 35 to enter zone 508, and to serve this objective, it is advantageous to furnish additional steam jets 39 to supply steam to zone 308 and situated at an elevation just a little above the lowest elevation of circular partition wall 306. Jets 39 are supplied with steam from circular ring pipe 38, which receives steam from pipes 31 and 36 via valve 37. Further, it is advantageous that zone 308 have just a little higher fluidized density that zone 8 above, to cause a little more refluxing of the solid in zone 308 than elsewhere in zone 8, and to serve this objective, yet a third ring of steam jets 43 are advantageously provided at an elevation a few feet above the elevation of jets 39. Steam jets 43 are supplied with steam from circular ring pipe 42, which receives steam from lines 40 and 31 via valve 41. Differential pressure measuring means 44 is advantageously provided together with leads 45 and 46 entering vessel 6 at an elevation a foot or so below and a little above the elevation of jets 43 respectively. A desirable setting of the flows through valves 33, 37, and 41 to the three rings of steam jets would create just a hint of instability signified by a hint of an onset of fluctuation in the pressure differential reading afforded by means 44, with the effect that the refluxing of solid streamers downward in zone 308 will be greater than is ordinarily observed in a fast fluidized bed condition, the condition in zone 308 tending to approach a transition to turbulent fluidization. Such a refluxing would have the effect of sweeping gas downward and inducing a greater degree of backmixing in zone 308 than ordinarily observed in the fast fluidized condition, and accordingly, reducing the amount of offgas from zone 408 that enters zone 8.

It will be recognized that in general the gas product in line 120 is a rich fuel gas, having been produced without necessity for using substantially pure elemental oxygen, while the gas product in line 20 is in general a lean fuel gas containing such fuel values as enter zone 8 from zone 408, and if the fine particulate matter contains carbon and if the temperature is beyond a kindling temperature for the steam-carbon reaction, the fuel gas in line 20 will contain carbon monoxide and hydrogen produced from this reaction in zones 8 and 9. The gas in line 20 is preferably led to a combustion for raising heat, that may sometimes advantageously be used to convert water to steam for supply to line 10, or, if the operation is conducted at elevated pressure, to drive a gas turbine.

An advantage of the arrangement for operation at elevated pressure over the classic approach of providing heat to an endothermic reaction at high temperature by circulating hot solid into a fluidized bed zone for the reaction in that the control of the discharge of gases associated with the provision of heat from valve 48 and line 20 and the control of the discharge of rich fuel gas from valve 49 and line 120 are associated with less risk of a pressure reversal within the arrangement that would mix the two gases. As those skilled in the art will readily appreciate, the instructions to an operator for the adjustment of valves 48 and 49, as well as of valves 11, 33, 37, and 41 governing the steam supply and of valves 111 and 211 and of any means for regulating rate of flow of gas in line 2 or 302, if provided, could take a variety of forms. For example, valve 49 could be regulated to maintain a given desired pressure in the gas in line 120, while valve 48 could be governed to maintain flow in line 20 displaying a given increment in flow beyond that arising from gases entering vessel 6 in lines 102 and 2, and thereby assure a given rate of fuel gas and steam flow into zone 8, where this rate of fuel gas and steam flow is sufficient to maintain therein a fast fluidized bed condition. Although the arrangement calls for large circulations of fine particulate material through standpipes 621 and 421 and through standpipe-and-U-tube 121, it will be appreciated that these flows can vary within fairly wide limits, so long as they are sufficient to maintain fast fluidized conditions in the several fluidized bed zones 8, 9, 408, and 508. The operator does not depend upon these flows either to maintain the separation of two gas products, except in the broad sense that the flows are needed to maintain the aforementioned fast fluidized conditions, and the flows need not be closely governed to assure that they convey an exact amount of heat to an endothermic fluidized bed zone, as in the aforementioned classic approach.

FIG. 5B is a variant of the embodiment of FIG. 5A wherein the entire vessel 6 with its extension 306 comprising the extension of the internal circular partition wall 306 is filled with fast fluidized bed zones. Fast bed zone 708 occupies a space beneath the lowest elevation of partition wall 306, and zone 307, a lower sub-zone of zone 708, occupies conical bottom 15. Lines 405 are provided to add carbonaceous matter to zone 508, and lines 202 are provided to supply a hot gas or a gas containing oxygen such as air to zone 9.

FIG. 5B is arranged to furnish the return flow of fine particulate matter to the bottom of the several fast fluidized bed zones in a geometrically uniform and symmetrical manner, and is also arranged to withdraw gas and fine particulate material from the top of the several fast bed zones also in a uniform and symmetrical manner. Such arrangement is desirable to assure uniformity of the fast bed condition in the several zones and to minimize the backmixing of solid and the attendant backmixing of gas that can accompany a bad loss of uniformity in the fast bed condition. In a badly nonuniform fast bed, one sometimes sees large accumulations of powder to arise that fall at high speed for long distances downward through the bed, even from the vicinity of the gas outlet substantially all the way to the bottom. Such large accumulations with such a large degree of shortcircuiting of solid movement from top to bottom of a fast bed zone are to be avoided if the backmixing of gas in the zone is to be kept as low as possible.

Standpipe-and-U-tube 22 returns the slow fluidized mass of fine material 22 to a slow fluidized bed zone 522 occupying an annulus at the outer wall of vessel 6 and formed in a space between circular partition wall 406 and the outer wall. Wavy oval line 288 marks the boundary between contiguous zones 708 and 508. Slow fluidized bed zone 522 is supplied by aeration gas from a multiplicity of lines 524, only one of which is shown for simplicity of the drawing of FIG. 5B. Solid spills from zone 522 through opening 521 into zone 8 over the upper edge of wall 406, which should be carefully arranged so that it is substantially horizontal, in order that the flow of solid into zone 8 from zone 522 be as uniform as possible around the circumference of zone 8. Standpipe-and-U-tube 721 aerated from line 724 returns slow fluidized mass of the fine particulate material 722 from cyclone gas-solid separator 117 to the apex of conical bottom 15, at the center line of vessel 6.

Gas and fine particulate matter are withdrawn from the top of zone 508 via a multiplicity of outlet openings 416 leading into a gradually expanding space 216 between wall 306 and an outer wall 316, the expansion occuring in the direction of the flow of the gas and fine particulate matter toward line 116 that conducts the gas and matter to cyclone 117. This arrangement assures reasonably uniform withdrawal of gas and matter around the circumference of wall 306 near the top of zone 508, if the expansion of space 216 is arranged so that the velocity of gas flow in this space is substantially constant. The arrangement will be better appreciated from an examination of FIG. 5C which depicts a horizontal cross-section at C—C in FIG. 5B.

A similar arrangement is provided for withdrawal of gas and fine particulate matter from the top of zone 9, and will be appreciated from an examination of FIG. 5D which depicts a horizontal cross-section at D—D in FIG. 5B. The gas and fine material leaves zone 9 through a multiplicity of outlet openings 716 that conduct the gas and fine material into space 516 between the outer wall of zone 9 and wall 616. Space 516 gradually expands in the direction of gas flow to maintain a substantially constant gas velocity, and conducts the gas and fine material into line 16 the furnishes the gas and fine particulate material to cyclone gas-solid separator 17.

A multiplicity of steam nozzles 135 furnish steam to fast fluidized bed zone 708 at an elevation a little below the bottom of partition wall 306, and another set of steam nozzles 139 introduce steam at an elevation substantially that of the bottom of wall 306. By suitable adjustment of the flows in the two sets of steam nozzles, the part of the offgas from zone 708 that enters zone 8 can be reduced, thereby increasing the remainder that enters zone 508.

FIG. 5E is a variant of FIG. 5B that provides a slow bubbling or turbulent fluidized bed of the fine particulate matter in zone 808 near the bottom of vessel 6. Zone 407 is a slow fluidized lower sub-zone of zone 808 occupying conical bottom 15 of the vessel 6. Between zone 808 and the lower elevation of partition wall 306 is fast fluidized bed zone 408, the quantity of steam introduced through steam nozzles 135 being sufficient to place the fine particulate material in a fast fluidized condition. The arrangement of FIG. 5E has the advantage of providing a larger inventory of the fine particulate matter for reaction with steam introduced via nozzles 14. The fine material may be withdrawn from zone 407 via line 128 governed by valve 129.

FIG. 5F is another variant of FIG. 5B wherein standpipe-and-U-tube 821 aerated from line 824 returns slow fluidized mass 822 of the fine particulate material to zone 408, while the lower part of vessel 6 is occupied by slow bubbling fluidized bed zones 908 and 507 of a coarse granular material. Line 605 is provided to charge a carbonaceous matter to zone 507 and zone 908. The coarse granular material can arise from carbonaceous matter fed to zone 508 through lines 405, seen in FIG. 5B, or from a caking bituminous coal fed in a fine size through line 605 or preferably a multiplicity of such lines, in ways that have already been discussed in connection with zones 107 and 108 and lines 105 of FIG. 2.

FIG. 5G is an arrangement wherein slow fluidized bed zones 607, 1008, and 1108 occupy the lower portion of vessel 6. The fluidized bed zones may comprise slow bubbling or turbulent fluidized bed zones of the same fine particulate material making up fast fluidized bed zones 9 and 508 in FIG. 5G, or they may comprise a slow bubbling bed of a coarse granular material. If the former, additional steam is advantageously added at the bottom of zone 508 via a multiplicity of lines 114. Zone 607 occupies conical bottom 15 of vessel 6. Zone 1008 occupies a lower portion of the space enclosed by circular partition wall 306. Zone 1108 occupies a lower portion of the annular space between wall 306 and the outer wall of vessel 6. Lines 502 introduce a hot gas or a gas containing oxygen such as air into the bottom of zone 9. Standpipe-and-U-tube 821 returns slow fluidized mass 822 of the fine particulate material from cyclone 117 to substantially the bottom of zone 508.

Carbonaceous matter may be introduced into zone 508 through line 805 or line 905 at a higher elevation or through line 1005 which supplies the matter to line 116 conducting gas and fine material to cyclone 117. Choice of the location of the introduction of carbonaceous matter into the arrangement will be governed by the desired residence time of gas and vapor product of the treatment of the carbonaceous matter at the high temperature of the treatment. By a suitable choice of the location of the introduction of the carbonaceous matter, the residence time can be varied from a time of many seconds to a time amounting only to a small fraction of a second.

As hereinbefore described, bituminous coals and lignite can be converted to a gas rich in ethylene, as can also petroleum fractions of various gravities, by a suitable choice of operating temperature and product residence time.

FIGS. 5H and 5I are variants of FIG. 5G. In FIG. 5H, slow fluidized bed zone 1008 has grown to substantially occupy the region formerly occupied by fast fluidized bed zone 508, save for a knockout space 1208 above the upper surface level of slow fluidized bed zone 1008. The knockout space is provided with the conventional multistage cyclone arrangement commonly used to return fine powders to slow fluidized beds of such powders. Only two cyclone stages are shown, but three are sometimes preferred in practice. Gas and fine powder enters first stage cyclone 217 through opening 216. The gas with a reduced content of the powder passes from cyclone 217 to cyclone 317 through line 218, and gas substantially freed of the powder leaves the arrangement via line 318. Separated powder is returned to fluidized bed zone 1008 through standpipes 921 from cyclone 217 and standpipe 1021 from cyclone 317. Line 1105 is an alternative means for introducing carbonaceous matter for treatment.

It should be noted that slow bed 1008 may, as hereinbefore described, constitute a slow bubbling fluidized of a coarse granular material, and in such a case, cyclones 217 and 317 may be omitted and dust-separating means may advantageously be provided to treat gas in line 318 connecting directly to knockout zone 1208, with return of the dust to fast fluidized bed zone 9.

In FIG. 5I, zone 1308 has replaced zone 1008 in the space enclosed by wall 306 and comprises a quasi-stationary slow bubbling or turbulent fluidized bed of a fine particulate material, with separation of the circulating fine material from gas by cyclone 117 and return of the fine material via standpipe-and-U-tube 821. The arrangement of FIG. 5I is advantageous where a large inventory of the fine material is desired for treatment by steam.

EXAMPLES OF THE GASIFICATION OF COAL

I now give examples of operation of embodiments of the invention for the gasification by steam of an Illinois bituminous coal having a higher heating value of 12,755 British thermal units (B.t.u.) per pound on a dry basis and with a moisture-free analysis (expressed in weight per cent):

| | |
|---|---|
| 69.7 | carbon |
| 5.3 | hydrogen |
| 9.9 | oxygen |
| 1.3 | nitrogen |
| 3.8 | sulfur |
| 10.0 | ash |

Each of the examples is based upon a feed of 100,000 pounds per hour of the coal dried to a moisture level of 3 weight per cent and heated to 300° F in means 4.

FIRST EXAMPLE

Figure 6:
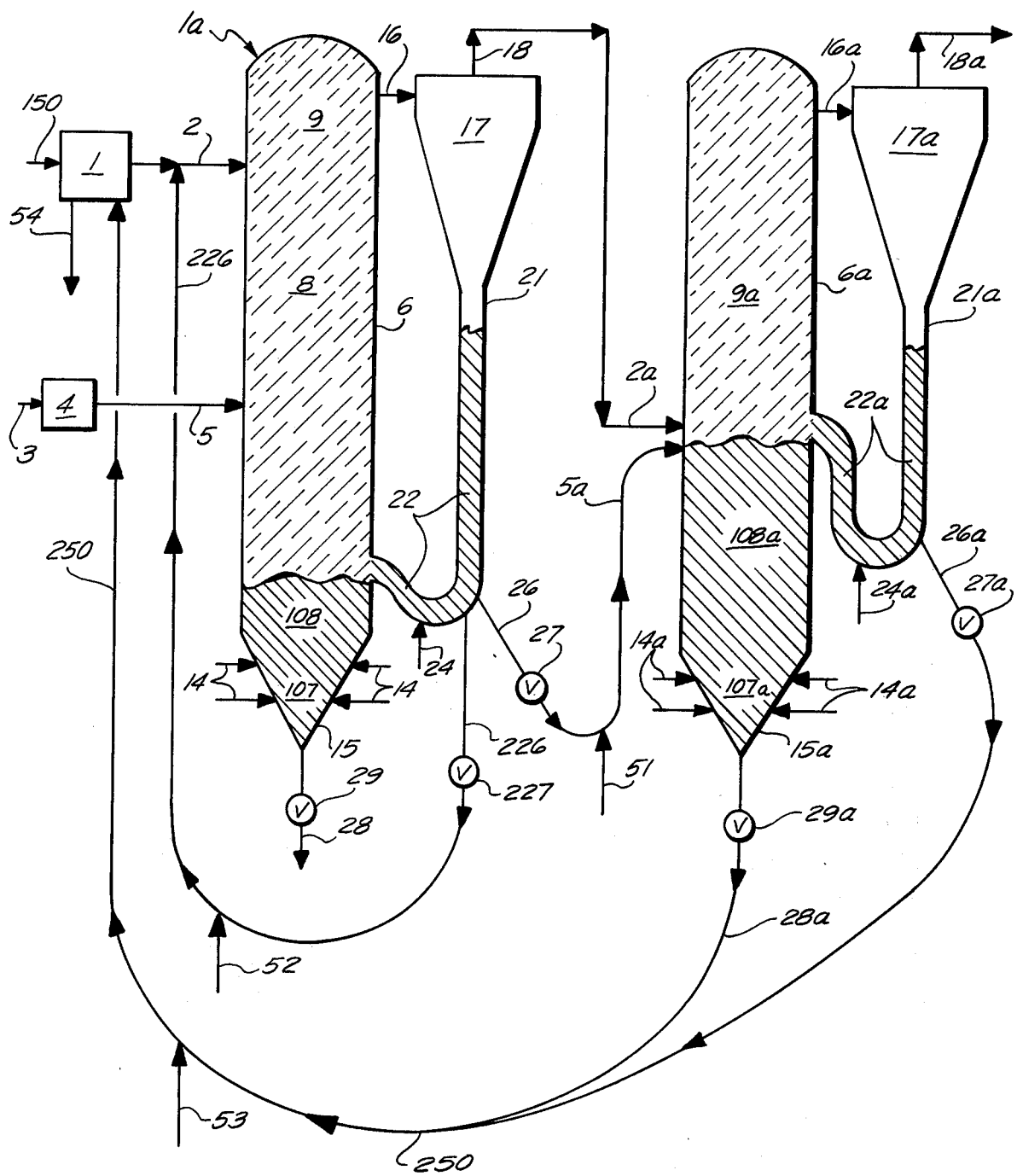
FIGS. 6, 7, and 8 are schematic diagrams of preferred embodiments especially adapted for the gasification of a coal or a lignite by its reaction with steam.

FIG. 6 shows two embodiments of the invention working as first and second stages of gasification. A first stage gasification process 1a constitutes an arrangement much like that shown in FIG. 2 above, wherein process 1 is a known slagging combustion process receiving air from line 150 and a fine particulate material containing carbon as fuel from line 250 and discharging slag via line 54. The temperature of the slagging process 1 is on the order of 2,800° F, and the temperature of the hot combustion product gas in line 2 is preferably ameliorated by circulating fine material from the slow fluidized mass 22 of such material in standpipe-and-U-tube 21 via line 226 and valve 227 into line 2. Aerating gas or lift gas 52 is provided to line 226 from line 52, preferably steam. Process 1a delivers hot fuel gas from line 18 to feed line 2a of a second stage of gasification, and process 1a delivers carbonaceous matter in form of a fine particulate material containing carbon from line 26 via valve 27, provided with aerating steam from line 51, to feed line 5a of the second stage. The second stage of gasification comprises equipment items 2a, 5a, 6a and so forth having substantially the functions of equipment items 2, 5, 6 and so forth in FIG. 3. The second stage delivers fine particulate material containing a lower level of carbon from line 28a via valve 29a and/or from line 26a via valve 27a to line 250, provided with aerating steam from line 53, which delivers the fine material to slagging combustion 1.

In the example, which operates at 50 atmospheres, zones 107, 108, 8, and 9 and the hot gas in line 18 are at 1,850° F, while zones 107a, 108a, and 9a are at 1,700° F. Coal in an amount of 100,000 pounds per hour is furnished via line 5 to zone 8. The flow of a fine char containing carbon via line 26 amounts to 26,620 pounds per hour on a moisture-and-ash-free basis, and the char contains substantially all of the 10,000 pounds per hour of ash matter in the coal. The fine char from line 250 to combustion process 1 amounts to 16,000 pounds per hour on a moisture-and-ash-free basis. The slag flow in line 54 amounts to 10,000 pounds per hour. Air to process 1 is 6,295.2 pound-moles per hour (m./hr.) and is at 900° F. Steam is supplied at 1,300° F, and the steam flow to vessel 6 (including aeration steam from lines 24, 52, and 53) amounts to 6,258.3 m./hr. Steam flow to vessel 6a (including aeration steam from lines 24a and 51) amounts to 2,874.8 m./hr. The fuel gas product from line 18a is at 1,700° F and amounts to 19,587.0 m./hr. and has a composition (in volume per cent) of:

| | |
|---|---|
| 8.8 | CO |
| 12.8 | $CO_2$ |
| 8.1 | $CH_4$ |
| 14.3 | $H_2$ |
| 29.8 | $H_2O$ |
| 0.6 | $H_2S$ |
| 25.3 | $N_2$ |
| 0.3 | A |

The gas has a higher heating value as is of 160 B.t.u. per cubic foot. After condensing the steam from the gas, the dry-basis heating value is 228.2 B.t.u. per cubic foot, an outstandingly high heating value for a gas made by blowing a coal with air and steam. An air-blown gasification by the known procedures would give a heating value in dry gas of not more than about 180 B.t.u. per cubic foot from a gravitating bed device, and a heating value considerably below this figure, probably between about 120 and 150 B.t.u. per cubic foot, from previously known fluidized-bed gasification devices. The explanation of the outstandingly high heating value of the gas from the example is the high production of methane in zones 8 and 108 of vessel 6, where the raw coal is treated in an atmosphere with a high partial pressure of steam and substantially free of nitrogen or carbon dioxide diluent arising from the combustion that supplies the heat to these zones.

SECOND EXAMPLE

Figure 7:
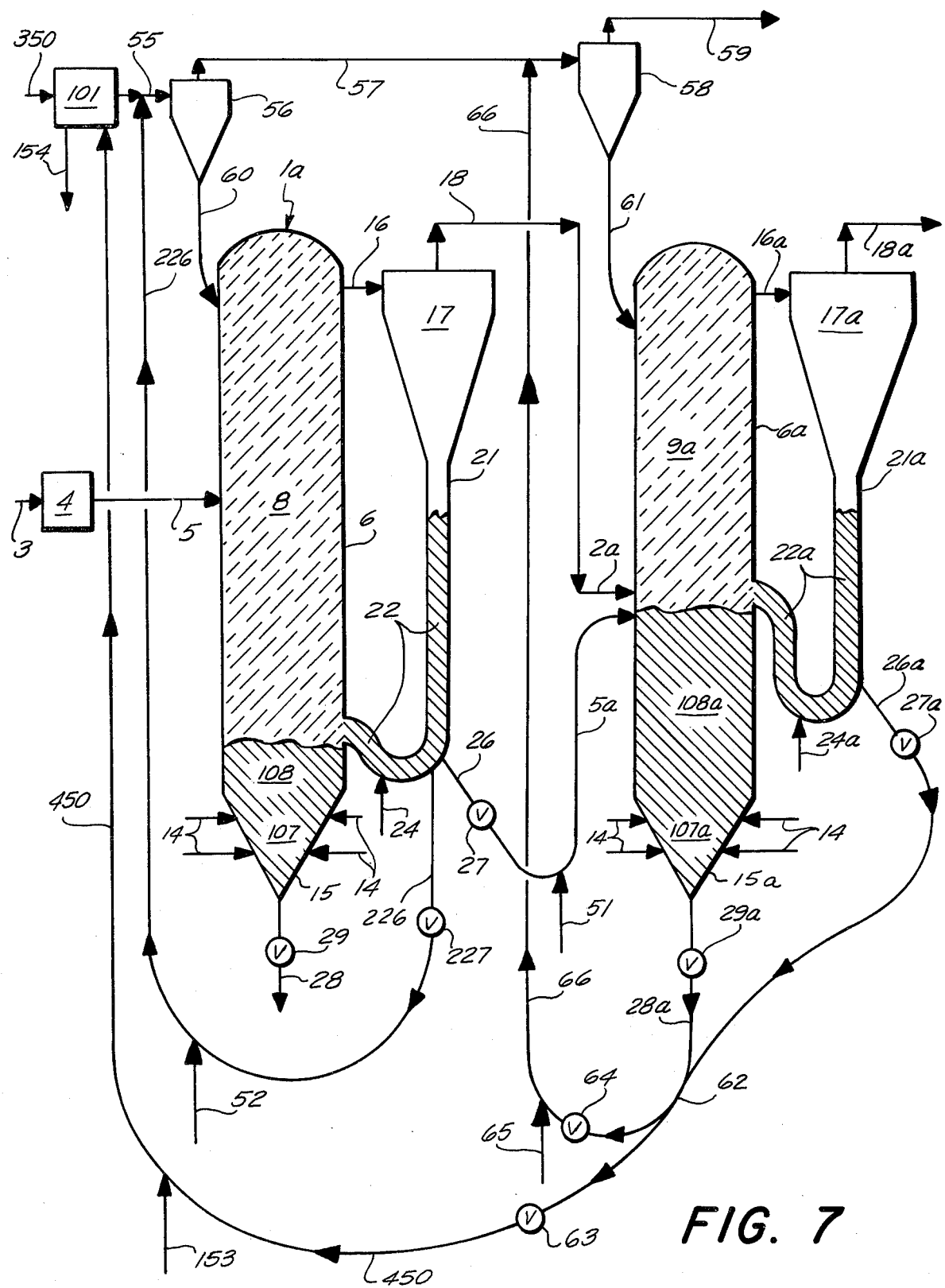

In FIG. 7, the first stage of gasification 1a is a moving Aurden process and operates much like the operation already described for FIG. 2, except that process 1 is omitted, and heat is supplied to zone 8 in form of a hot fine particulate material entering zone 8 from standpipe 60. Process 101 is a known slagging combustion process receiving air from line 350 and discharging molten slag via line 154 and receiving a fine particulate fuel containing carbon from line 450, that is aerated with gas from line 153. The hot combustion gas from process 101 gives up heat to fine particles circulated into line 55 from line 326, reducing the temperature of the gas in line 55 from the about 2,800° F of the combustion process 101 to about 2,100° F. The hot particles are separated from the gas in cyclone separator 56 and delivered via pipe 60 to zone 8, which operates at 1,850° F.

The second stage of gasification, comprising the equipment items 2a, 5a, 6a, and so forth operates substantially as has been already described for the second stage of gasification in FIG. 6, except for the introduction of additional heat into zone 9a in form of hot particles entering this zone from standpipe 61. Combustion products in line 57 from cyclone 56 are cooled from about 2,100° F to about 1,900° F by introducing into line 57 fine particles from line 66, which are separated from the gas in cyclone separator 58 and delivered at about 1,900° F via cyclone 58 to zone 9a via line 61. The hot combustion product gas is discharged at about 1,900° F via line 59 from cyclone 58.

Fine particles are supplied to line 55 from line 326 withdrawing the particles from slow fluidized mass 22 in standpipe-and-U-tube 21 and via valve 327. Line 326 is aerated with a gas from line 152.

Fine particles are supplied to line 57 from line 66 via valve 64 and aerated with gas from line 65. The same fine particles are supplied to combustion 101 via valve 63 and line 450 aerated with gas from line 153. Particles are furnished to lines 66 and 450 from line 62, which receives the particles from line 28a and/or 26a. Zones 9a, 108a, and 107a operate at 1,700° F.

The operation is at 50 atmospheres.

The coal in an amount of 100,000 pounds per hour is furnished to zone 8 via line 5. The flow of fine char via line 26 amounts to 37,934 pounds per hour, and the flow via line 450 amounts to 26,520 pounds per hour. Air to process 101 amounts to 6,491.1 m./hr. The air is at 900° F. Steam to vessel 6 amounts to 6,005.4 m/hr., and steam to vessel 6a amounts to 3,078.1 m./hr. The steam is at 1,300° F. The make-gas in line 18a amounts to 13,145.6 m./hr. and has a higher heating value as is of 236.5 B.t.u. per cubic foot, and a dry basis heating value of 399.2 B.t.u. per cubic foot. The analysis of the gas is:

| | |
|---|---|
| 10.1 | CO |
| 12.1 | $CO_2$ |
| 12.0 | $CH_4$ |
| 23.9 | $H_2$ |
| 40.7 | $H_2O$ |
| 0.9 | $H_2S$ |
| 0.3 | $N_2$ |

THIRD EXAMPLE

Figure 8:
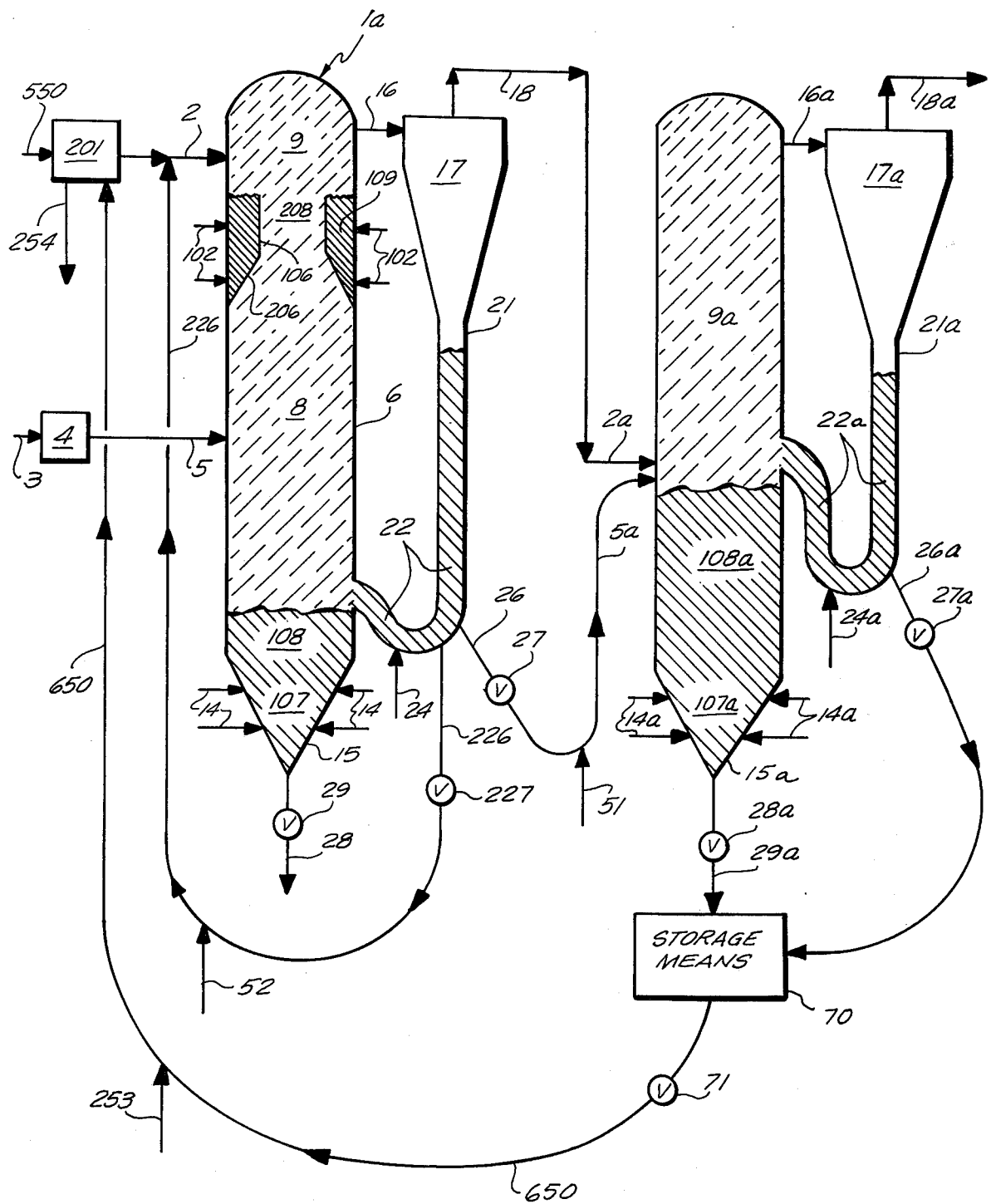

In FIG. 8, the first stage gasification process 1a operates much like the equipment already described in connection with FIG. 4, except that zone 109 is a slow fluidized bed zone of the fine particles of zone 9, and standpipe-and-U-tube 21 returns the slow fluidized mass 22 of the fine particles to the bottom of fast fluidized bed zone 8. Heat to zone 9 is supplied both by combustion in zone 9 resulting from a supply of a gas comprising 50% oxygen and 50% steam to zone 109 from lines 102, and also by combustion process 201 supplied with the same steam-oxygen mixture from line 550, discharging molten slag via line 254, and furnished with a fine particulate material containing carbon from line 650. The gas product of the combustion is reduced in temperature by introducing fine char particles from line 226 into line 2, as explained heretofore in connection with FIG. 6. The char particles supplied as fuel to process 201 via line 650 are furnished to line 650 via valve 71 from storage means 70, which receives the char from line 28a and/or line 26a. Line 650 is aerated with steam from line 253.

The operation is at 50 atmospheres.

Vessel 6 operates at 1,850° F and vessel 6a at 1,700° F.

The coal in an amount of 100,000 pounds per hour is furnished to zone 8 via line 5. The flow of fine char line 26 amounts to 25,980 pounds per hour, and the flow via line 650 amounts to 17,320 pounds per hour. The flow of the oxygen-steam mixture, which is at 1,000° F, to process 201 via line 550 amounts to 1,208.2 m./hr., and the flow of this mixture to zone 109 via lines 102 is 1,448.2 m./hr. Steam to vessel 6 amounts to 6,623.7 m./hr., and steam to vessel 6a amounts to 2,788.3 m./hr. The steam is at 1,300° F. The make-gas in line 18a amounts to 16,230.9 m./hr. and has a higher heating value as is of 192.8 B.t.u. per cubic foot and a heating value on a dry basis of 350.4 B.t.u. per cubic foot. The analysis of the gas is:

| | |
|---|---|
| 9.6 | CO |
| 16.4 | $CO_2$ |
| 9.7 | $CH_4$ |
| 18.3 | $H_2$ |
| 45.0 | $H_2O$ |
| 0.7 | $H_2S$ |
| 0.3 | $N_2$ |

DESCRIPTION OF THE PREFERRED EMBODIMENTS FOR CONDUCTING ENDOTHERMIC CHEMICAL OR PHYSICAL TREATMENT OF MATTER AT ELEVATED TEMPERATURE

The general applicability and usefulness of the embodiments of FIGS. 5A through 5I for conducting endothermic chemical or physical treatment or matter at an elevated temperature will be evident from an examination of the figures in light of the above discussion of several examples of such treatments. For example:

A metal object could be introduced via line 1105 of FIG. 5H to fall through bed 1008 and undergo a heat treatment therein in an atmosphere supplied from lines 14 and subject to close control without reference to the gases associated with supply of heat to zone 1008.

In FIG. 5B the fine particulate matter might be barium oxide partially converted to the peroxide form, or a promoted strontium oxide partially converted to strontium peroxide. Air heated to a temperature above the temperature of the several bed zones would be introduced via lines 202, and oxygen and steam would be withdrawn from line 118.

FIG. 5B could also be used to calcine a fine powder of calcium carbonate or half-calcined dolomite, or FIG. 5F could calcine calcium carbonate slimes introduced via line 605 with growth of beads of lime in zones 908 and 507 and with withdrawal of steam and carbon dioxide from line 118. Alternatively, FIG. 5F or 5G could calcine coarse lumps of calcium carbonate in zone 908 or 1008 with withdrawal of steam and carbon dioxide from line 118.

FIG. 5F could be used to decompose ferrous chloride with steam and oxygen into pellets of iron oxide in zone 908 and with supply of a gas containing steam and hydrogen chloride from line 118.

FIG. 5F could also be used to reduce finely divided iron oxide introduced into zone 908 with formation therein of beads of iron oxide. The fluidizing gas in lines 14 would be hydrogen or a mixture of hydrogen and carbon monoxide.

Several of the embodiments could be used to dry coal or other granular material, to reduce various metal oxides to metals, to calcine various material such as aluminum hydroxide, and generally to perform a variety of endothermic chemical or physical treatment or matter.

The embodiment of FIG. 5G can be used for treatments of hydrocarbonaceous matter at short residence times to provide gases rich in ethylene and acetylene.

It should be noted that, if desired, valves may be placed in the several standpipe-and-U-tubes 21, 121, 221, and so forth, if desired to permit better control of the rate of circulation of the slow fluidized mass of powder conducted by these tubes.

I do not wish my invention to be limited to the particular embodiments illustrated in the drawings and described above in detail. Other arrangements will be recognized by those skilled in the art, as well as other purposes which the invention can advantageously serve.

I claim:

1. A process for gasifying carbonaceous matter by treatment with hot steam to yield a fuel gas containing hydrogen, carbon monoxide, and methane, comprising:
    a. fluidizing granular carbonaceous material in a first fluidized bed extending continuously from substantially the bottom to substantially the top of a first space, and wherein said bed is maintained at a temperature between about 1,400° and 1,900° F;
    b. supplying carbonacious matter to said bed, and wherein said matter is selected from the group consisting of coals, cokes, lignites, asphalt, coal tar, heavy coker tars, bitumens, petroleum resudua, Gilsonite, and kerogen, and wherein said granular carbonaceous material originates from said carbonaceous matter and includes fine particulate material;
    c. supplying a gas comprising primarily steam as fluidizing gas to the bottom of said first bed and thereby converting at least a part of said carbonaceous matter by its endothermic reaction with steam to a fuel gas containing hydrogen, carbon monoxide, and methane;
    d. fluidizing granular carbonaceous material also originating from said carbonaceous matter in a second fluidizing bed extending continuously from substantially the bottom to the top of a second space, and wherein said second space is annular in shape and is concentrically disposed within and alongside the upper portion of first space, the top of said second space being open to said first space at a selected elevation between top and bottom of said first space, so that said second fluidized bed is contiguous with said first bed at said selected elevation and gas leaving said second bed acts as a part of the fluidizing gas to the region of said first bed above said selected elevation, and wherein the combined rate of flow of said gas leaving said second bed and of fluidizing gas in said first bed reaching said selected elevation from below is sufficient to maintain a fast fluidized condition of said fine particulate material in said region of said first bed;
    e. supplying a gas containing oxygen as fluidizing gas to said second bed, thereby sustaining combustion of said granular carbonaceous material in said second bed and generating heat that passes by conduction into said first bed;
    f. withdrawing gas together with said fine particulate material from substantially the top of said first space and said second space;
    g. substantially separating said withdrawn gas from said withdrawn fine particulate material;
    h. discharging said gas;
    i. feeding said separated fine particulate material into a third fluidized bed wherein said fine particulate material is maintained in the slow fluidized condition; and
    j. feeding said separated fine particulate material from said third fluidized bed into said first fluidized bed at a rate sufficient to maintain a fast fluidized zone in said region of said first bed above said selected elevation.

2. A process for gasifying carbonaceous matter by treatment with hot steam to yield a fuel gas containing hydrogen; carbon monoxide, and methane, comprising:
    a. fluidizing granular carbonaceous material in a first fluidized bed extending continuously from substantially the bottom to substantially the top of a first space, and wherein said bed is maintained at a temperature between about 1,400° and 1,900° F;
    b. supplying carbonaceous matter to said bed, and wherein said matter is selected from the group consisting of coals, cokes, lignites, asphalt, coal tar, heavy coker tars, bitumens, petroleum residua, Gilsonite, and kerogen, and wherein said carbonaceous material originates from said carbonaceous matter and includes fine particulate material.
    c. supplying a gas comprising primarily steam as fluidizing gas to the bottom of said first bed and thereby converting at least a part of said carbonaceous matter by its endothermic reaction with steam to a fuel gas containing hydrogen, carbon monoxide, and methane;
    d. fluidizing granular carbonaceous material also originating from said carbonaceous matter in a second fluidized bed extending continuously from substantially the bottom to the top of a second space, and wherein said second space is annular in shape and concentrically located within and alongside the upper portion of said first space and the top of said second space is open to said first space at a first selected elevation between top and bottom of said first space, so that second fluidized bed is contiguous with said first bed at said selected elevation and gas leaving said second bed acts as a part of the fluidizing gas into the region of said first bed above said first selected elevation, and wherein the combined rate of flow of said gas leaving said second bed and of fluidizing gas in said first bed reaching said first selected elevation from below is sufficient to maintain a fast fluidized condition of said fine particulate material in said region of said first bed;
    e. supplying a gas containing oxygen as fluidizing gas to said second bed, thereby sustaining combustion of said granular carbonaceous material in said second bed and generating heat that passes by conduction into said first bed;
    f. withdrawing gas together with said fine particulate material from substantially the top of said first space and said second space;
    g. substantially separating said withdrawn gas from said withdrawn fine particulate material;
    h. discharging said gas;
    i. feeding said separated fine particulate material into a third fluidized bed wherein said fine particulate material is maintained in the slow fluidized condition; and
    j. feeding said separated fine particulate material from said third fluidized bed into said first and second fluidized beds at the bottom of said first space and at a second selected elevation between the top and bottom of said second space respectively, and wherein said second selected elevation is below said first selected elevation, and wherein the rate of flow of fluidizing gas in said first bed reaching said second selected elevation from below is sufficient to maintain a fast fluidized condition of said fine particulate material in the region of said first bed between said first and second elevations, and wherein the rate of feeding said separated fine particulate material into said first and second fluidized beds is sufficient to maintain fast fluidized zones in said first bed and the regions between said first and second elevations and above said first elevation.

3. A process for gasifying carbonaceous matter by treatment with hot steam to yield a fuel gas containing hydrogen, carbon monoxide, and methane, comprising:
 a. fluidizing granular carbonaceous material in a first fluidized bed extending continuously from the bottom to substantially the top of a first space;
 b. fluidizing granular carbonaceous material in a second fluidizing bed in a second space, and wherein said second space is annular in shape and concentrically disposed about and alongside said first space and the bottoms said spaces are at the same elevation;
 c. fluidizing granular carbonaceous material in a third fluidizing bed extending continuously from substantially the bottom to the top of a third space, and wherein said third space is beneath said first and second spaces and is open to said first and second spaces, so that said third fluidized bed is contiguous with and subposed beneath both said first bed and second bed, and so that gas leaving said third bed acts in part as fluidizing gas to said first bed and in part as fluidizing gas to said second bed, and wherein said first, second, and third beds are maintained at a temperature between about 1,400° and 1,900° F;
 d. supplying carbonaceous matter to said fluidized beds, and wherein said matter is selected from the group consisting of coals, cokes, lignites, asphalt, coal tar, heavy coker tars, bitumens, petroleum residua, Gilsonite, and kerogen, and wherein said granular granular carbonaceous materials originate from said carbonaceous matter, and wherein said granular carbonaceous material of step (a) includes fine particulate material;
 e. supplying a gas comprising primarily steam as fluidizing gas to the bottom of said third bed and thereby converting at least a part of said carbonaceous matter by its endothermic reaction with steam to a fuel gas containing hydrogen, carbon monoxide, and methane;
 f. introducing a second gas at a selected elevation at the top of said first space, and wherein said second gas is hotter than said maintained temperature so that the cooling of said second gas as it enters said first bed introduces heat to said first bed, and wherein the combined rate of flow of said second gas and of fluidizing gas in said first bed reaching said selected elevation from below is sufficient to maintain a fast fluidized condition of said fine particulate material in the region of said first bed above said selected elevation;
 g. withdrawing gas from substantially the top of said second space and discharging said gas;
 h. withdrawing gas together with fine particulate material from substantially the top of said first space;
 i. substantially separating said gas withdrawn from said first space from said withdrawn fine particulate material;
 j. discharging said gas withdrawn from said first space;
 k. feeding said separated fine particulate material into a fourth fluidized bed wherein said fine particulate material is maintained in the slow fluidized condition; and
 l. feeding said separated fine particulate material from said fourth fluidized bed into the bottom of said third fluidized bed for entry into said first fluidized bed and into said second fluidized bed at a rate sufficient to maintain a fast fluidized zone in said region of said first bed and said second bed.

4. A process for gasifying carbonaceous matter by treatment with hot steam to yield a fuel gas containing hydrogen, carbon monoxide, and methane, comprising:
 a. fluidizing granular carbonaceous material in a first fluidized bed extending continuously from the bottom to substantially the top of a first space;
 b. fluidizing granular carbonaceous material in a second fluidized bed in a second space which is annular in shape concentrically located about and alongside of said first space, and wherein the bottoms of said spaces are at the same elevation;
 c. fluidizing granular carbonaceous material in a third fluidized bed extending continuously from substantially the bottom to the top of a third space, and wherein said third space is beneath said first and second spaces and is open to said first and second spaces, so that said third fluidized bed is contiguous with and subposed beneath both said first bed and said second bed, and so that gas leaving said third bed acts in part as fluidizing gas to said first bed and in part as fluidizing gas to said second bed; and wherein said first, second, and third beds are maintained at a temperature between 1,400° and 1,900° F;
 d. supplying carbonaceous matter to said fluidized beds, and wherein said matter is selected from the group consisting of coals, cokes, lignites, asphalt, coal tar, heavy coker tars, bitumens, petroleum residua, Gilsonite, and kerogen, and wherein said granular carbonaceous materials originate from said carbonaceous matter, and wherein said granular carbonaceous material of step (a) includes fine particulate material;
 e. supplying a gas comprising primarily steam as fluidizing gas to the bottom of said third bed and thereby converting at least a part of said carbonaceous matter by its endothermic reaction with steam to a fuel gas containing hydrogen, carbon monoxide, and methane;
 f. fluidizing granular carbonaceous material also originating from said carbonaceous matter in an annular fourth fluidizing bed extending continuously from substantially the bottom to the top of a fourth space, and wherein said fourth space is concentrically located within and alongside said second space at a selected elevation between top and bottom of said second space, so that said fourth fluidized bed is contiguous with said second bed at said selected elevation and gas leaving said fourth bed acts as a part of the fluidizing gas to the region of said second bed above said selected elevation, and wherein the combined rate of flow of said gas leaving said fourth bed and of fluidizing gas in said second bed reaching said selected elevation from below is sufficient to maintain a fast fluidized condition of said fine particulate material in said region of said second bed;

g. supplying a gas containing oxygen as fluidizing gas to said fourth bed, thereby sustaining combustion of said granular corbonaceous material in said fourth bed and generating heat that passes by conduction into said first bed;

h. withdrawing gas from substantially the top of said second space and discharging said gas;

i. withdrawing gas together with fine particulate material from substantially the top of said first space;

j. substantially separating said gas withdrawn from said first space from said withdrawn fine particulate material;

k. discharging said gas withdrawn from said first space;

l. feeding said separated fine particulate material into a fifth fluidized bed wherein said fine particulate material is maintained in the slow fluidized condition; and m. feeding said separated fine particulate material from said fifth fluidized bed into said third fluidized bed at a rate sufficient to maintain a fast fluidized zone in said region of said third bed and said second fluidized bed.

5. Apparatus for conducting endothermic reactions of carbonaceous matter in a treatment by contact with hot steam, comprising:

a. a vessel;

b. a vertical annular partition means connected at its upper and thereof to the interior wall of said vessel and forming a central first space and an annular second space within said vessel said first space extending from the bottom of said partition to the top of said vessel, and wherein the bottoms of said spaces are open to a third space within said vessel and subposed beneath said first and second spaces, and a fourth space subposed beneath and in communication with said third space;

c. means connected to said first space and said fourth space for feeding a carbonaceous matter into said vessel;

d. means for establishing in said first space a hot fluidized bed of particulate matter including fine particles and originating from said carbonaceous matter;

e. means for establishing hot fluidized beds in said second and third spaces of particulate matter originating from said carbonaceous matter, and wherein said means for establishing hot fluidized beds in said first, second, and third spaces include means for introducing gas comprising primarily steam as a fluidizing gas to substantially the bottom of said third space;

f. means for introducing a hot gas into said first space at a selected elevation of said first space, and wherein said means for introducing a gas comprising primarily steam and said means for introducing a hot gas are capable of sustaining rates of said introductions such as to maintain a rate of flow of fluidizing gas in the region of said first space above said selected elevation sufficient to establish a fast fluidized bed of said fine particles in said region;

g. means for withdrawing and separating gas and fine particles from the top of said second space;

h. means for withdrawing and separating gas and fine particles from the top of said first space;

i. pipe means for each of said separating means for discharging said separated gas; and j. means for conducting said separated particles from said separating means (g) and (h) into said third space at a rate of flow sufficient to establish a fast fluidized bed zone of said paricles in said third space.

6. Apparatus for conducting endothermic reactions of carbonaceous matter in a treatment by contact with hot steam, comprising:

a. a vessel;

b. a first vertical annular partition means connected at its upper end thereof to the interior wall of said vessel and forming a central first space and an annular second space, said first and second spaces being vertically oriented within said vessel, and wherein the bottoms of said spaces are open to a third space within said vessel and subposed beneath said first and second spaces;

c. a second vertical annular partition means in said vessel and forming in said second space a fourth annularly shaped vertically oriented space within said vessel, and wherein the top of said fourth space is open to said second space at a selected elevation;

d. means connected to said vessel for feeding a carbonaceous matter into said first space and said third space of said vessel;

e. means for establishing in said first space a hot fluidized bed of particulate matter including fine particles and originating from said carbonaceous matter;

f. means for establishing hot fluidized beds in said second and third spaces of particulate matter originating from said carbonaceous matter, and wherein said means for establishing hot fluidized beds in said first, second, and third spaces include means for introducing a gas comprising primarily steam as a fluidizing gas to substantially the bottom of said third space;

g. means for establishing in said fourth space a fluidized bed of particulate matter originating from said carbonaceous matter, including means for introducing a gas containing oxygen as a fluidizing gas to said fourth space, and wherein said means for introducing a gas comprising primarily steam and said means for introducing gas containing oxygen are capable of sustaining rates of said introductions such as to maintain a rate of flow of fluidizing gas in the regions of said first and second spaces above said selected elevation sufficient to establish a fast fluidized bed of said fine particles in said regions;

h. means for withdrawing and separating gas and fine particles from the top of said second space;

i. means for withdrawing and separating gas and fine particles from the top of said first space;

j. pipe means for each of said separating means for discharging said separated gas; and k. means for conducting said separated particles from said separating means (h) and (i) into said third space at a rate of flow sufficient to establish a fast fluidized bed zone of said particles in said regions of said first and second spaces above said selected elevation.

* * * * *